US008882036B2

(12) United States Patent
Henshaw

(10) Patent No.: US 8,882,036 B2
(45) Date of Patent: Nov. 11, 2014

(54) AIRCRAFT SEATING ARRANGEMENT

(76) Inventor: Robert J. Henshaw, Newnan, GA (US)

(\*) Notice: Subject to any disclaimer, the term of this patent is extended or adjusted under 35 U.S.C. 154(b) by 330 days.

(21) Appl. No.: 13/231,959

(22) Filed: Sep. 14, 2011

(65) Prior Publication Data

US 2012/0223186 A1     Sep. 6, 2012

Related U.S. Application Data

(60) Provisional application No. 61/449,026, filed on Mar. 3, 2011.

(51) Int. Cl.
    *B64D 11/06*     (2006.01)

(52) U.S. Cl.
    CPC ........ *B64D 11/06* (2013.01); *B64D 2011/0665* (2013.01); *B64D 2011/0617* (2013.01); *B64D 2011/0658* (2013.01)
    USPC ...................................................... 244/118.6

(58) Field of Classification Search
    CPC ............ B64D 11/06; B60N 2/01; B60N 2/02; B60N 2/0292
    USPC ........ 244/118.5, 118.6, 122 R; 297/244, 245; 105/314, 315, 316, 344, 345
    See application file for complete search history.

(56) References Cited

U.S. PATENT DOCUMENTS

| | | | |
|---|---|---|---|
| 1,991,536 A | | 2/1935 | Austin |
| 2,163,198 A | * | 6/1939 | Gossard ................. 297/245 |
| 2,608,366 A | | 8/1952 | Jergenson |
| 3,784,989 A | * | 1/1974 | LeGrand ................. 244/118.6 |
| 4,686,908 A | * | 8/1987 | Legrand ................. 244/118.6 |
| 6,352,309 B1 | | 3/2002 | Beroth |
| 7,448,575 B2 | * | 11/2008 | Cheung et al. .......... 244/118.6 |
| 2009/0243358 A1 | | 10/2009 | Henshaw |

FOREIGN PATENT DOCUMENTS

WO    WO2010084468 A1    7/2010

\* cited by examiner

*Primary Examiner* — Tien Dinh
*Assistant Examiner* — Richard R Green
(74) *Attorney, Agent, or Firm* — Lynda Kouroupis

(57) ABSTRACT

A vehicle seating arrangement can comprise a fore-facing lower seating assembly, an aft-facing lower assembly, and an upper seating assembly positioned between the fore-facing and aft-facing lower assemblies. The lower and upper assemblies can be configured to form a 3-seat unit in which a portion of a seat of said fore-facing and aft-facing lower seat assemblies underlaps a portion of an upper seating assembly. At least one of the fore-facing and aft-facing lower assemblies can be angled with respect to the upper seating assembly to shorten the overall linear dimension of the 3-seat unit and provide egress areas for lower passengers to aisle access. A vertical member can be configured to attach to the upper seating assembly and to a ceiling structure to reduce the load on the floor.

23 Claims, 48 Drawing Sheets

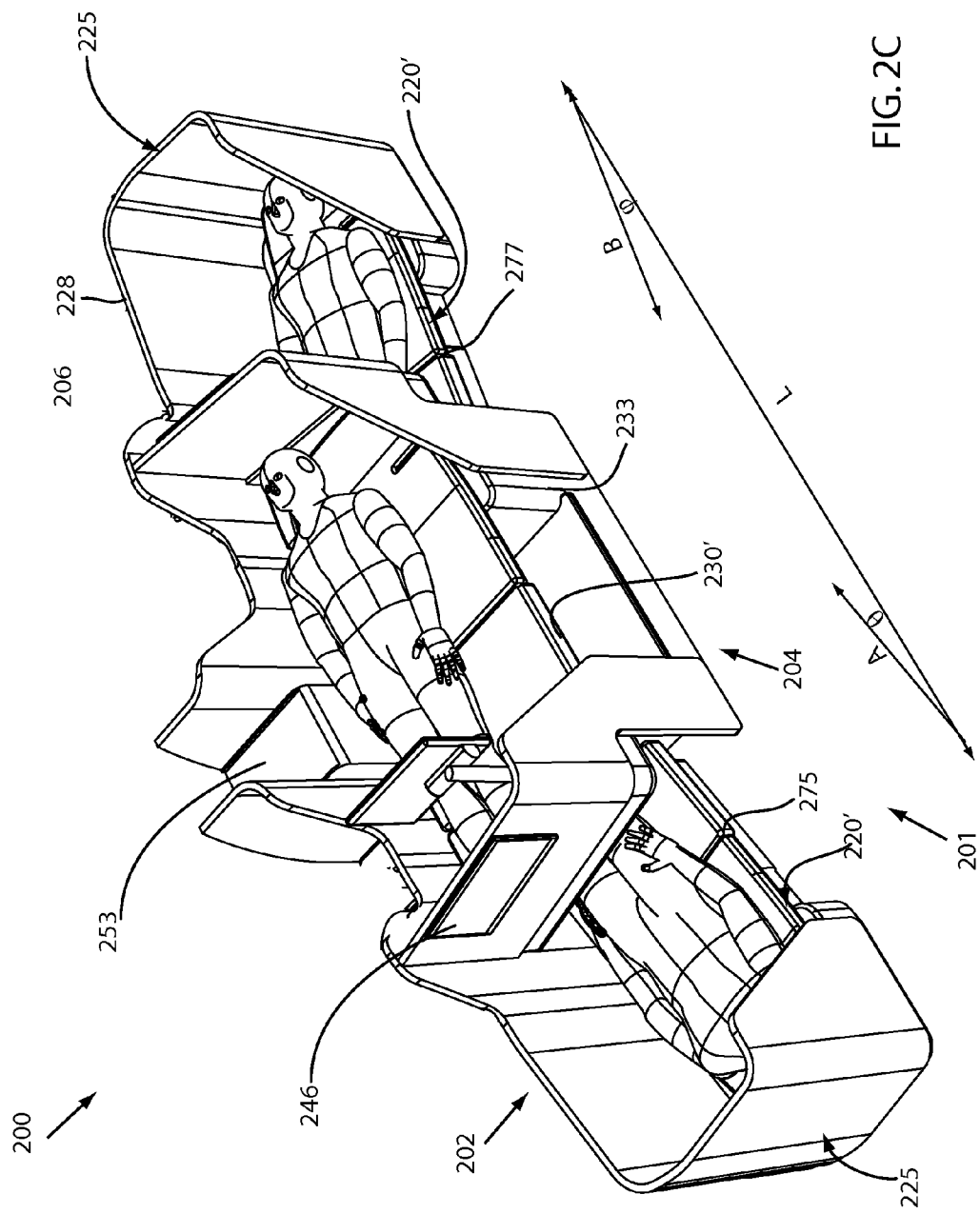

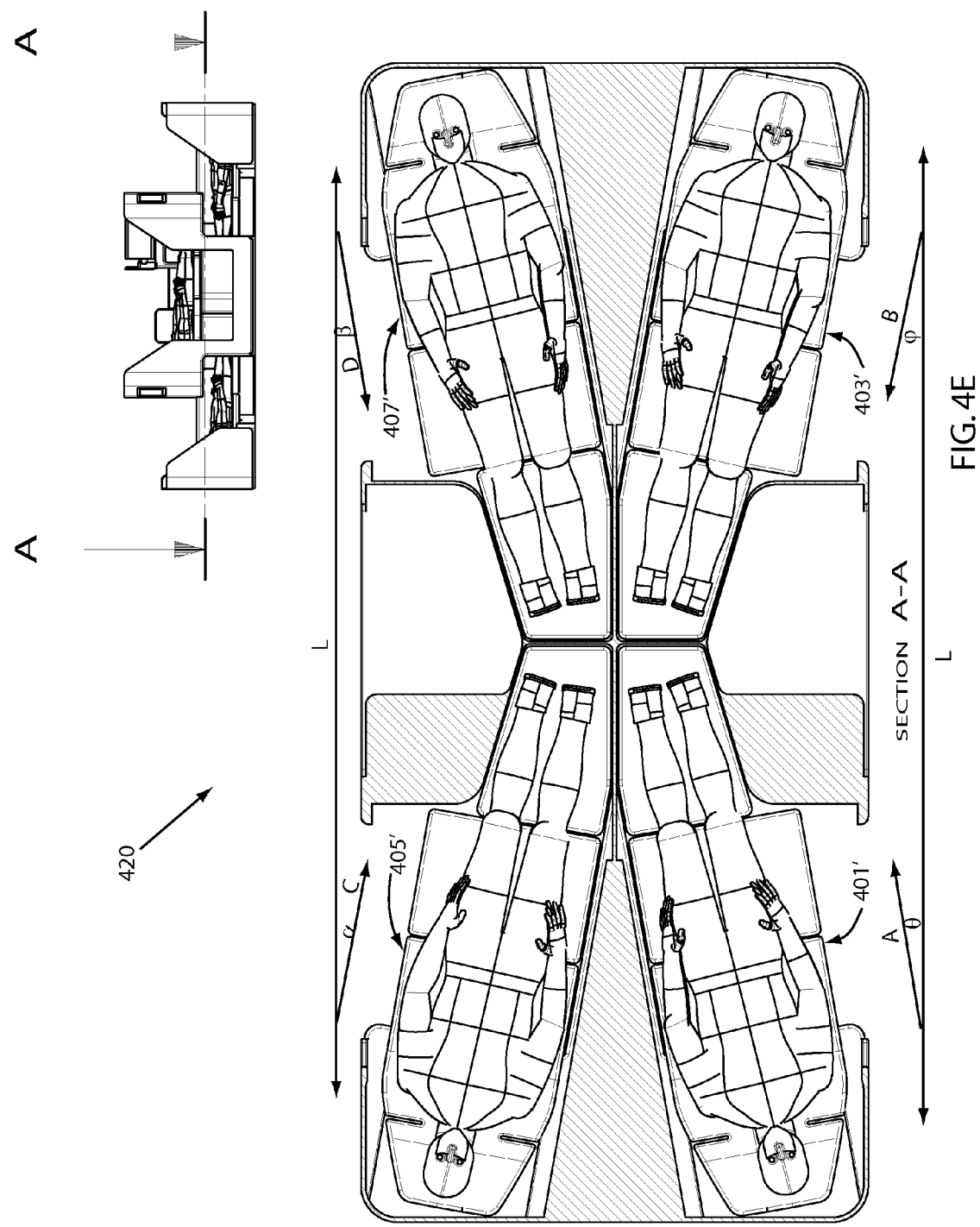

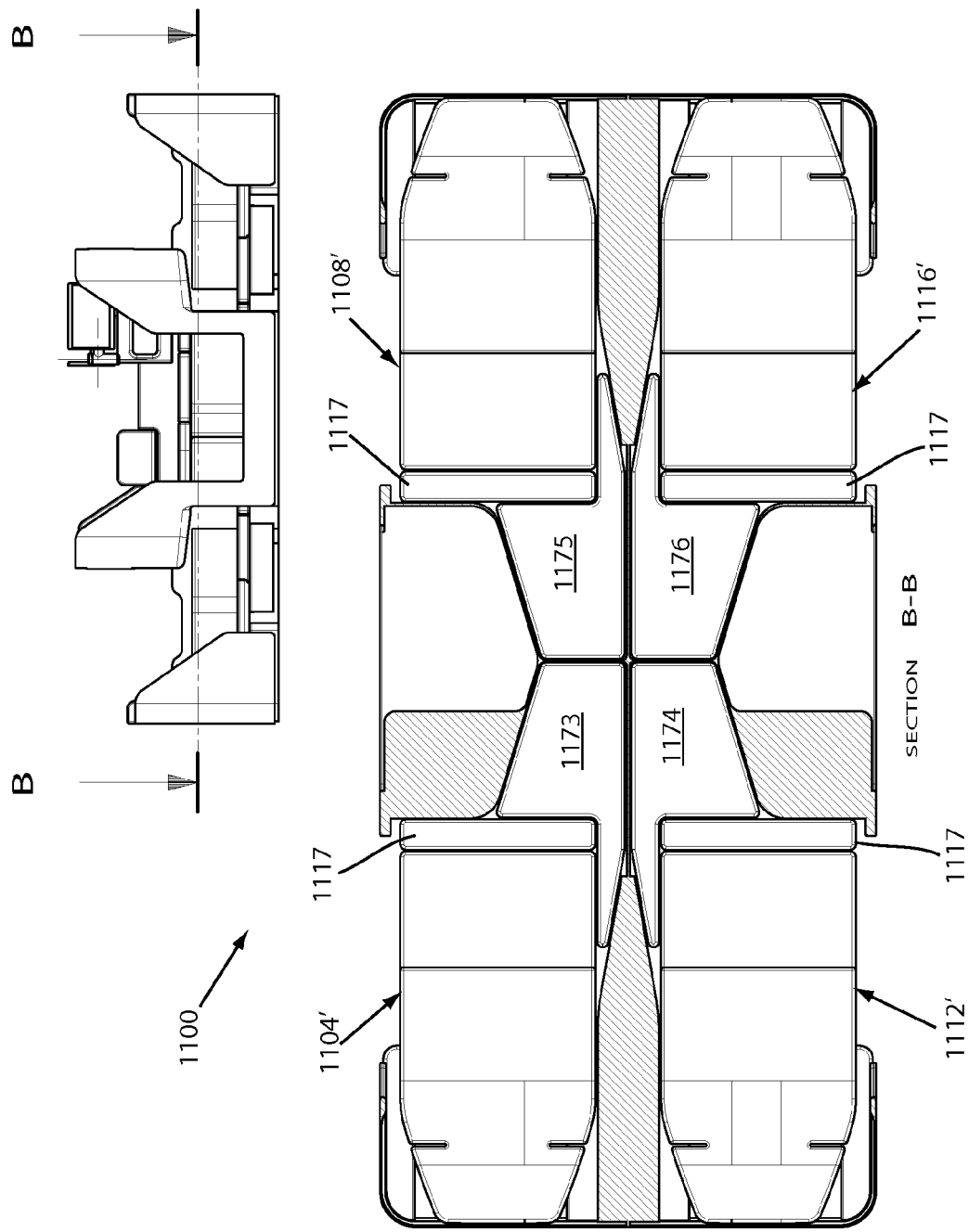

AIRCRAFT SEATING ARRANGEMENT

CROSS REFERENCE TO RELATED APPLICATIONS

This application claims the benefit of U.S. Provisional Application No. 61/449,026, entitled "Aircraft Seating Arrangement", filed Mar. 3, 2011 by Henshaw, which is incorporated herein in its entirety by reference.

FIELD OF INVENTION

The present invention relates to seating and seating arrangements for passenger vehicles, and more particularly, to aircraft seating arrangements in which seats can be converted between an upright position and a lie-flat sleeping position.

BACKGROUND OF INVENTION

Optimizing an aircraft seating arrangement includes maximizing seating capacity while attending to passenger comfort. Generally, the more spacious and comfortable a seat, the more an airline can charge for the seat, but the fewer the number of seats that can be provided.

A traditional aircraft seat includes a base portion upon which a passenger sits and a seatback against which a passenger leans back. The seatback is typically adjustable to move between a generally upright "takeoff and landing position" and a slightly reclined "traveling" position. Aircraft seats are typically arranged side-by-side in rows transverse to the longitudinal axis of the aircraft with the seats facing forward in the direction of travel. The seat rows are typically spaced apart from one another so that in commercial aircraft the seats have a pitch between 27 and 82 inches to provide legroom between the rows. Longitudinal aisles may be provided that divide the seats into sections. For example, the seating arrangement may include two aisles that divide the seating arrangement into a center section and two side sections to provide improved ingress and egress to the rows and access to emergency exits.

To maximize profit, airlines charge higher fares for upgraded or premium seating. For example, a premium seat may be wider, and recline farther, and be arranged to provide more legroom than a standard seat. Some aircraft are divided into different class cabins, with each having a different seating arrangement. For example, an aircraft may have a higher fare "first class" cabin near the front of the plane and a lower fare "coach" class cabin at the rear of the plane.

In recent years, seats have been developed that are convertible between a "takeoff and landing" position to a "lie-flat" sleeping position to allow the seats to be used as "beds." These seats have proven popular on long haul and international flights during which a passenger may desire to sleep aboard the aircraft. While such lie-flat seating provides additional comforts to passengers, and allows airlines to charge higher fares, lie-flat seating requires additional space, making it difficult to provide in large quantity. For example, when seats are oriented at an angle with respect to a longitudinal axis of an aircraft, a typical lie-flat seating arrangement has a seat pitch of about 58 to 63 inches, which is significantly more than the pitch of typical of coach class seating which ranges from 27 to 34 inches. Angled lie-flat seating places one passenger's head over the feet of the passenger directly behind him or her. Non-angled lie-flat seating will typically have a pitch of 76 to 82 inches and will often rely on an alternative arrangement of seats to facilitate efficient utilization of space in the aircraft.

Several attempts have been made to provide fully reclining, lie-flat, or sleeper seat seating arrangements that efficiently utilize limited aircraft cabin space. Some arrangements have attempted to angle the seats in a horizontal plane in a "chevron" style in an attempt to increase lie-flat seating density.

Others have attempted to overlap portions of the seats vertically so that a passenger's feet are placed underneath the head of another passenger of a seat in front. For example, seats may be provided that recline at an angle so that the feet of a passenger in a rearward seat extend below the head of another passenger reclined in a seat in the row in front. Others have provided back-to-back seating in which seats are placed back-to-back, lengthwise and alternate seats are placed substantially above the passageway floor and the remaining seats below the passageway floor, so that the back of the upper seat recline over the back of the adjacent lower seat.

More recently, a seating arrangement that includes a raised seat that overlaps two lower seats when reclined a lie-flat position has been proposed. By exploiting generally unused space to expand in a vertical direction, seating density can be increased to maximize passenger capacity while providing fully reclining seating.

While fit for their intended purposes, the prior art arrangements are plagued by several drawbacks and disadvantages. For example, in some prior art seating arrangements, the seat of a first passenger covers the head of a second passenger, a generally undesirable configuration. Other prior art arrangements fail to efficiently utilize horizontal and/or vertical space, decreasing the cost effectiveness of the arrangement. Arrangements designed to conserve space can require one passenger to crawl over another passenger to enter or exit a seat, a process that can be uncomfortable for both the moving and seated passengers. Not only is this inconvenient for both passengers but it may also lead to difficulties during an emergency. Raised seating arrangements also generally cause greater loads to be applied to the floor, and thus require heavier, and more substantial and expensive support structures to satisfy airline safety requirements.

SUMMARY OF INVENTION

In an exemplary embodiment, aircraft seating is arranged to include a fore-facing lower seating assembly, an aft-facing lower seating assembly, and an upper seating assembly positioned between the fore-facing lower assembly and the aft-facing lower assembly. The fore-facing lower seating assembly, the aft-facing lower seating assembly and the upper seating assembly are configured to form a three-seat grouping that can be referred to as a lower-upper-lower (L-U-L) grouping. Each of the lower and upper seating assemblies of the three-seat L-U-L grouping includes a seat that is convertible between an upright and a lie-flat position. In an L-U-L configuration, a portion of a seat of the fore-facing lower seating assembly and a portion of a seat of the aft-facing lower seating assembly underlap the upper seating assembly when extended in a lie-flat position.

In an exemplary embodiment, at least one of the fore-facing lower seating assembly and said aft-facing lower seating assembly is oriented at an angle in relation to the linear dimension of said upper seating assembly. In an exemplary embodiment, both lower seating assemblies are angled with respect to the upper seat, forming an angled L-U-L arrangement. An angled arrangement can shorten the required overall length of the three-seat grouping, and provide easy ingress/ egress to its occupants. In addition, an angled arrangement can provide improved ingress and egress for adjacent seating that may be arranged to extend longitudinally beyond the angled seating.

A lower seating assembly within a three-seat grouping can be arranged so that its longitudinal axis is parallel, i.e. aligned, with the longitudinal axis of the upper seating assembly in the three-seat grouping, rather than angled. Hinge lines of a seat of a lower seating assembly in this orientation are perpendicular to the linear dimension of the lower seating assembly and the upper seating assembly. In an exemplary embodiment, both lower seating assemblies are arranged having a longitudinal axis in parallel or in alignment with the linear dimension of the upper seating assembly. This embodiment, which can be referred to as an aligned L-U-L arrangement, can provide unobstructed ingress and egress to upper and lower seating assemblies and provide a shortened linear dimension by the disposition of a footwell for the lower seating assemblies. In an example embodiment, an occupant's body is angled when a lower seating assembly is in a lie-flat position, allowing a shorter linear dimension for the lower seating bed, thereby shortening the overall linear dimension of the three-seat grouping.

A three-seat grouping can be used in conjunction with other seating to form various seating arrangements. In an example embodiment, a three seat grouping is provided in conjunction with at least one adjacent lower seat. A lower seat may be arranged generally parallel to the upper seat and adjacent a lower seat of the three-seat grouping. When a lower seat is positioned "straight" next to an angled seat of a three-seat grouping, an egress area can be formed between the three-seat grouping and the lower seat, to allow a passenger in the straight lower seat to access his seat without invading the space of a passenger in a lower seat of the three-seat grouping. In an example embodiment, the straight lower seat may be arranged in an opposite direction of the angled lower seat. This arrangement can increase the distance between seated passengers giving passengers in both the straight and angled seating greater privacy. Partitions, walls, dividers, or the like may be used to further separate the angled passenger from the straight passenger. For example, an arrangement can allow each passenger to enter a passenger compartment without having to invade the privacy of another passenger. Similarly, a three-seat grouping having non-angled, or straight lower seating assemblies can be combined with at least one adjacent lower seating assembly in a manner that provides unobstructed seat access for occupants of all upper and lower seats.

In an example embodiment, a vehicle seating arrangement includes a five-seat module in which a three-seat grouping is provided in conjunction with a two-seat grouping. The three-seat grouping can comprise angled or aligned lower seating. In an example embodiment, the two-seat grouping may comprise lower seats that include an aft-facing seating assembly and a fore-facing seating assembly. The aft-facing seating assembly and the fore-facing seating assembly can include seats convertible between an upright and a horizontal position. In an example embodiment, the two-seat grouping is configured adjacent with the three-seat grouping to form the 5-seat module in which an access area is provided between the adjacent lower seats. In a further embodiment, the two-seat grouping can be configured to join or be contiguous with the 3-seat grouping to form an integral 5-seat module. The 5-seat module can be configured to provide unobstructed access to all five seating assemblies so that no passenger has to crawl over another passenger or otherwise invade another passenger's space in order to be seated.

In an example embodiment, two three-seat groupings can be combined to form a six-seat module that allows unobstructed access to all seating assemblies, conserves space and efficiently provides seating throughout an aircraft fuselage. Each three-seat grouping can be arranged so that one or both lower seat assemblies are disposed in parallel with, or alternatively, at an angle with respect to the upper seat assembly. When combined to form a six-seat grouping, the upper seats may be facing the same direction (aft or forward) or may face opposite directions. In an example embodiment, a six-seat grouping having aligned seats is configured to angle a lower passenger across a lie-flat seat thereby conserving space in the linear direction.

An example embodiment can include a six-seat module comprising two upper seats, two lower seats that face the same direction as the upper seats, and two lower seats that oppose the upper seats. While all lower seating can be aligned with the upper seating, disposition of footwells for lower opposing passengers, due to a sharing of footspace with upper passengers, can angle occupants in a lie-flat position; while disposition of footwells for lower non-opposing passengers can allow a passenger to lie straight.

An example vehicle seating assembly can include a support assembly structure, and a seat movably attached to the support assembly structure, the seat including a seatback and a seat base for supporting a passenger. An exemplary seating assembly can include a vertical member configured to extend between the support assembly structure and a vehicle ceiling structure to provide stability to said seating assembly. In an exemplary embodiment, the vertical member is in the form of a generally vertical support configured for attachment to the seat shell and a vehicle ceiling structure. In an example embodiment the vertical member is adapted to attach to a ceiling beam of an aircraft fuselage. The vertical member reduces the load on the vehicle floor when a force is applied the seating assembly. The vertical member is particularly advantageous when used with a seating assembly that provides an elevated seat.

In an example embodiment, a seating arrangement includes a three-seat grouping having a vertical member. The three-seat grouping can include a fore-facing lower seating assembly providing a seat convertible between a sitting position and a lie flat position in a lower horizontal plane, an aft-facing lower seating assembly providing a seat convertible between a sitting position and a lie flat sleeping position in the lower horizontal plane, an upper seating assembly positioned between the fore-facing and aft-facing lower seating assemblies providing a seat convertible between a sitting position and a lie flat position in an upper horizontal plane, and a vertical member configured to attach to said upper seat assembly and an aircraft ceiling structure to provide stability to said upper seating assembly. The two lower seating assemblies and the single upper seating assembly can form a three-seat grouping in which fore- and aft-facing lower seats underlap an upper center seat when extended in a lie flat position. The vertical member can strengthen and stabilize the upper seat assembly, reducing its structural load and improving the ability of the seating structure and the floor beneath it to withstand applied forces. The lower seating assemblies can be aligned with, or angled with respect to the upper seating assembly.

In an example embodiment, an aircraft fuselage is configured to accommodate one or more seating assemblies comprising a vertical member. By way of example, but not limitation, storage compartments associated with the seating assemblies can be disposed at the ground or seating level, eliminating the need for overhead storage. Seating level storage offers several advantages, including but not limited to, increased passenger headroom above the seats, improved storage compartment accessibility by passengers and crew, and improved safety as the potential hazard of falling items from overhead bins is eliminated. In addition, the absence of overhead storage compartments facilitates vertical member mounting and allows the use of raised seating near the side of the fuselage which is typically restricted by the curvature of the fuselage. In an exemplary embodiment a seating arrangement includes a storage compartment associated with each seat. The storage compartment can be sized and configured to accommodate carry-on items. A storage compartment for a first passenger can be integrated with a seating assembly of a second passenger to reduce the amount of space required to provide sufficient storage for each passenger.

An example vehicle seating arrangement can include various arrangements of combined 3-seat and 2-seat groupings. For example, one 3-seat grouping and one two-seat grouping can be combined to form a 5-seat module. A plurality of 5-seat modules can be placed end-to-end along the linear or longitudinal dimension of a vehicle. Two 5-seat modules can be placed side by side along the width of a vehicle to form a 10-seat module. A plurality of 10-seat modules can be placed end-to-end along the linear dimension of the vehicle. In a similar fashion, two 3-seat modules can be combined to form a 6-seat module. A 6-seat module can be combined with additional 2-, 3-, 5- and/or 6-seat groupings and arranged end-to-end along the linear dimension of the vehicle.

BRIEF DESCRIPTION OF THE DRAWINGS

FIG. 2C depicts an example 3-seat group arrangement with seats in a lie-flat position.

FIG. 4E shows a sectional view of a six-seat arrangement in a lie-flat position.

FIG. 5I shows an example 5-seat grouping with a vertical member.

FIG. 11E shows an example vehicle seating arrangement.

DETAILED DESCRIPTION OF EXAMPLE EMBODIMENTS

Figure 1:
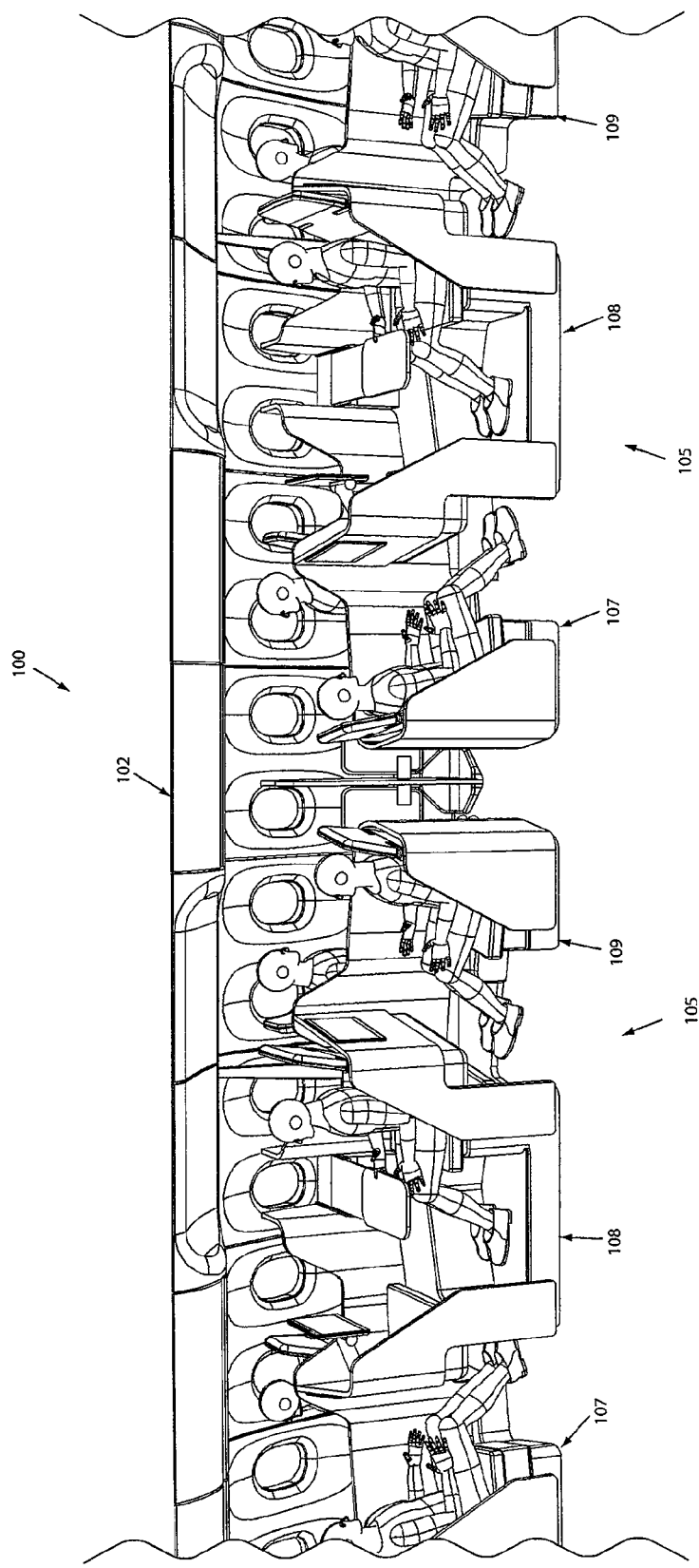
FIG. 1 depicts an example seating arrangement in an aircraft fuselage.

As required, exemplary embodiments of the present invention are disclosed herein. These embodiments are meant to be examples of various ways of implementing the invention and it will be understood that the invention may be embodied in alternative forms. The figures may not be to scale and some features may be exaggerated or minimized to show details of particular elements, while related elements may have been eliminated to prevent obscuring novel aspects. Therefore, specific structural and functional details disclosed herein are not to be interpreted as limiting, but merely as a basis for the claims and as a representative basis for teaching one skilled in the art to variously employ the present invention. The terms "fore" and "aft" are used merely for orientational purposes in reference to the particular exemplary embodiments shown in the drawings. Furthermore, the term lie-flat may mean substantially flat which could be angled and not necessarily horizontal.

For purposes of teaching, and not limitation, the exemplary embodiments disclosed herein are discussed in the context of an Airbus A-330 or A-340 aircraft. However, the present invention is applicable to other aircraft as well, such as, by way of example and not limitation, Airbus models A-300 and A-380 models, and Boeing 747, 767, 777, and 787 models, McDonald Douglas MD-11, as well as other aircraft and vehicles.

Referring to the Drawings, wherein like numerals represent like elements throughout the several views, FIG. 1 depicts an example seating arrangement 100 in an aircraft fuselage 102. The seat arrangement 100 includes a plurality of three-seat configurations 105, each including a lower aft-facing seat 107, an upper seat 108, and a lower fore-facing seat 109, and can be referred to as a lower-upper-lower (L-U-L) configuration or grouping. The upper seat 108 is disposed at an elevated height above the lower aft- and fore-facing seats 107, 109. As discussed in U.S. application Ser. No. 12/409,442 filed on Mar. 23, 2009 by Henshaw, and PCT Application No. PCT/US2009/001823 filed on Mar. 24, 2009, both of which are incorporated herein in their entirety by reference, the lower aft- and fore-facing seating assemblies 107, 109 and the upper seat 108 are configured to be convertible between a sitting position and a lie-flat position. The seats of the lower seating assemblies 107, 109 can be configured to underlap the upper seating assembly 108 when in the lie-flat position. While grouped together in the example L-U-L three-seat configuration 105, the lower seating assemblies 107, 109 can be either angled or aligned with the upper seating assembly 108. In the example depicted in FIG. 1, the lower seating assemblies 107, 109 are angled with respect to the upper seating assembly 108, and can be referred to as an angled L-U-L grouping since at least one lower assembly is angled with respect to the upper assembly. Accordingly, a longitudinal axis of the lower seating assembly 107, 109 is not parallel with that of the upper seating assembly 108. An angled orientation shortens the length of the three-seat configuration 105, thereby conserving space, allowing more seats to be disposed in the fuselage 102, and increasing revenue for the airline without sacrificing passenger comfort. A plurality of three-seat configurations 105 can be combined with one or more other seat configurations, to efficiently and comfortably provide the overall seating layout 100.

Figure 2A:
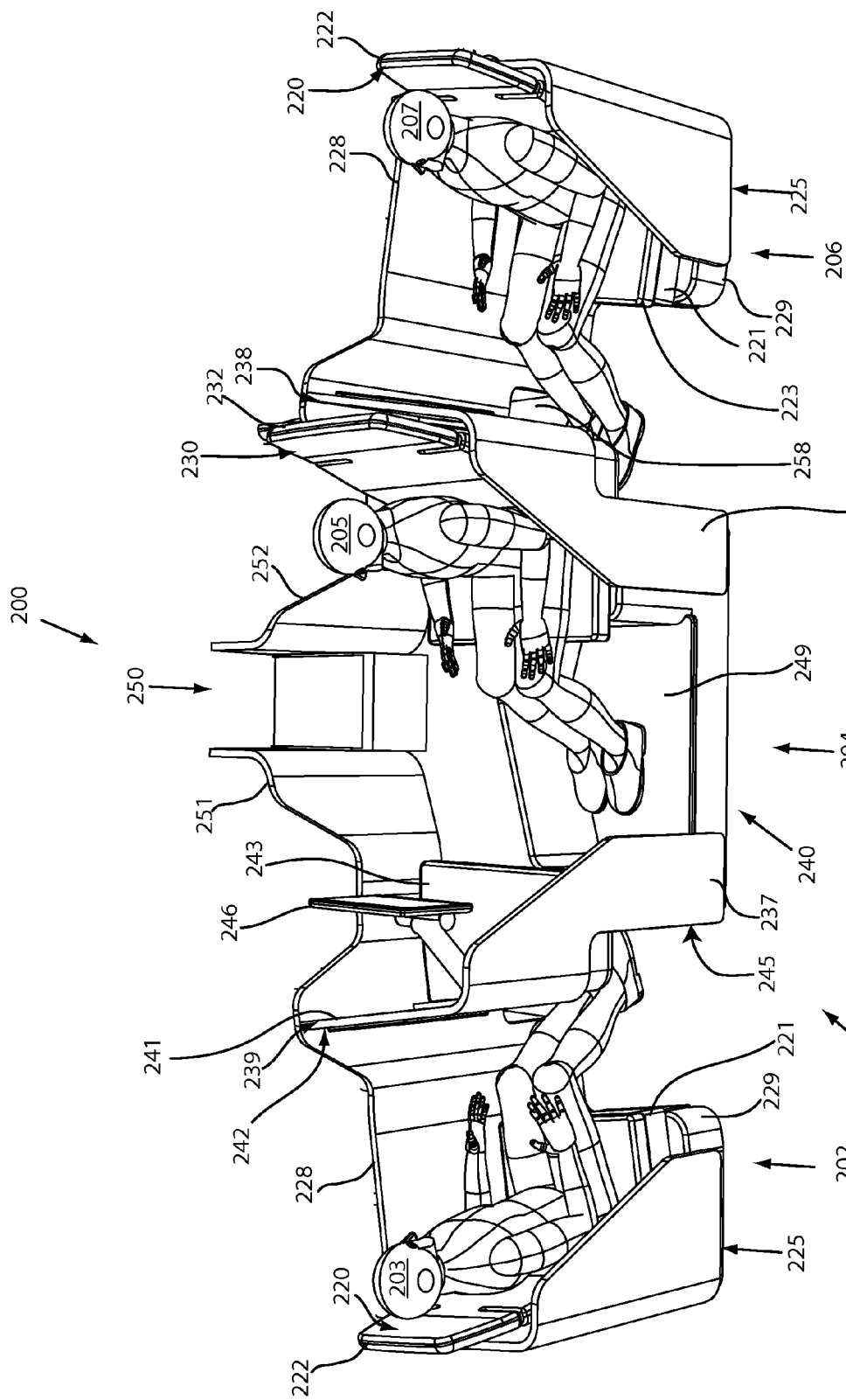
FIG. 2A depicts an example 3-seat group arrangement, with seats in an upright position.
Figure 2B:
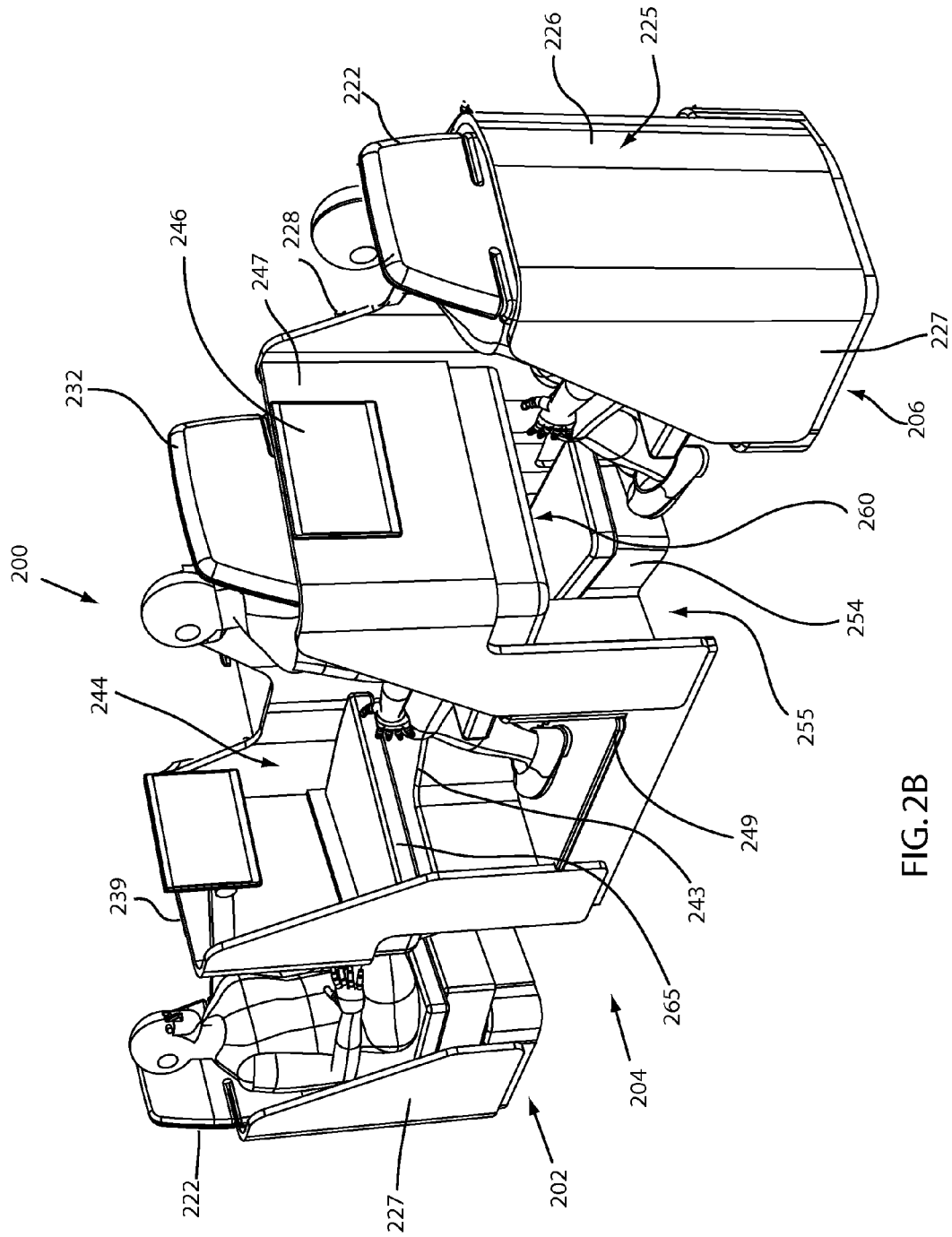
FIG. 2B depicts an example 3-seat group arrangement, with seats in an upright position.

FIGS. 2A-C show an example embodiment 200 having a three-seat grouping 201 that includes a lower aft-facing seating assembly 202, for accommodating a first passenger 203, an upper seating assembly 204 for accommodating a passenger 205, and a lower fore-facing seating assembly 206 for accommodating a passenger 207. The upper seating assembly 204 is positioned between the lower aft- and fore-facing seating assemblies 202, 206, forming an L-U-L arrangement. The spacing of the lower seating assemblies 202, 206 from the upper seating assembly is configured to provide sufficient leg room for the passengers 203, 205, 207 when in a sitting position, while allowing underlapping in the sleeping position. By way of example, but not limitation, the three seat-grouping 201 can be arranged so that the upper seating assembly can be fore-facing.

A line L (FIG. 2C, D) is shown parallel to the linear dimension of the upper seating assembly 204, effectively representing a longitudinal axis for the seating assembly 204. The arrow A indicates the orientation of the lower aft-facing seating assembly 202 at an angle θ with respect to the line L. Similarly, arrow B shows the orientation of the lower fore-facing seating assembly 206 at an angle φ with respect to the line L. To further point out the angled relationship, a hinge line 275 for the lower seating assembly 204 is perpendicular to the arrow A, representing longitudinal axis of the lower seating assembly 202, and is therefore not perpendicular to the longitudinal axis for the upper seating assembly 204. Likewise, the hinge line 277 for lower seating assembly 206 is perpendicular to the arrow B, but not the arrow L. In an exemplary embodiment, the angles θ and φ are equivalent, providing symmetry to the three-seat configuration 200. Values for the angles θ and φ can vary, typically, but not limited to, the range from 0° to 10°, but it has been found 10° is a desired value, as it efficiently balances space utilization, seating density and passenger comfort and allows for convenient ingress and egress of adjacent passengers as discussed in more detail below. With the angled lower seating assemblies 202, 206, the 3-seat grouping 201 can have a shorter overall length than a configuration in which the lower seating assemblies 202, 206 and the upper seating assembly 204 are linearly aligned, thus conserving precious passenger cabin space within a vehicle.

The lower aft-facing seating assembly 202, and lower fore-facing assembly 206 each comprise a lower seat 220 and lower support shell 225. The lower seat 220 includes a seat base 221 for supporting the legs and buttocks of a passenger, and a seatback 222 coupled to the base 221 to support a passenger's back. In an example embodiment, the seat base 221 can be topped with a seat cushion 223. The lower seat 220 is convertible between a sitting position in which the seatback 222 is generally upright (FIG. 2A) and a sleeping position in which the seatback 222 is generally horizontal, as shown in FIG. 2C. In an exemplary embodiment the seatback 222 can be attached to the seat base 221 at a pivot point. The seat base 221 can be configured to move forward to allow the seatback 222 to be lowered to a lie-flat position. The lower seats 220 in lower aft- and fore-facing seating assemblies 202, 206 can form a lower bed 220' in a lower horizontal plane when fully reclined.

The lower support shell 225 can include an endwall 226, a first sidewall 227, and a second sidewall 228. The lower support shell 225 can secure and support the seat 220, provide privacy to the passenger 203, and can be configured to allow easy ingress/egress to the lower seat 220. The lower support shell 225 can include a base support 229 for supporting the seat base 221 and a reclined seatback 222.

The upper seating assembly 204 can comprise an upper seat 230, and an upper footrest support assembly (FSA) 240. The upper FSA 240 provides support for the upper seat 230, as well as privacy for the passenger 205. The upper seat 230 comprises a seat base 231 for supporting the legs and buttocks of the passenger 205 when the seat 230 is in an upright position, and a seatback 232 coupled to the seat base 231 to support a passenger's back. A seat base can be embodied as or topped by a seat cushion. The upper seat 230 is convertible between a sitting position in which the seatback 232 is generally upright (FIG. 2A), and a generally horizontal sleeping position in which the seatback 232 is generally horizontal, as shown in FIG. 2C. When fully reclined, the upper seat 230 in upper seating assembly 204, can form an upper bed 230' in an upper horizontal plane. When reclined, as shown in FIG. 2C, a portion of the beds 220' underlap a portion of the FSA 240. The degree of underlapping allows the passengers 203, 207 to fully recline in a sleeping position while their heads remain in open space uncovered by any seating structure.

In an example embodiment, the FSA 240 can be in the form of a shell that can include a first sidewall 236, a first end wall 238 and a base support 233. The sidewall 236 and end wall 238 can provide privacy for the passenger 205. The base support 233 can support the upper seat 230 in an upright or reclined position. In an example embodiment, the first end wall 238 can be arranged to proximate or abut the second sidewall 228 of the lower support shell 225. A divider assembly 250 can include a first privacy wall 251 and a second privacy wall 252 with a storage compartment 253 disposed therebetween. The divider assembly 250 can be positioned to separate the seating assembly 204 from adjacent seating, giving additional privacy to the passenger 205, and further providing seating level storage to him. In an exemplary embodiment the divider assembly 250 is configured to abut the FSA 240 seating assembly 204 and/or the lower support shells 235. However, it is contemplated that the divider assembly 250 could connect to one or more of the seating assemblies 202, 204, 206. In addition, it is contemplated that an example divider assembly could have extended privacy walls that function as sidewalls for the lower support shells 225.

The upper seating assembly 204 can provide the seat 230 in a raised position in relation to the vehicle floor and relative to the lower seats 220. The FSA 240 can include an elevated floor board 249 that can support a passenger's feet when the upper seat 230 is in an upright position. The FSA 240 can include a second sidewall 237 and a second endwall 239. The space between the upper seat 230 and the FSA 240 second endwall 239 can provide legroom for the passenger 205 occupying the upper seat 230, and access for entering and exiting the seating assembly 204. When the upper seat 230 is reclined in a lie-flat position, the feet of the passenger 205 can be supported by a footrest 243. The footrest 243 can be configured to provide a resting surface in generally the same horizontal plane as the bed 230 and can embodied as a cushion or be topped by a cushion. In an example embodiment, the endwall 239 can be angled or oriented with respect to the sidewall 237 so that a footwell 244 is narrower than the seat 230. In an example embodiment, the footrest 243 can extend into the footwell 244. In an exemplary embodiment, there is a relationship between the angling of the lower seating assemblies 202 and the angling of the endwall 239. Similarly, in an example embodiment, the first endwall 238 of the FSA 240 can be angled with respect to the first sidewall 236. The angling of the endwall 238 can be related to the angling of the lower seating assembly 206.

An upper sleeping berth can be formed by the combination of the bed 230' and the footrest 243. Due to angling of the endwall 239, an upper sleeping berth can be longer on the side with the footwell 244, proximate the divider assembly 250, than on the side proximate the sidewall 237. In an example embodiment, the footwell 244 can be narrower than the seatback 231 and/or the seatbase 232, encouraging passenger 205 to sleep on the side of the bed 230' that allows his feet to extend into the footwell 244. Angling of the endwall 239 can provide more headroom on the same side of the berth as the footwell, further encouraging a passenger to sleep on the side with the footwell. With the angling of the lower seating assemblies 202, 206 and a footwell 244 that is narrower than the seat 230, the passenger 205 can be provided a sleeping berth that is narrower at the passenger's feet than at his head. In an example embodiment, there is a relationship between the configuration of the footwell 244 and the angling of one or both the lower assemblies 202, 206.

Similarly, angling of the lower assemblies 202, 206 in relation to the upper seating assembly 204 can form a footwell 260 associated with the lower assembly 206, and a similar footwell (not shown) for association with the lower assembly 202. A lower leg rest 248 (FIG. 3A) can be disposed for association with the lower seat 220 when it is reclined in a lie-flat position to form a bed 220'. The lower leg rest 248 can be configured to provide a resting surface in generally the same horizontal plane as the bed 220' and beneath the footrest 243 of the FSA 240. As shown in the figures, a portion of the beds 220' underlap a portion of an upper sleeping berth formed by the bed 230' and the footrest 243. In addition, a storage area 245 can provide floor-level storage for the passenger 203. A legrest 254 can be provided to support the feet of passenger 207 when the lower seat 220 of the lower seating assembly 206 is configured in a lie-flat position. The legrest 254 can be configured to provide a resting surface in generally the same horizontal plane as the bed 220'. In an example embodiment, the legrest 254 can be topped by a cushion 265. In addition, a storage area 255 can provide floor-level carry-on storage to the passenger 207 at seating assembly 206. The relationships between the dimensions of the lower seats 220 and upper seat 230 and lower legrests 254 and upper legrest 243 and the spacing between seats and legrests can lead to varying degrees of underlapping of the FSA 240 and seat 230 by the lower aft-facing and fore-facing seats. In an exemplary embodiment the lower legrests for opposing lower seats are proximate each other at the FSA 240 to conserve space in the linear dimension. In an example embodiment one or both lower beds 220' can underlap the bed 230'.

The FSA 240 can provide separation and privacy between the passenger 205 and the passengers 203 and 207. In addition, it can provide a surface for mounting displays, trays, pockets, safety equipment, etc. For example a first surface 241 of the endwall 239, can be used for mounting an entertainment center 246 for the passenger 205. An opposing surface 242 of the endwall 239, facing the lower seating assembly 202, can be used to mount an entertainment center 246 for passenger 203. Similarly, the endwall 238 can provide a surface 247 for mounting displays, trays, pockets, safety equipment, etc. For example, an entertainment center 246 for passenger 207 can be mounted on the surface 247. Electrical connectivity can be provided between the three seating assemblies 202, 204, 206 to facilitate use of in-flight entertainment systems, such as the entertainment center 246 for the three passengers 203, 205, 207.

Figure 2D:
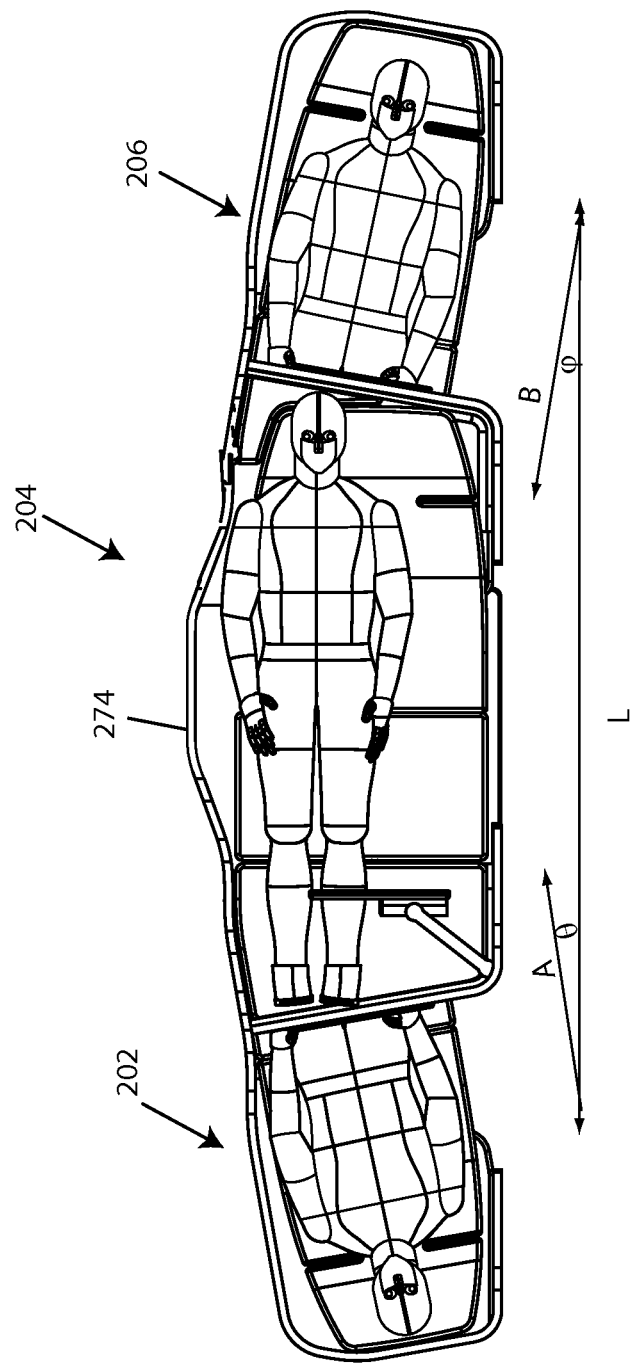
FIG. 2D depicts an example 3-seat group arrangement with seats in a lie-flat position.
Figure 2E:
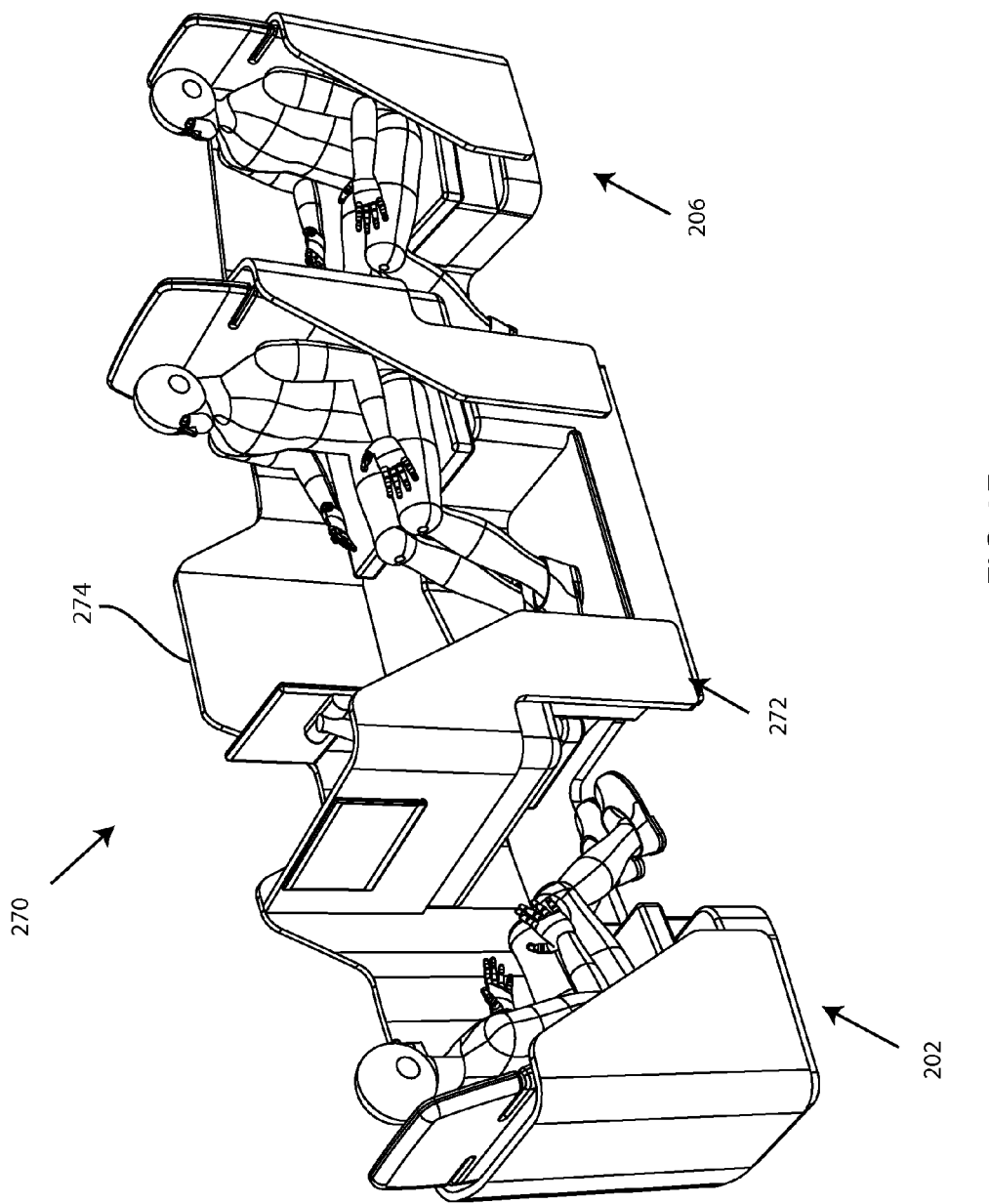
FIG. 2E depicts an example 3-seat group arrangement.

The FSA 240 can be arranged to proximate or abut the second sidewall 228 of the lower support shell 225. It can also be configured to proximate or abut a privacy wall 255 that separates the seating assembly 204 from seating assemblies of other passengers. In a further embodiment an FSA can be configured to connect to the second sidewall 228 and/or the divider assembly 250. A storage compartment 253 can be positioned between the two privacy walls 251 and 252 to provide seating level storage for the upper passenger 205. Alternatively, as shown in FIGS. 2D, E, an FSA can include an FSA panel 274 to provide privacy for an upper passenger and define an upper compartment comprising the raised upper seat 230.

Figure 3A:
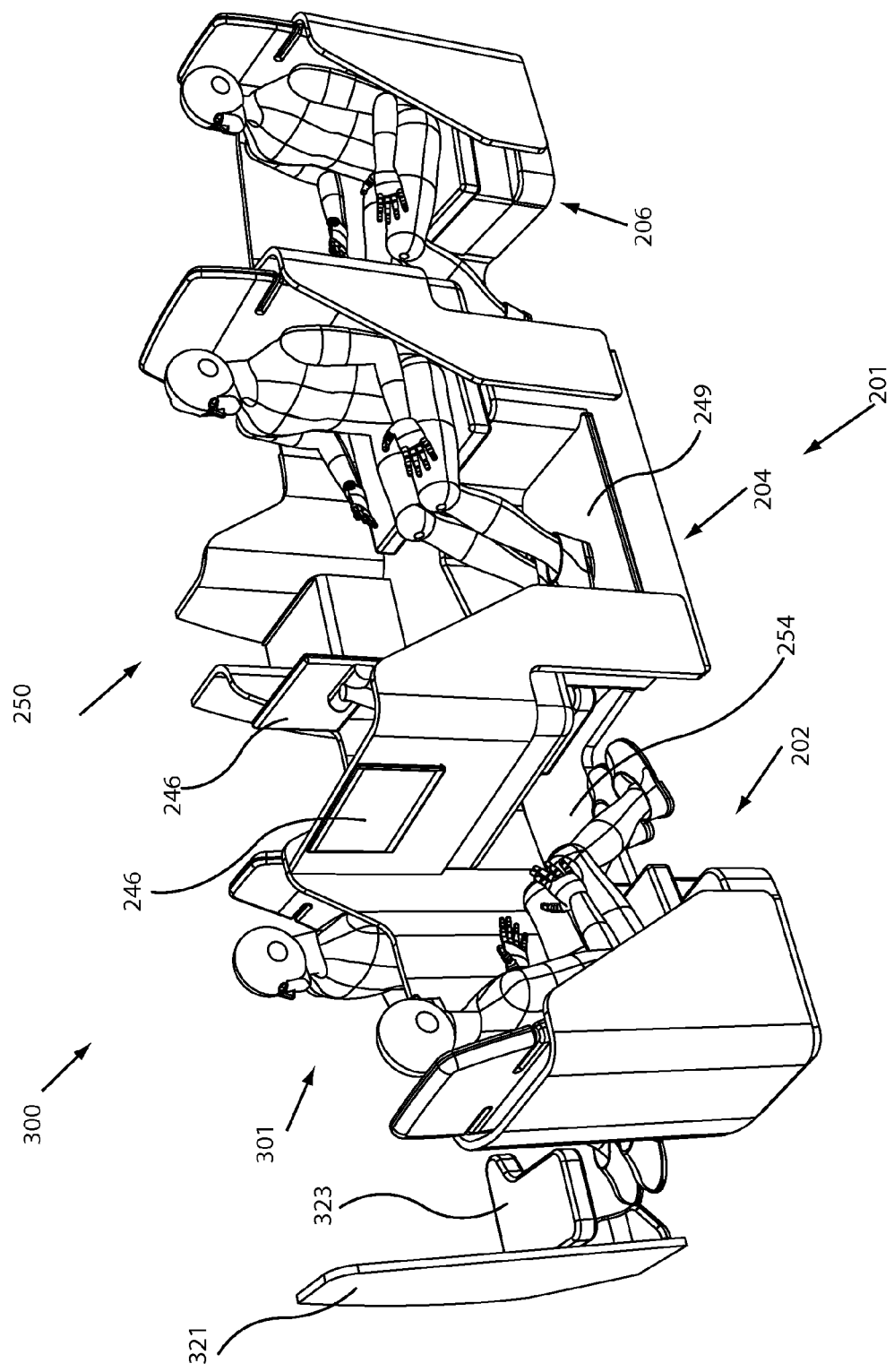
FIG. 3A depicts an example 4-seat grouping arrangement with 3-seat grouping in foreground and seats upright.

An example seating arrangement can include a three-seat L-U-L grouping combined with one or more variously configured seat groupings; for example, a three-seat L-U-L grouping can be arranged with one or more single seats or multi-seat groups. In an exemplary embodiment one or more adjacent, non-underlapping seats can be arranged with a three-seat grouping. FIGS. 3A-3E show an example arrangement comprising a three-seat grouping adjacent additional seating. FIG. 3A shows an example 300 comprising the 3-seat grouping 201 adjacent a lower seating assembly 301. The divider assembly 250 can be used to provide separation from the seating assembly 301 and a storage compartment 253 for use by an occupant of upper seating assembly 204.

FIGS. 3B-F show a 5-seat grouping 305 that includes the 3-seat grouping 201 and a two-seat grouping 302. The two-seat grouping 302 includes an adjacent non-underlapping lower fore-facing seating assembly 304, and an adjacent non-underlapping lower aft-facing assembly 306. The divider assembly 250 can be disposed between the adjacent non-underlapping fore-facing and aft-facing seating assemblies 304, 306 to provide separation between the upper assembly 204 and the non-underlapping lower assemblies 304, 306, and storage space for the passenger 205 in the three-seat grouping 201.

The adjacent non-underlapping lower aft-facing and fore-facing seating assemblies 304, 306 can include a seat 310 convertible to a lie-flat position, and a support platform 316 on which the seat 310 can be mounted. The seat 310 can include a seatback 312 for supporting a passenger's back and a seat base 314 for supporting a passenger's buttocks and legs. In an example embodiment the seat base 314 can be embodied as, or topped by, a seat cushion. The support platform 316 can include a leg support panel 318 that can be extended from a lowered position (FIG. 3D) to a raised position (FIG. 3E) to support a passenger's legs when the seat 310 is in a horizontal position. In a lie-flat position, the seatback 312 can be lowered to rest on the support platform 316, and the leg support panel 318 can be raised to a generally horizontal position, so that the seatback 312, seatbase 314 and leg support panel 318 can form a bed 310'. A storage area 340 can be provided to accommodate carry-on items of a passenger in a seating assembly 304 or 306.

In this example embodiment, the adjacent non-underlapping aft-facing and fore-facing seating assemblies 304, 306 are arranged parallel to the upper seat, for example, in the linear direction of the airplane. When placed adjacent to the respective fore-facing 206 and aft-facing 202 lower seating assemblies of the three-seat grouping 201, an access/entryway 330 is provided therebetween for access to seating assembly 304, and an access/entryway 332 for access to seating assembly 306. Access is further provided due to the fact that the end of the lower seating assemblies 304, 306 extend further than the angled seating 202, 206. Furthermore, a footrest for the lower seating assemblies 304, 306 may be of a lesser width than the back portion of the seats, or shaped so as to allow easy entry. In addition, the footrest may be movable between a stowed position and a support position to allow better access to a passenger seating or compartment.

An integral privacy panel/footrest 320 can include a privacy panel 321 that can shield a passenger seated in the seat 310, a panel base 322 for supporting the privacy panel 321, and at least one footrest 323 for supporting the feet of a passenger. In an example embodiment, the footrest 323 is disposed in generally the same horizontal plane as the bed 310'. In an exemplary embodiment, a first footrest 323 is provided on a first side of the privacy panel 321, and a second footrest 323 is provided on an opposing side to support the legs of a passenger facing the opposing side, so that the integral privacy panel/footrest 320 can be shared, for example by two two-seat groupings 302. The footrest 323 can be embodied as or topped with a cushion. In an example embodiment, the footrest 323 can be configured to swing down to provide additional entry space for a passenger seated in one of the seating assemblies 304, 306.

In an exemplary embodiment, the divider assembly 250 can serve as a sidewall, endwall or separation wall for the seating assembly 304 and/or 306, separating one or both from the three-seat grouping 201. In an exemplary embodiment, a 3-seat grouping and a 2-seat grouping can share one or more common sidewalls and/or endwalls through proximity or contact. In a further example embodiment a 3-seat grouping can be configured to connect with a 2-seat grouping to share a common wall. Separation of the integral privacy panel/footrest 320 from seating assemblies 202, 204, 206, 304, and 306 can provide sufficient distance to adequately accommodate the feet of a passenger on the bed 310' and can give passengers seated in the two-seat grouping 302 more room to enter and exit their seats.

As shown in the FIGS. 3A-3F, a three-seat grouping can be combined with additional seating to allow all passengers to sit upright or relax in a sleeping position, regardless of the positions of the other passengers. In addition, the angling of the lower seating assemblies in the three-seat grouping allows passengers in the two-seat grouping to easily enter or exit their seats without having to crawl over, pass through or otherwise invade the space of a passenger of the three-seat grouping. Furthermore, no passenger is directly facing another passenger, rather each passenger has some protected privacy. When the seating assemblies of the module 300 are converted to beds, no passenger is forced to have his/her head directly next to or underneath the feet of another passenger. Although it is possible to combine a single adjacent non-underlapping seat assembly 302 with a three-seat grouping 301, the combination of a two-seat grouping with a three-seat grouping can improve space utilization.

Figure 4A:
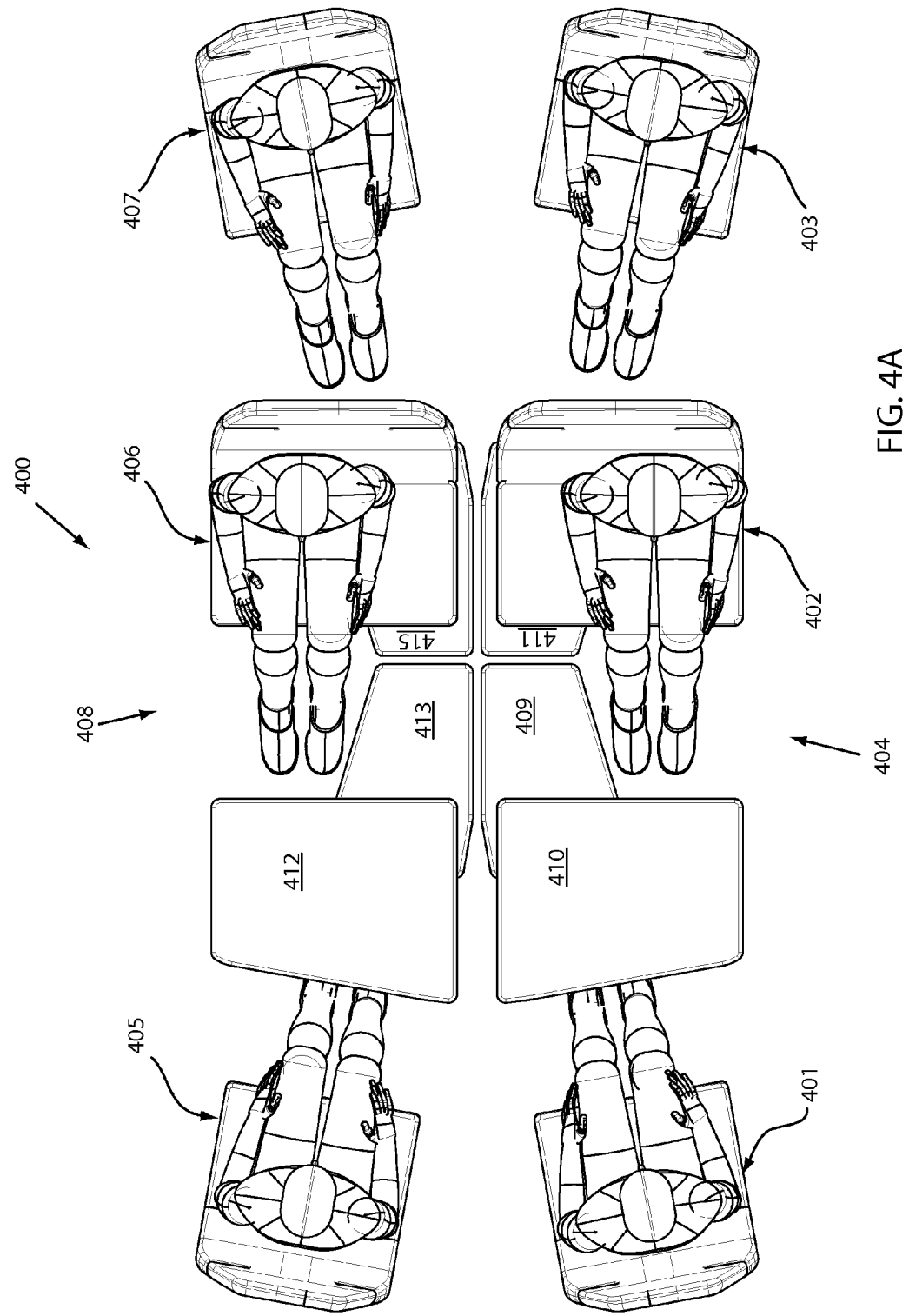
FIG. 4A shows an example six-seat seating arrangement with angled lower seating in an upright position.
Figure 4B:
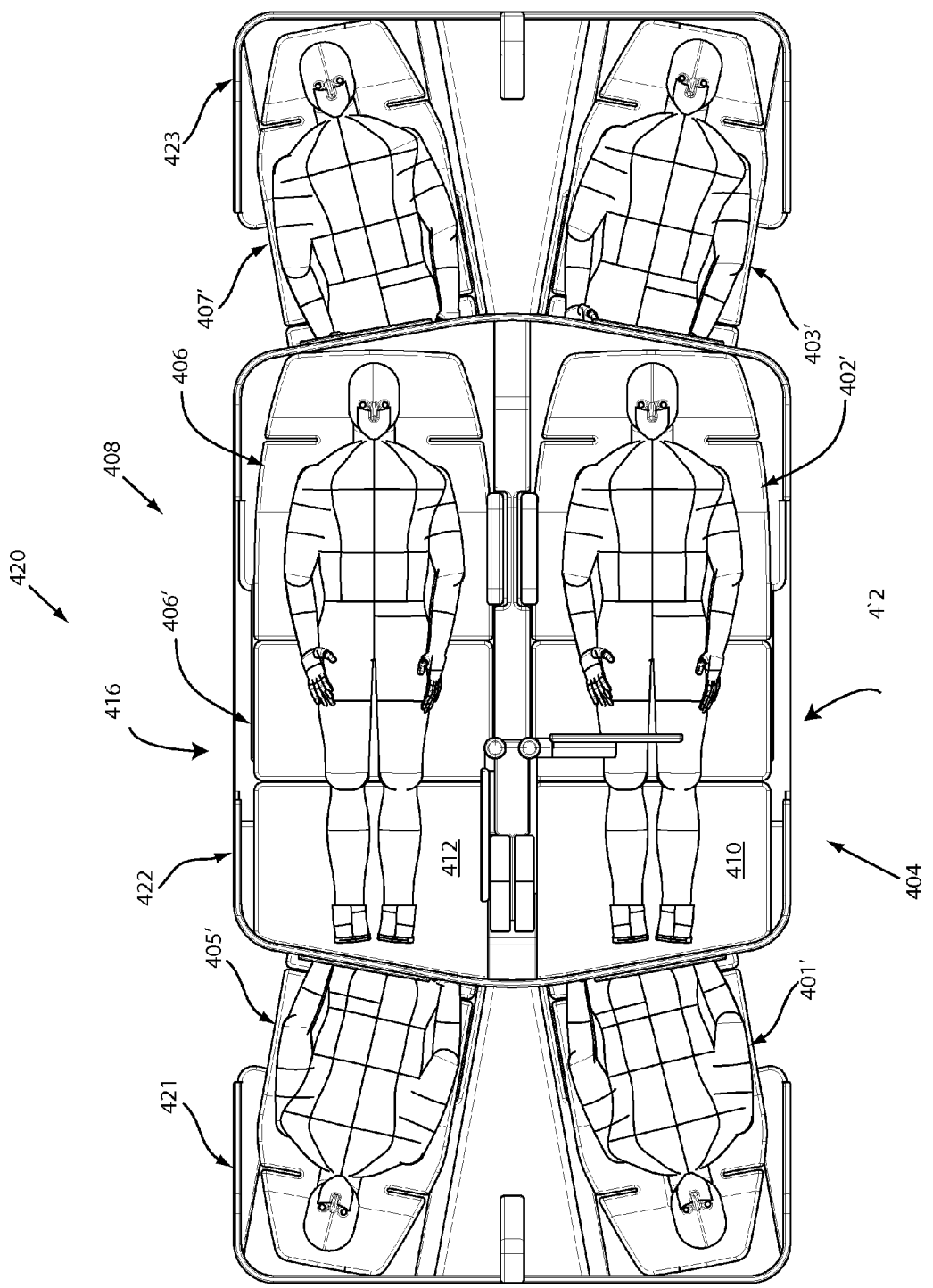
FIG. 4B shows an example six-seat arrangement in a lie-flat position.
Figure 4C:
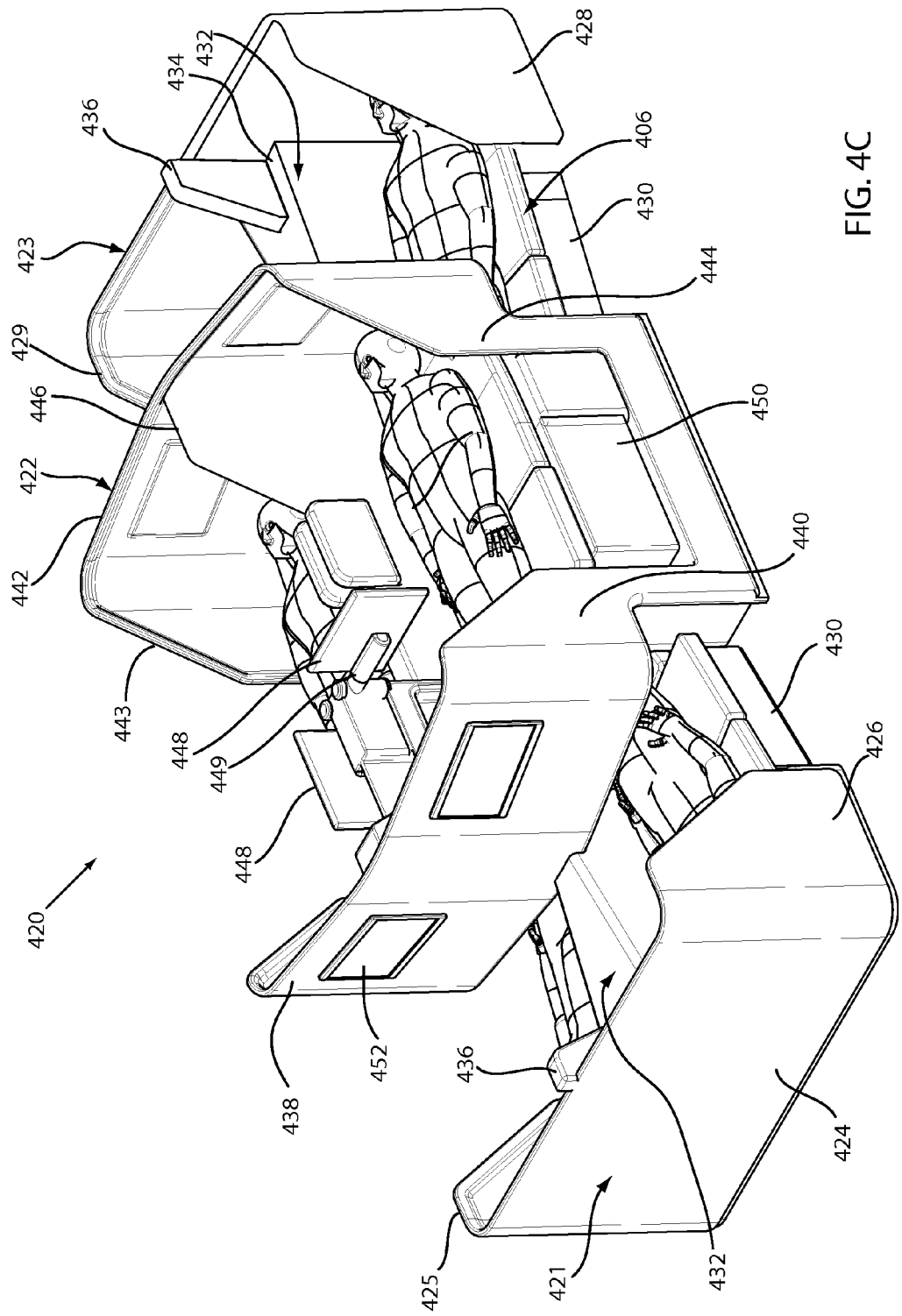
FIG. 4C shows an example six-seat arrangement in a lie-flat position.
Figure 4D:
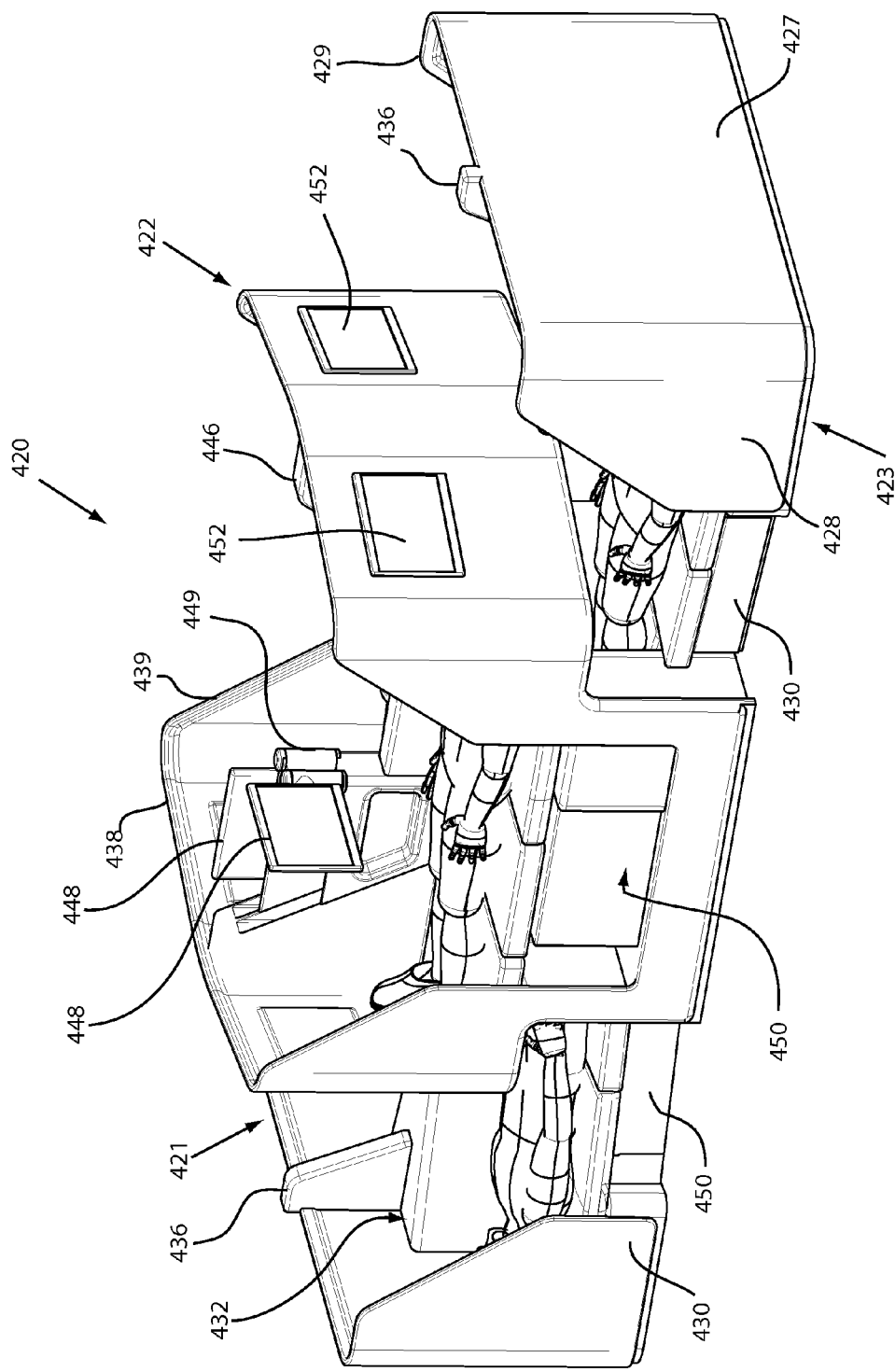
FIG. 4D shows an example six-seat arrangement in a lie-flat position.

FIG. 4A shows an example arrangement 400 in a manner in which some support structures for the upper and lower seats are not shown in order to better emphasize relational and concealed aspects. The example embodiment 400 includes a first 3-seat grouping 404, comprising an aft-facing lower seat 401, an upper seat 402, and a fore-facing lower seat 403, combined with a second 3-seat grouping 408 comprising an aft-facing lower seat 405, an upper seat 406, and a fore-facing lower seat 407 to form a 6-seat grouping in which all seats are convertible between and upright and lie-flat position. In an exemplary embodiment, the second grouping 408 is arranged as a mirror image of the first grouping 404 to conserve space while providing unobstructed ingress and egress to all passengers. As shown in FIG. 4E, the lower seats 401, 403, 405, 407 can be oriented at angles $\theta$ and $\phi$ respectively with respect to the longitudinal axis L of the upper seats 406, 408. The 3-seat groupings 404, 408 can be positioned adjacent and abutting each other. In an example embodiment, the 3-seat groupings 404, 408 can be combined to form an integral module that shares one or more structural aspects.

The lower seat 401 can be associated with a footrest 409, and the lower seat 405 can be associated with a footrest 413. The lower footrests 409, 413, can support the lower legs and feet of a reclining passenger and direct an occupant's feet to a particular side of upper footrests 410, 412, associated with the upper seats 402, 406 respectively, in a manner consistent with the angling of the seats 401 and 405. The footrest 410 can be disposed in generally the same plane as the upper seat 402 in a lie-flat position, and likewise the footrest 412 associated with the upper seat 406. The lower seat 403 can be associated with a lower footrest 411, below the upper seat 402, and the lower seat 407 can be associated with a lower footrest 415 below the seat 406. The lower footrests 411, 415 direct an occupant's feet to a side of the upper seats 402, 406 respectively, consistent with the angled relationship between the upper and lower seats 402, 406 and 403, 407 respectively. As discussed previously, angling of lower underlapping seating shortens the overall linear dimension of a seating group, and improves access to the lower seating. The foot rests 410, 412 can be shorter on one side (seat egress side) than the other, with a longer side over the foot rests 409, 413, providing additional egress room for occupants of lower seats.

FIGS. 4B-E show an example embodiment 420 of an integrated module in which seats share a common support structure. The lower seats 401 and 405 share a support shell 421, as do the lower seats 403, 407 sharing the support shell 423. The upper seats 402 and 406 can share an FSA 422. The lower support shell 421 can include an endwall 424, a first sidewall 425 and a second sidewall 426. In an example embodiment, the endwall 424 can be perpendicular to the linear dimension of the upper seats 404, 406, with the lower seats 401,405 angled with respect to the endwall 424. Likewise, the lower seats 403, 407 can be angled with respect to the endwall 427, which can be perpendicular to the linear dimension of the upper seats 404, 406. For each of the lower seats 401, 403, 405, 407, a lower seat support base 430 can be disposed to support a lower seat in both upright and lie-flat positions. A divider 432 can be disposed between the lower seats 401, 405, and between the lower seats 403, 407 to provide separation between, and privacy for, lower seat occupants. An upper surface 434 of the divider 432 can serve as an armrest for both lower seat passengers. A privacy shield 436 can be disposed to provide further separation between the personal areas of occupants of the lower seats 401, 405 and 403, 407, and additional privacy, particularly when the lower seats are reclined in lie-flat positions.

The FSA 422 can be in the form of a shell that includes a first endwall 438, adjacent a first sidewall 439 a second sidewall 440, and a second endwall 442 adjacent a first sidewall 443 and a second sidewall 444. A divider 446 can be disposed to separate and define the personal areas associated with each of the upper seats 402 and 406. An entertainment center 448 can be provided, secured to a mounting assembly 449 which can be configured to allow the entertainment center 448 to pivot from a non-viewing or retracted position (as shown associated with seat 406) to a desired viewing angle, as shown associated with seat 402. A support base 450 can support the seat 402 in both upright and lie-flat positions. A support base 450 can also be disposed to support the seat 406 in upright and lie-flat configurations. Entertainment centers 452 can be provided for the passengers seated in the lower seats 401, 405, 403 and 407.

The bed 402' and the footrest 410 can cooperate to form a berth 412 for a first upper passenger. In similar fashion, the bed 406' and the footrest 414 can cooperate to form a sleeping berth 416 for a second upper passenger. The sleeping berths 412, 416 are longer on one side than the other due to the shape of the footrests 410 and 414.

FIG. 4E, a sectional view of the arrangement 400, shows the angling of the lower seats 401, 405, 403, 407 with respect to the upper seats 402, 406. Line L represents the longitudinal axis, or linear dimension of the FSA 420. Line A represents longitudinal axis of seat 401, oriented at an angle θ with the FSA 420. Line B represents the longitudinal axis of seat 403, oriented at an angle φ with respect to the FSA 420. In like manner, line C represents the longitudinal axis of the seat 405, which is oriented at an angle α with respect to the FSA 420, and line D indicates the longitudinal axis of the seat 407, which is oriented at an angle β with respect to the FSA 420.

FIGS. 5 A, B show an example seating assembly 500 that includes a seat 502, an FSA 504, and a vertical member 506 configured to attach to the FSA 504 and extend generally vertically to attach to a ceiling structure. In an exemplary embodiment, the vertical member 506 is configured to attach to a ceiling beam 508 of an aircraft fuselage using a tie-bar 509 that connects the vertical member 506 to a tie-bar beam mounting 510 on the vehicle ceiling beam 508. The seat 502 can include a seatback 512 coupled to a seat base 514, preferably at a pivot point. The FSA 504 can include a footrest 516 that can be used in conjunction with a bed 502' to support a reclining passenger's feet, and for example form a sleeping berth. The FSA 504 can include an FSA panel 507 for privacy and separation. As shown in FIG. 5B, the presence of the vertical member 506 does not impede the seat 502 from converting to a bed 502'; nor does it interfere with a passenger's private space when in an upright or lie-flat position. The seat 502 can be disposed at an elevated height above a vehicle floor. The vertical member 506 is particularly beneficial when included in a seating assembly with a raised seat as it offers the advantage of reducing the load on the floor by dissipating some of that load to the ceiling, which can help the seating assembly 500 withstand high forces. However, it is contemplated that a vertical member could also be used with a seating assembly that provides a standard height seat. In an example embodiment, the vertical member 506 can be used to mount accessories for lighting, air, electricity, entertainment, etc.

Figure 5A:
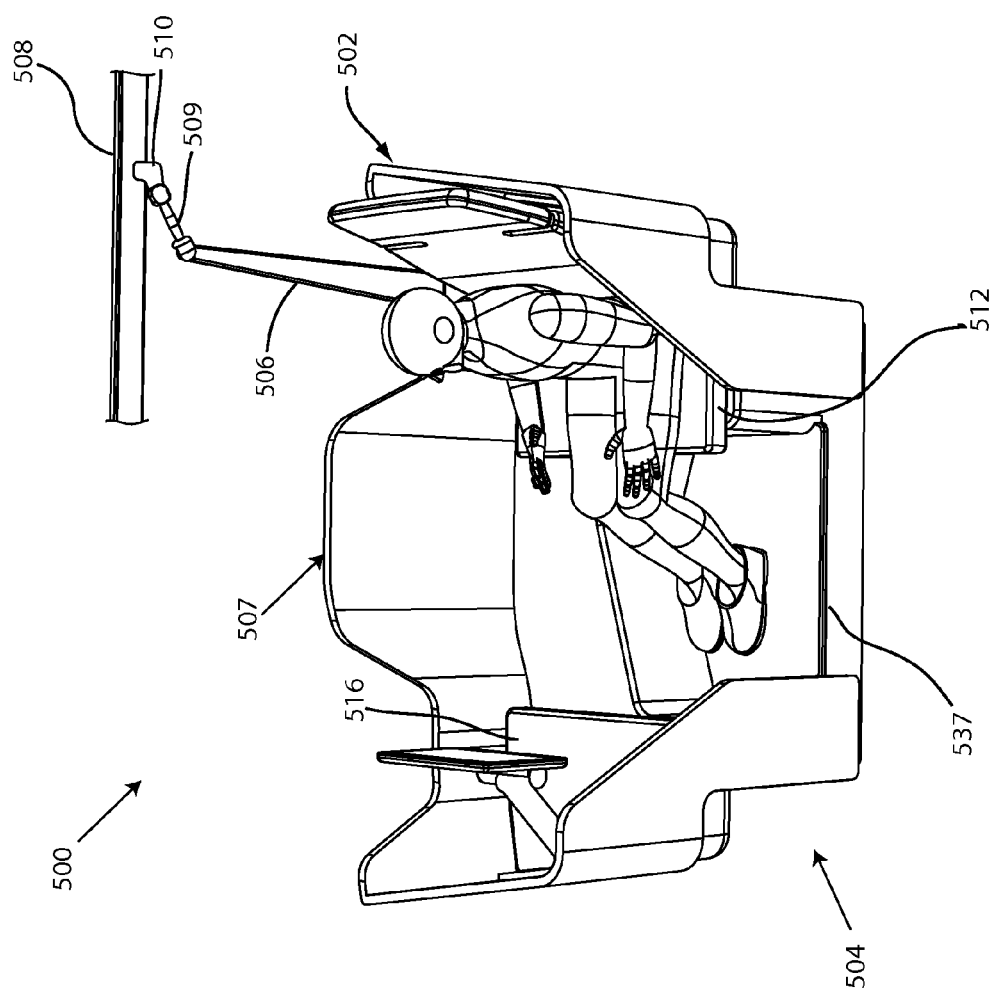
FIG. 5A shows an example seating assembly with vertical member, seat upright.
Figure 5B:
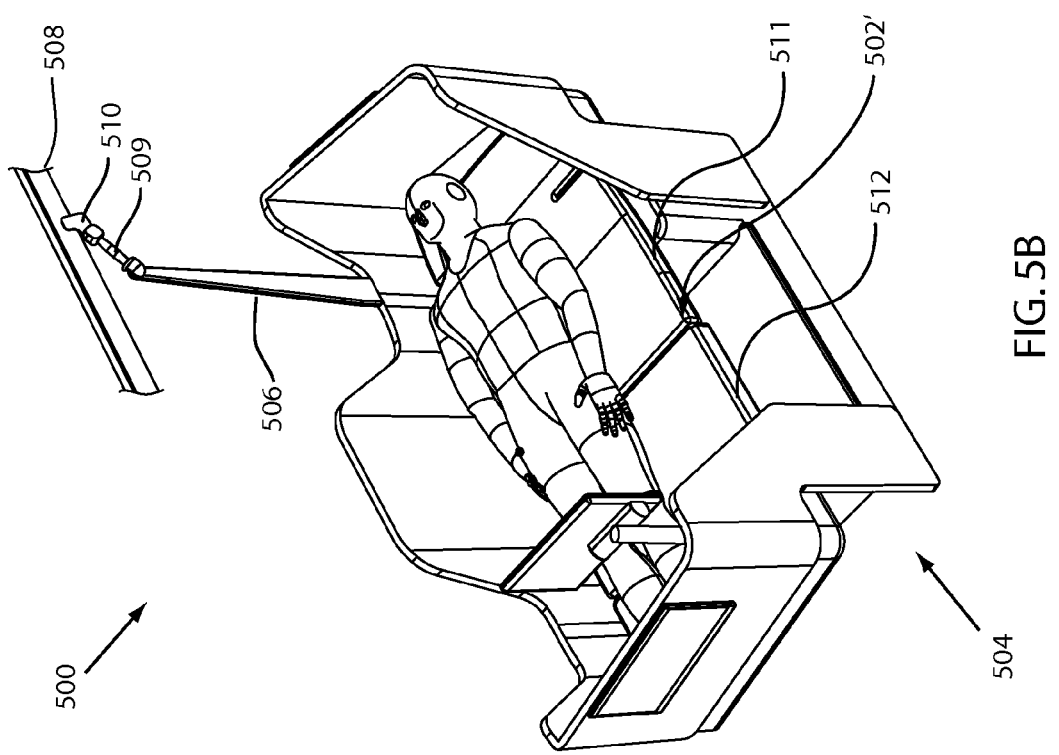
FIG. 5B shows example seating assembly with vertical member, seat in lie-flat position.
Figure 5C:
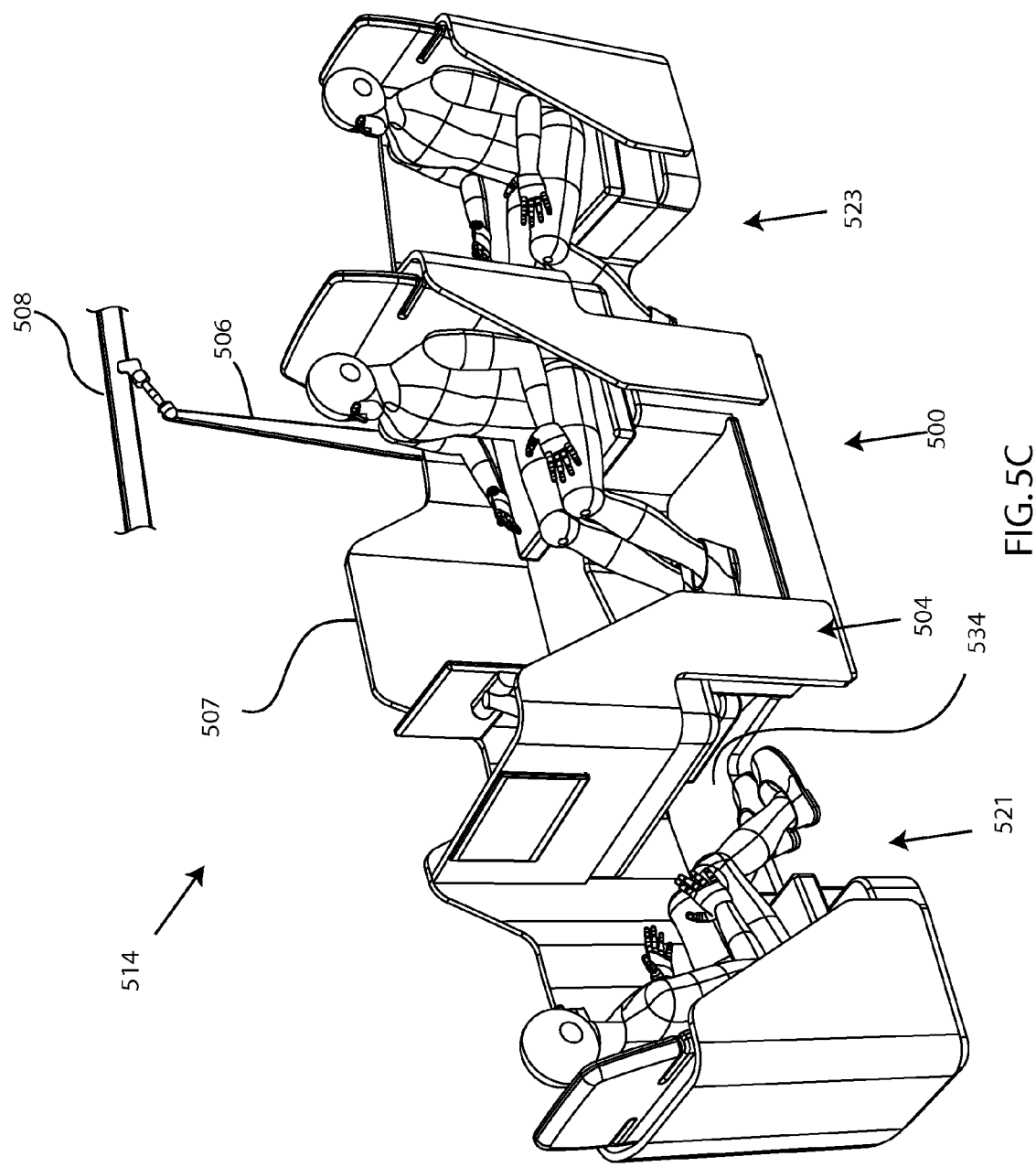
FIG. 5C shows an example seating assembly including a 3-seat grouping configured with a vertical member, in an upright position.
Figure 5D:
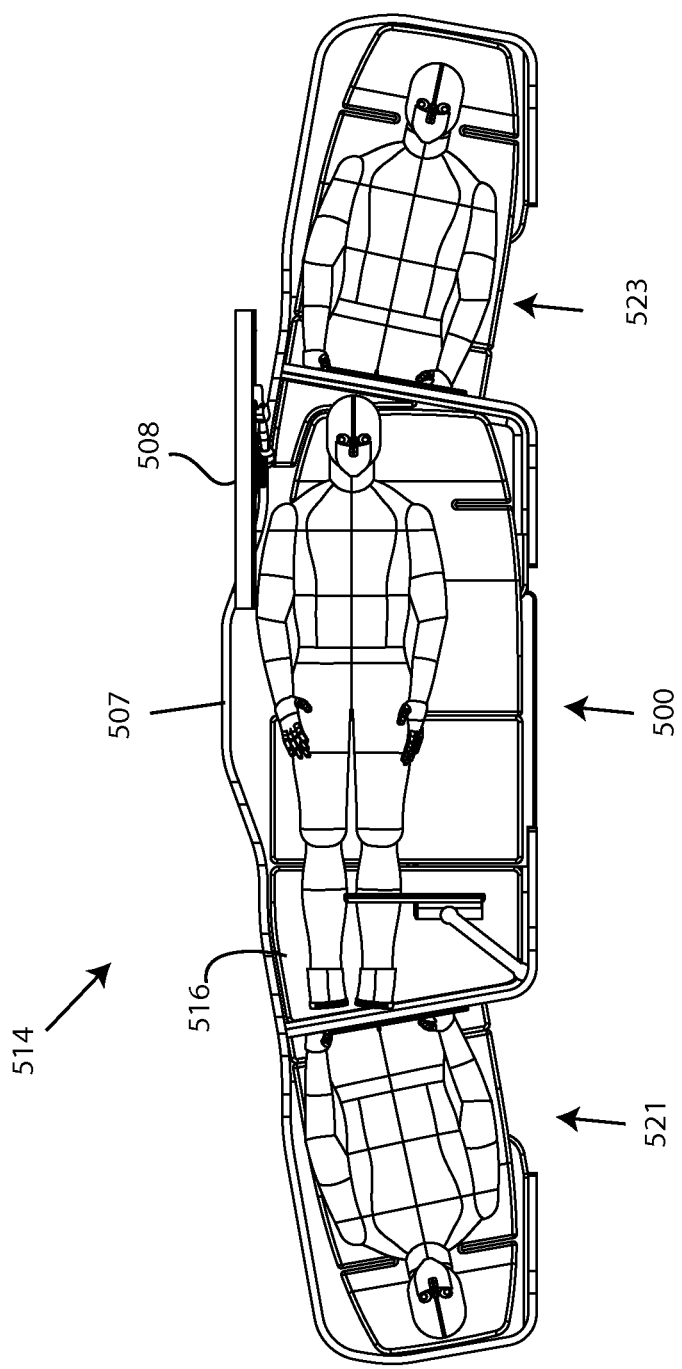
FIG. 5D shows an example seating assembly including a 3-seat grouping configured with a vertical member in an upright position with seat level storage for upper passenger.
Figure 5E:
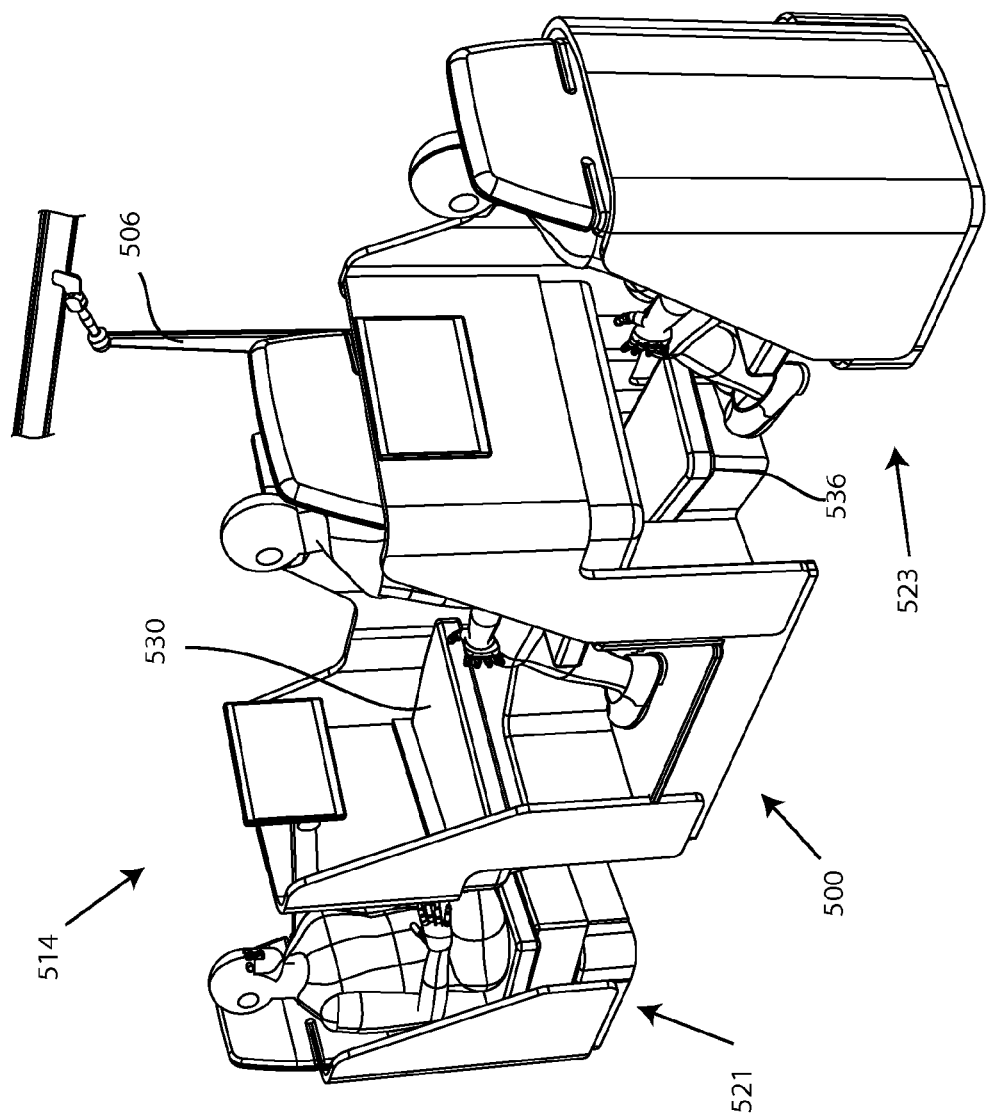
FIG. 5E shows example 5-seat grouping with vertical member, seats upright.

FIGS. 5C-5E show an example three-seat arrangement 514 in which the seating assembly 500 is combined with a lower aft-facing seating assembly 521 and a lower fore-facing assembly 523 to form an L-U-L configuration in which a portion of the seat 525 of the lower assembly 521 and the seat 527 of the lower assembly 523 underlap the seating assembly 500 when in a lie-flat position. As shown in FIG. 5C, lower aft- and fore-facing seating assemblies are angled with respect to the seating assembly 500. A footrest 534 can be disposed for association with the seating assembly 521 to support an occupant's feet in a lie-flat position. The footrest 534 can be offset consistent with the angling of the seating assembly 521. Similarly, a footrest 536 can be provided for association with the seating assembly 523.

Figure 5F:
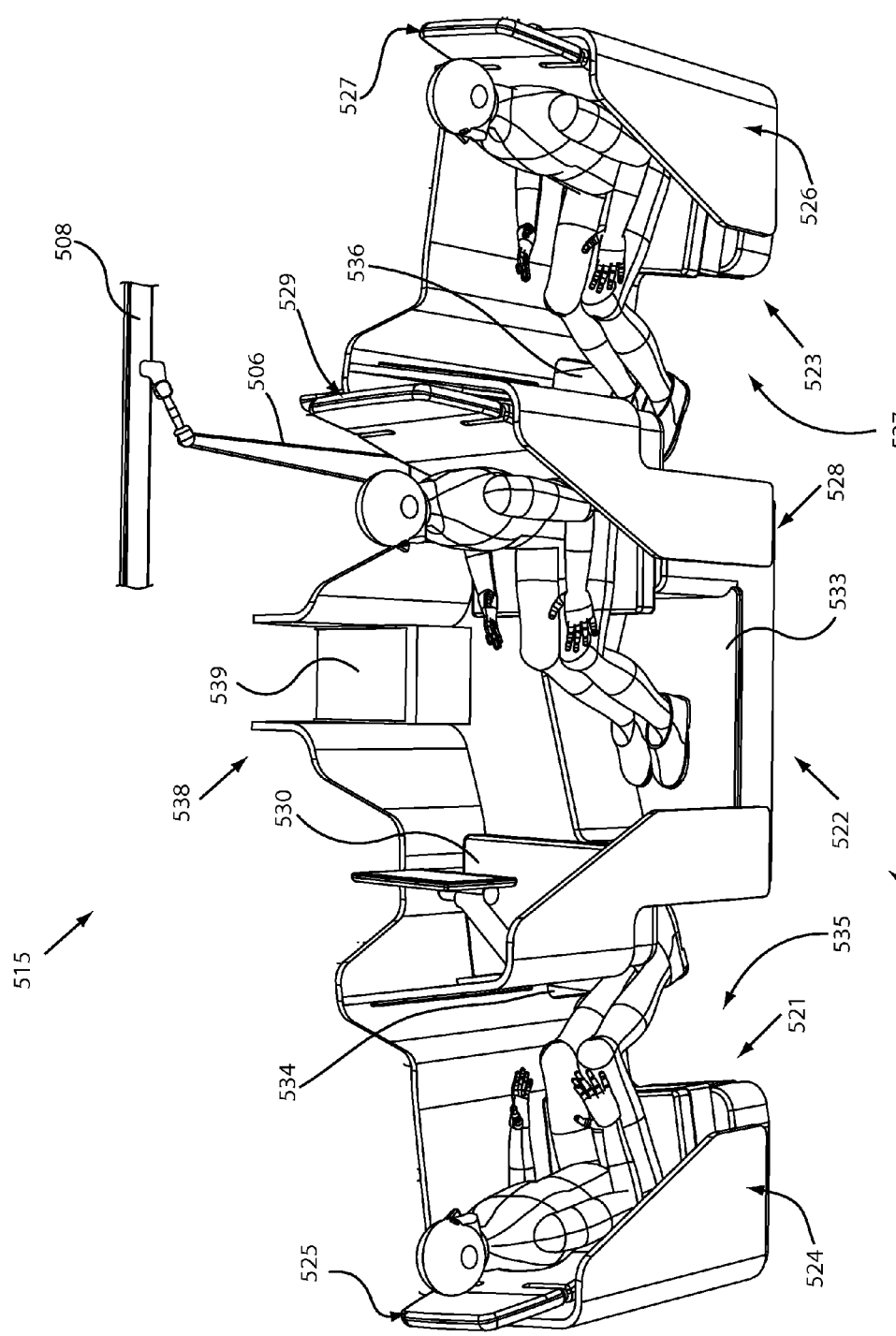
FIG. 5F shows example 5-seat grouping with vertical member, seats in an upright position.
Figure 5G:
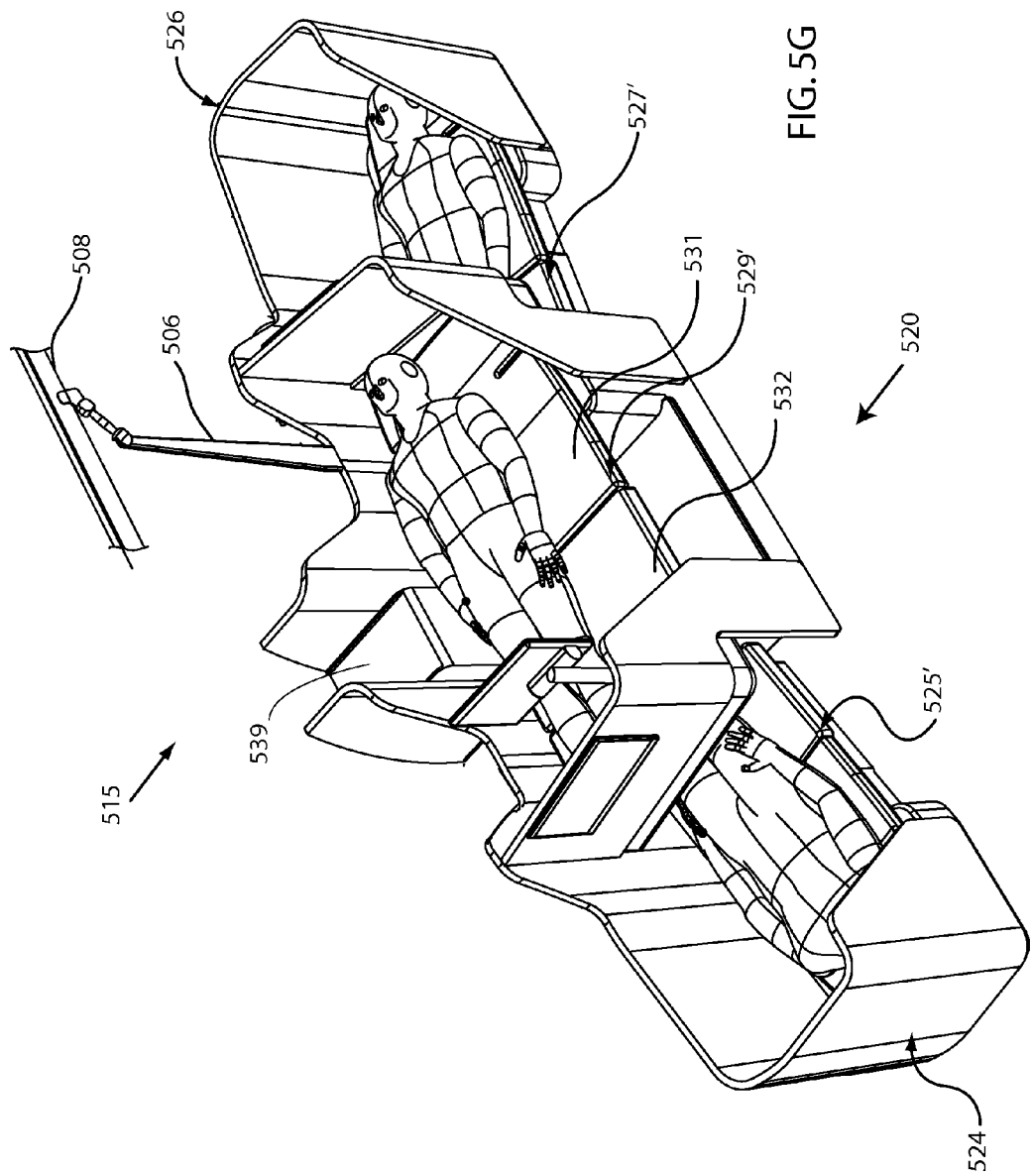
FIG. 5G shows an example 5-seat grouping with vertical member, seats in an upright position.
Figure 5H:
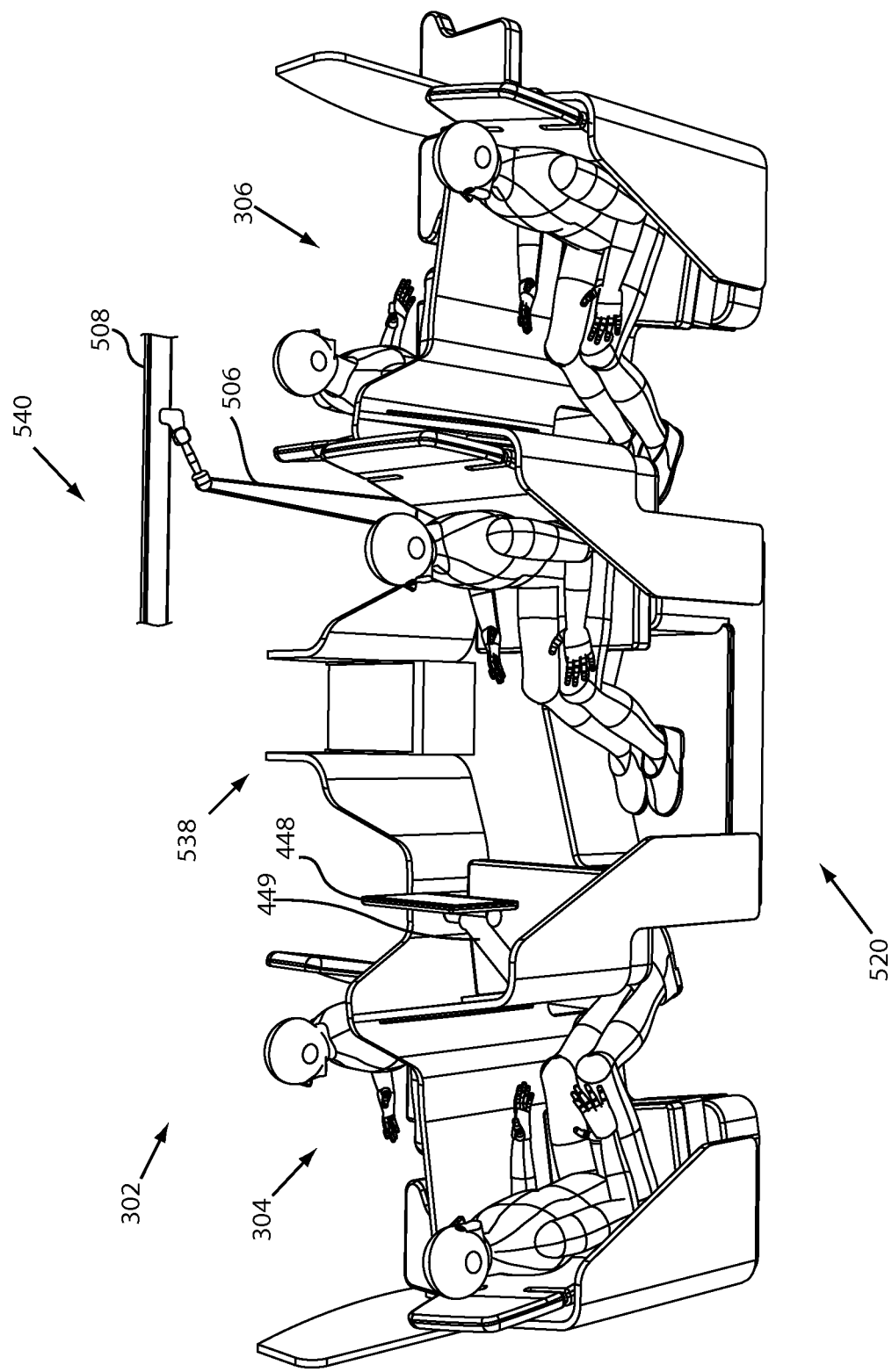
FIG. 5H shows an example 5-seat grouping with vertical member, seats in an upright position.
Figure 51:
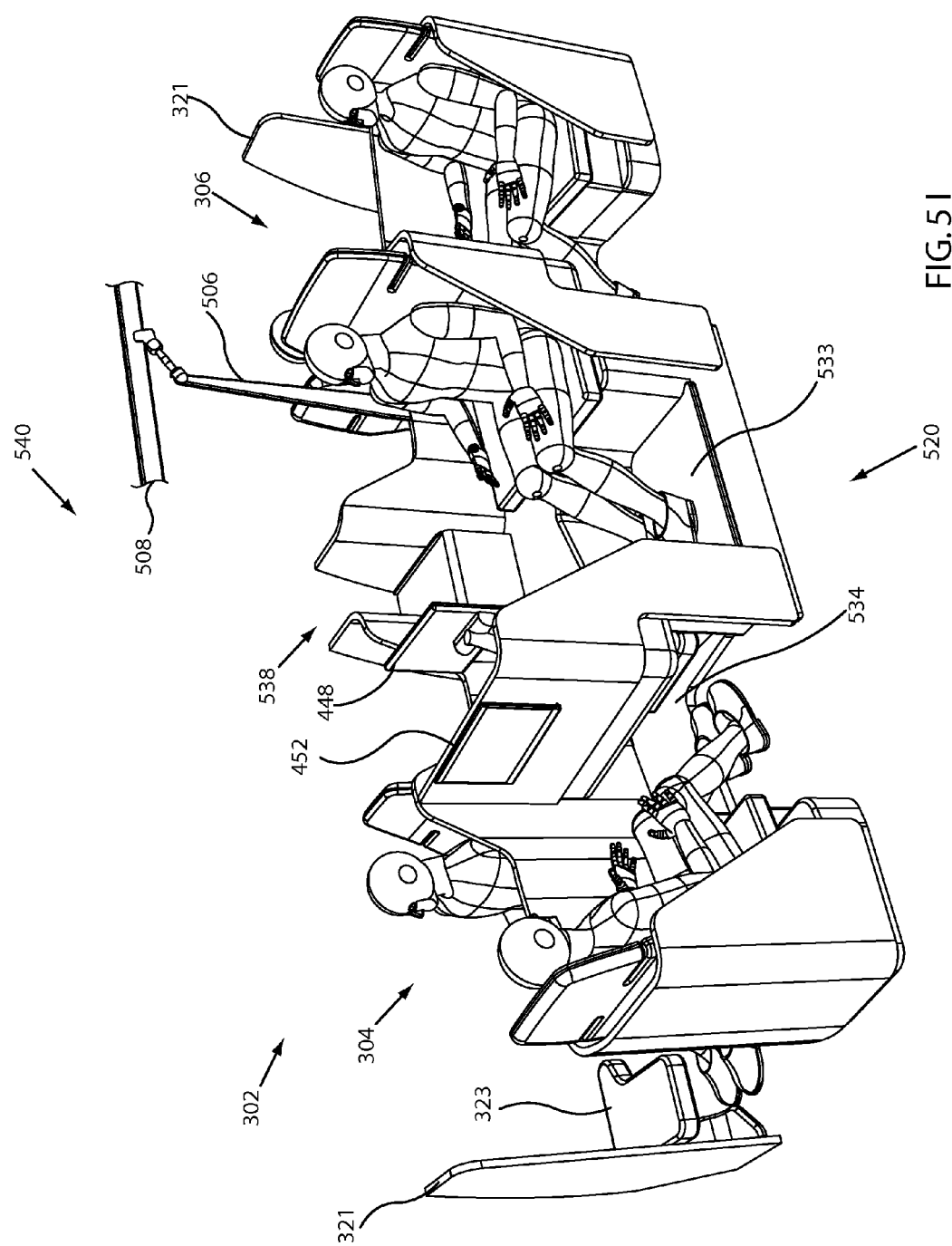
Figure 5J:
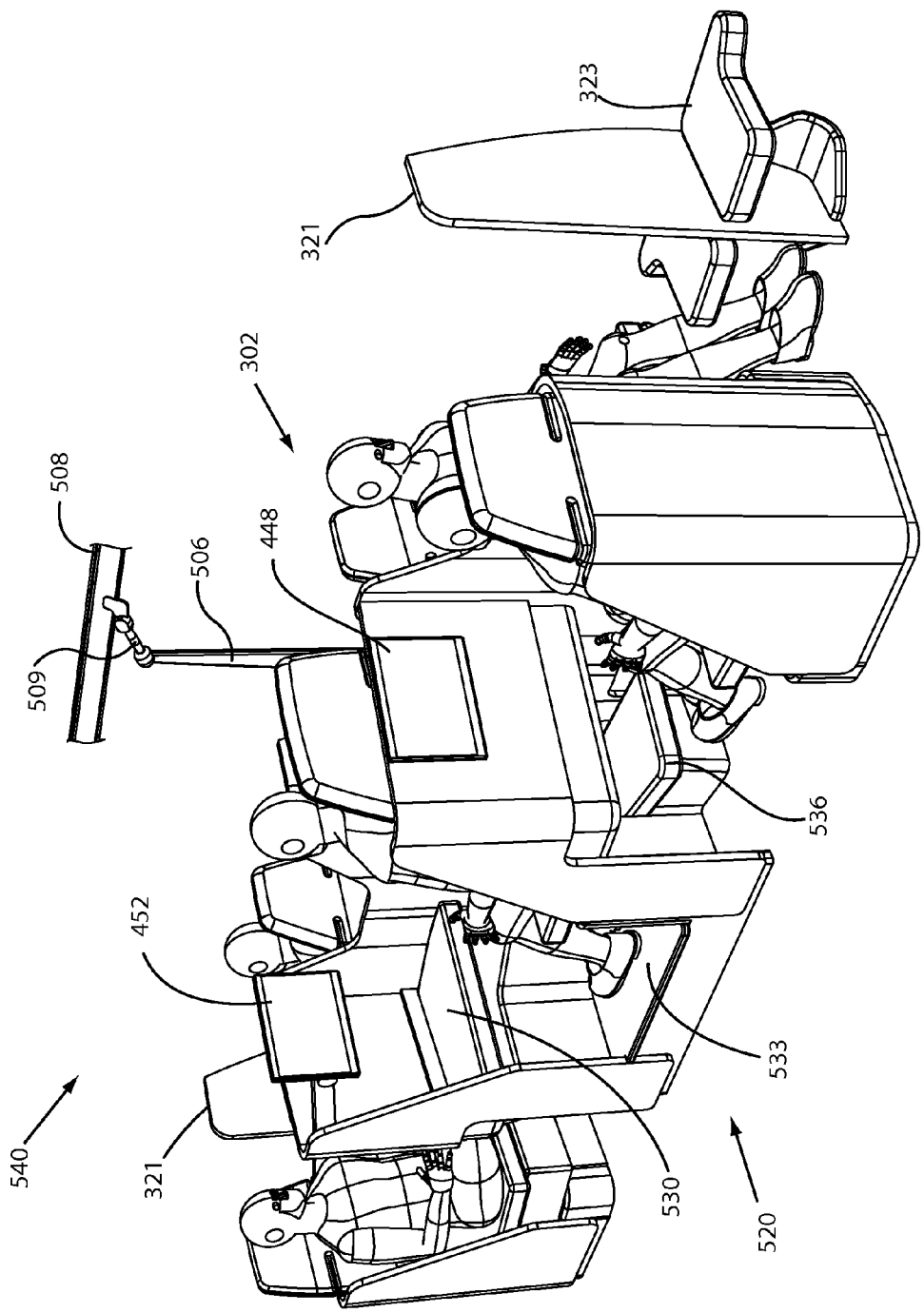
FIG. 5J shows an example 5-seat grouping in a lie-flat position.
Figure 5K:
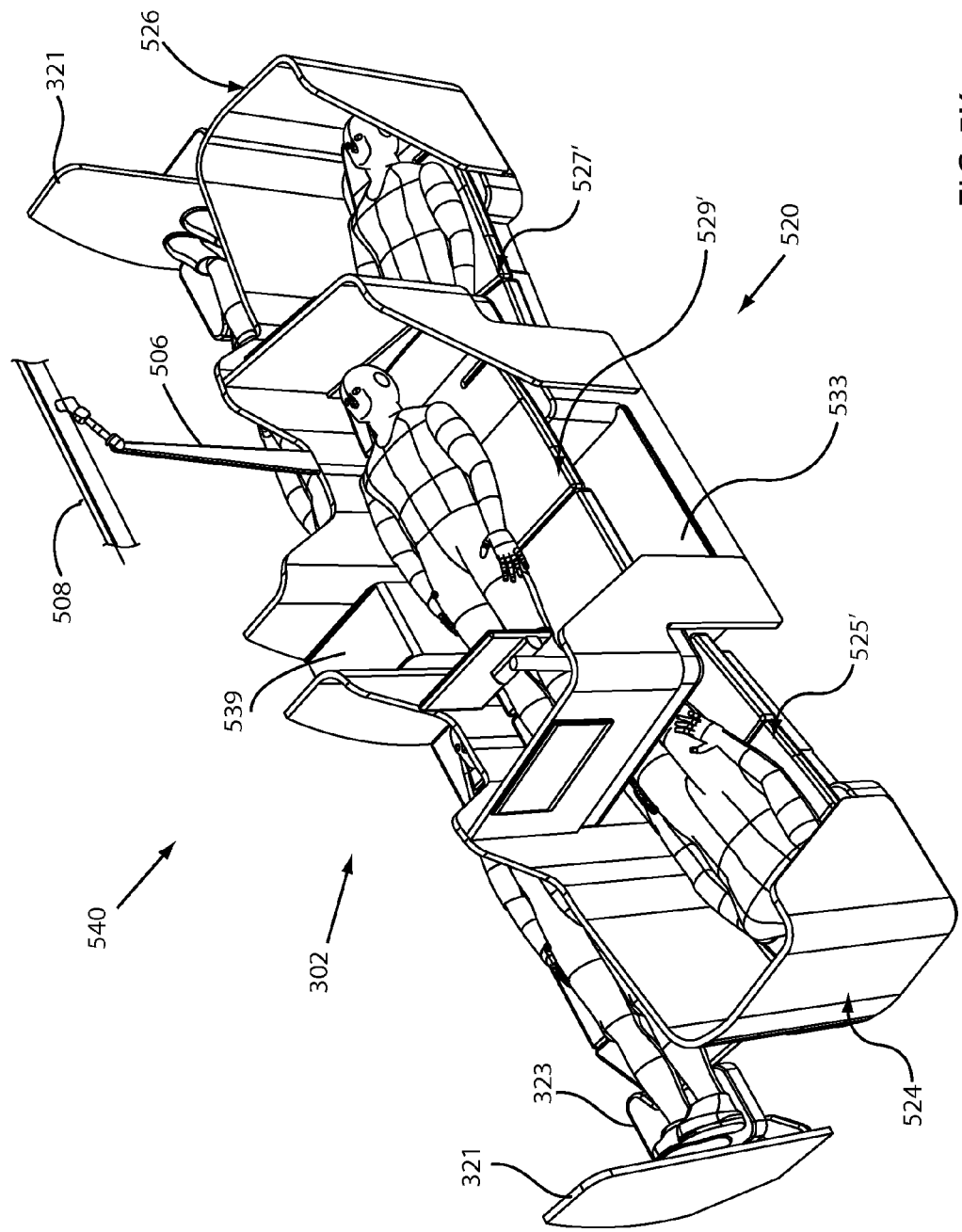
FIG. 5K shows an example 5-seat grouping in a lie-flat position.

FIGS. 5F-G depict an example arrangement 515 configured with a vertical member 506. A 3-seat grouping 520 includes the lower seating assembly 521, an upper seating assembly 522, and the lower seating assembly 523. The lower seating assembly 521 can include a seat 525 configurable between an upright and a lie-flat position, and a lower support shell 524. The upper seating assembly 522 can include an FSA 528 and the upper seat 502, convertible to a lie-flat position. The FSA 528 does not have the panel 507 but is instead arranged adjacent a divider assembly 528. The lower seating assembly 523 can include a lower support shell 526 and a lower seat 527 convertible between an upright and a lie-flat position. The lower seats 525 and 527 can underlap the upper seat 502 when in a lie-flat position, and form an angled L-U-L configuration. The height of the FSA 528 required to achieve a L-U-L configuration will be closer to the vehicle's ceiling structure than the lower seats. This enables the use of structural members extending from the seat structure to the vehicle's ceiling structure to add stability and strength to the seating structure. Connecting seat structures to the floor and/or ceiling of a vehicle can facilitate satisfying aviation impact and strength requirements. A divider assembly 538 can provide privacy and a storage compartment 539.

Figure 3B:
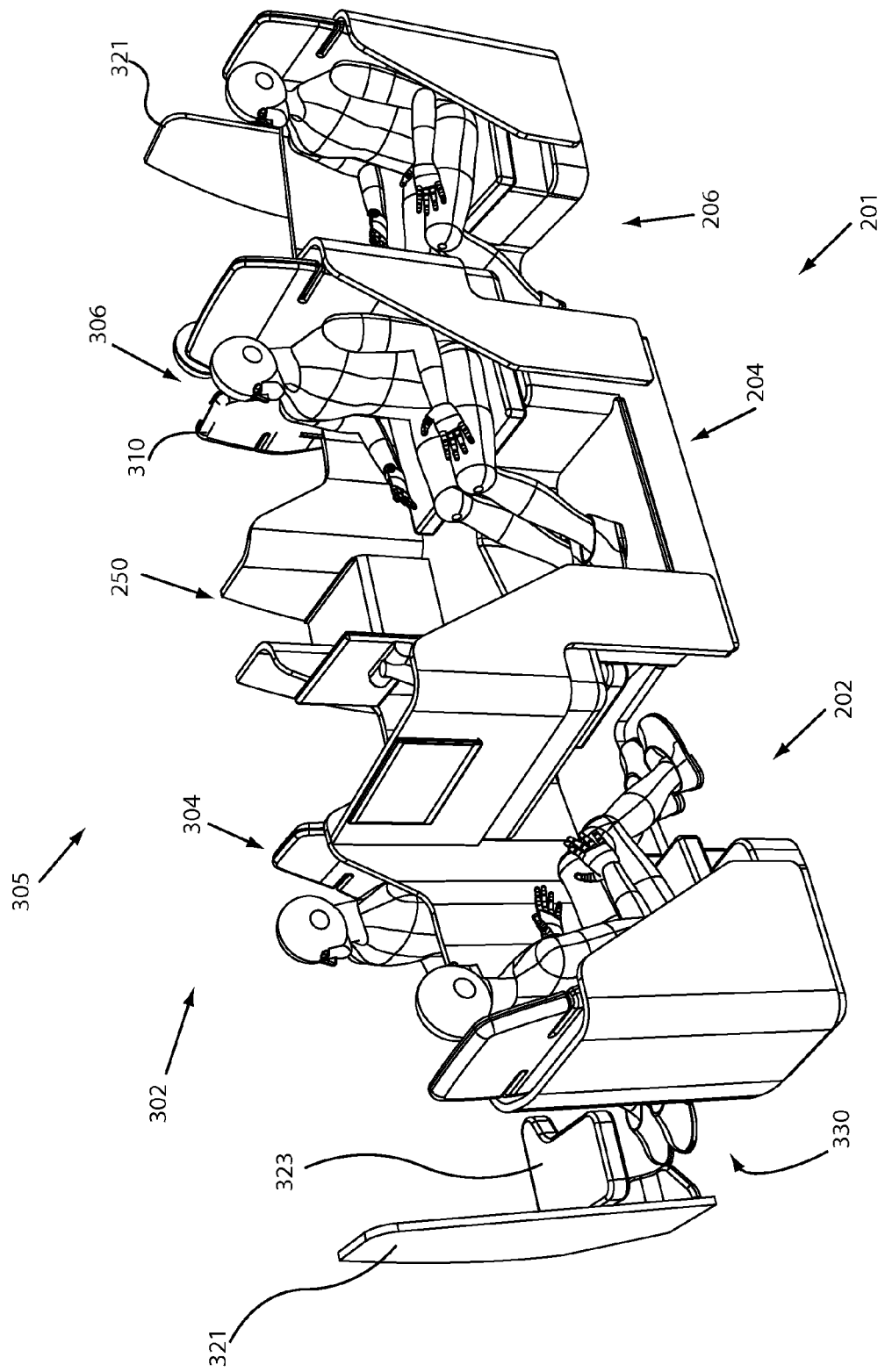
FIG. 3B depicts an example 5-seat grouping arrangement with 3-seat grouping in foreground and seats upright.
Figure 3C:
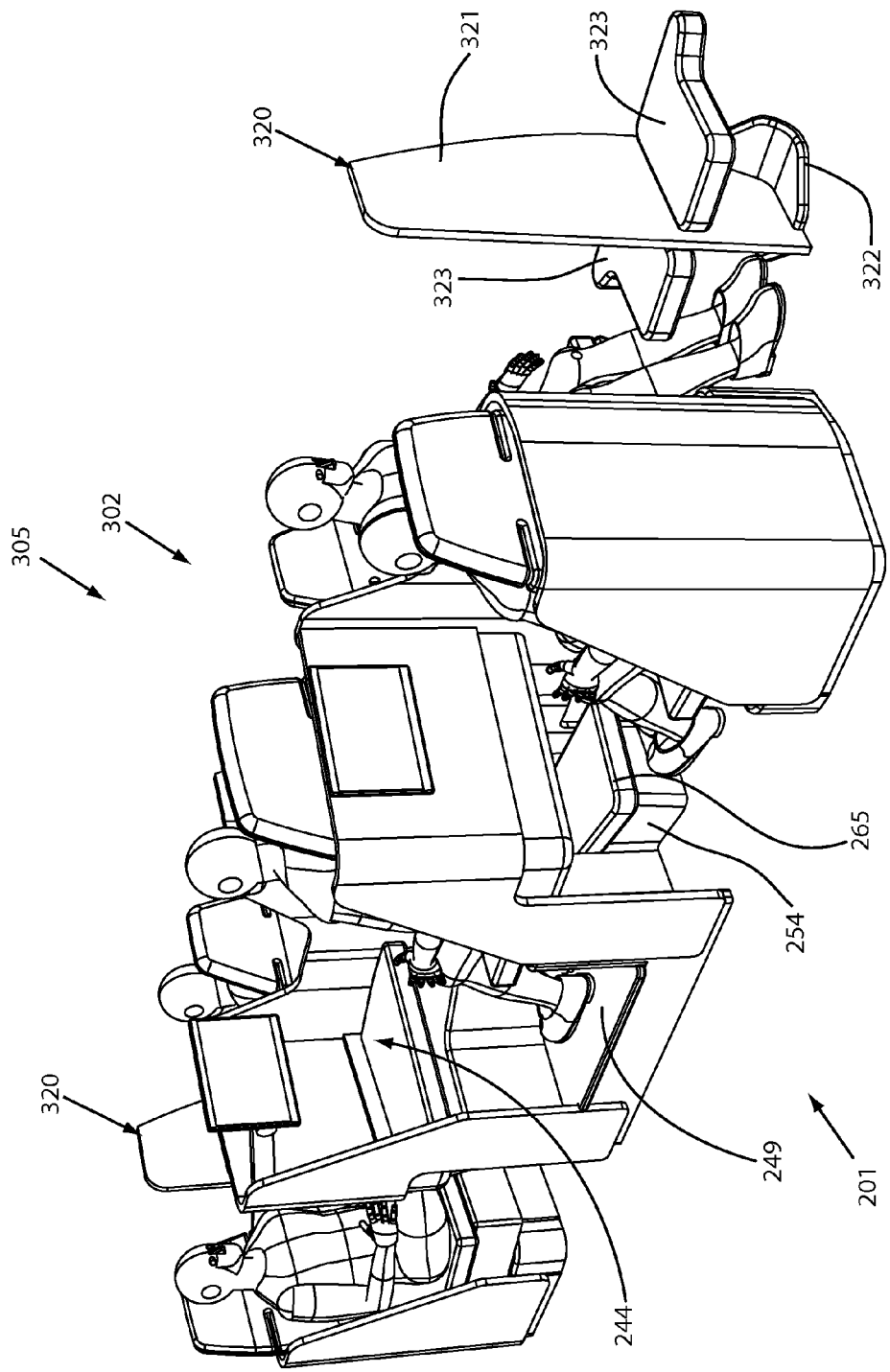
FIG. 3C depicts an example 5-seat grouping arrangement with 3-seat grouping in foreground and seats upright, rear perspective.
Figure 3D:
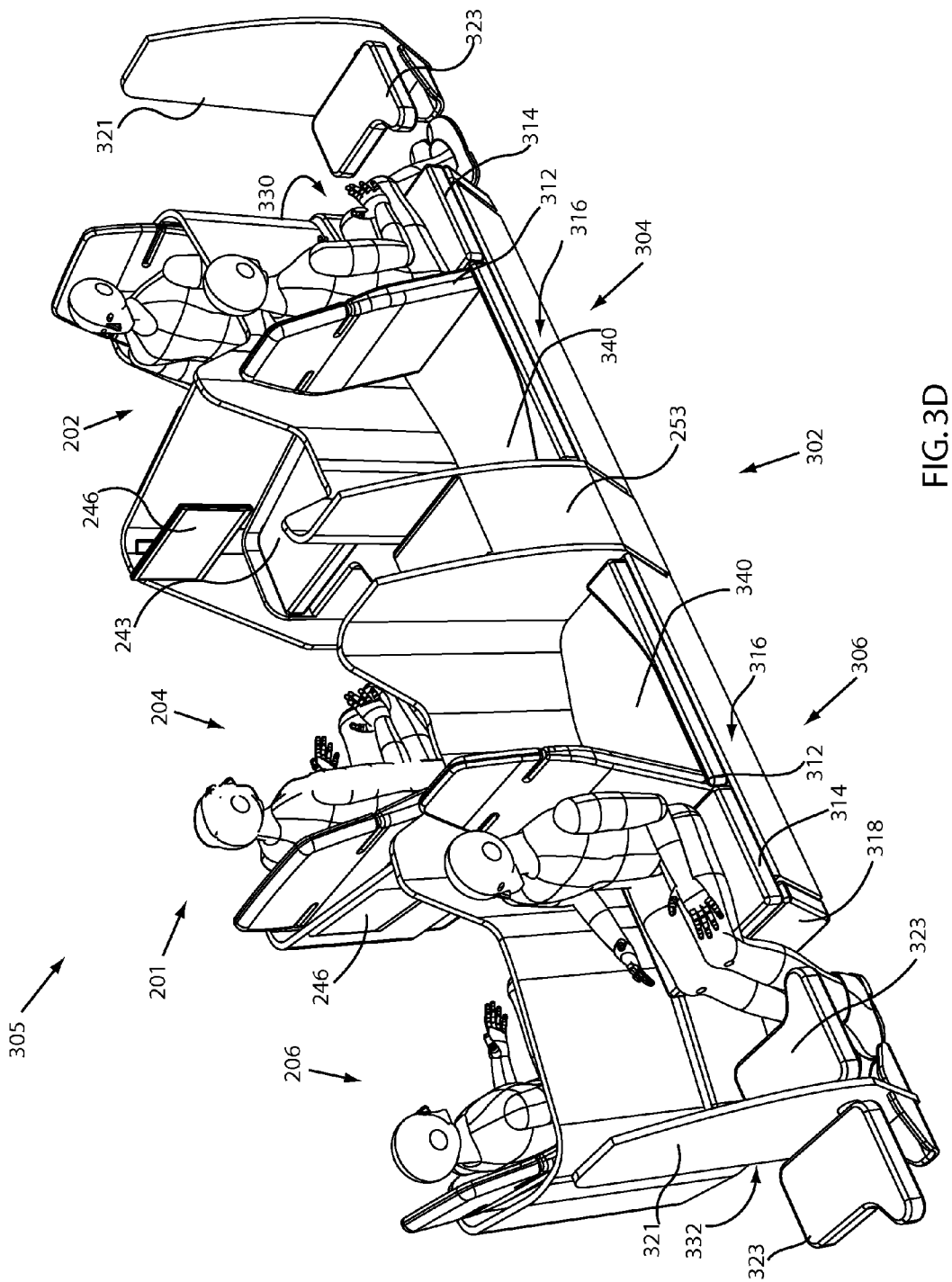
FIG. 3D depicts an example 5-seat grouping arrangement with 2-seat grouping in foreground and seats upright.
Figure 3E:
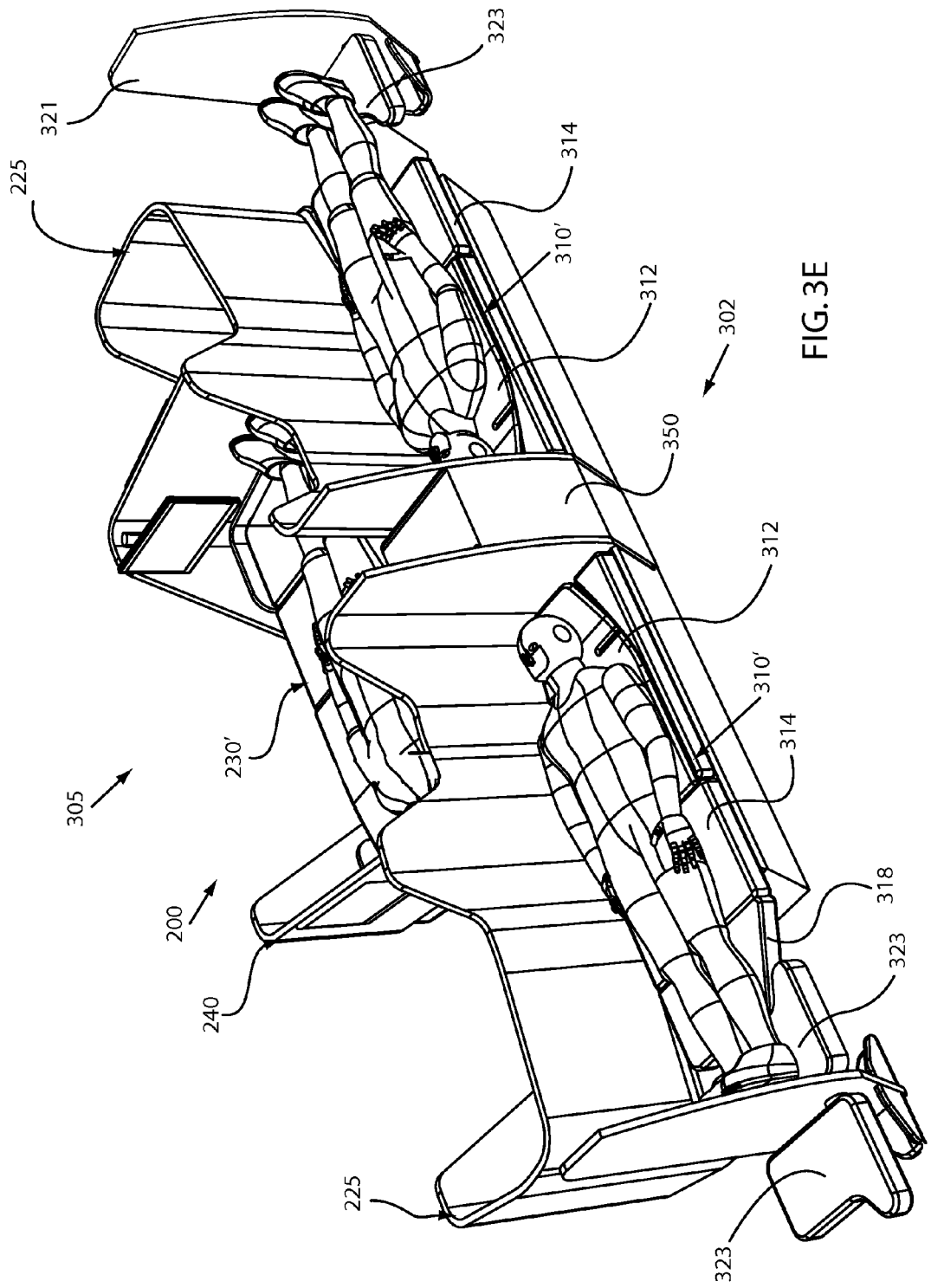
FIG. 3E depicts an example 5-seat grouping arrangement with 2-seat grouping in foreground and seats in lie-flat position.
Figure 3F:
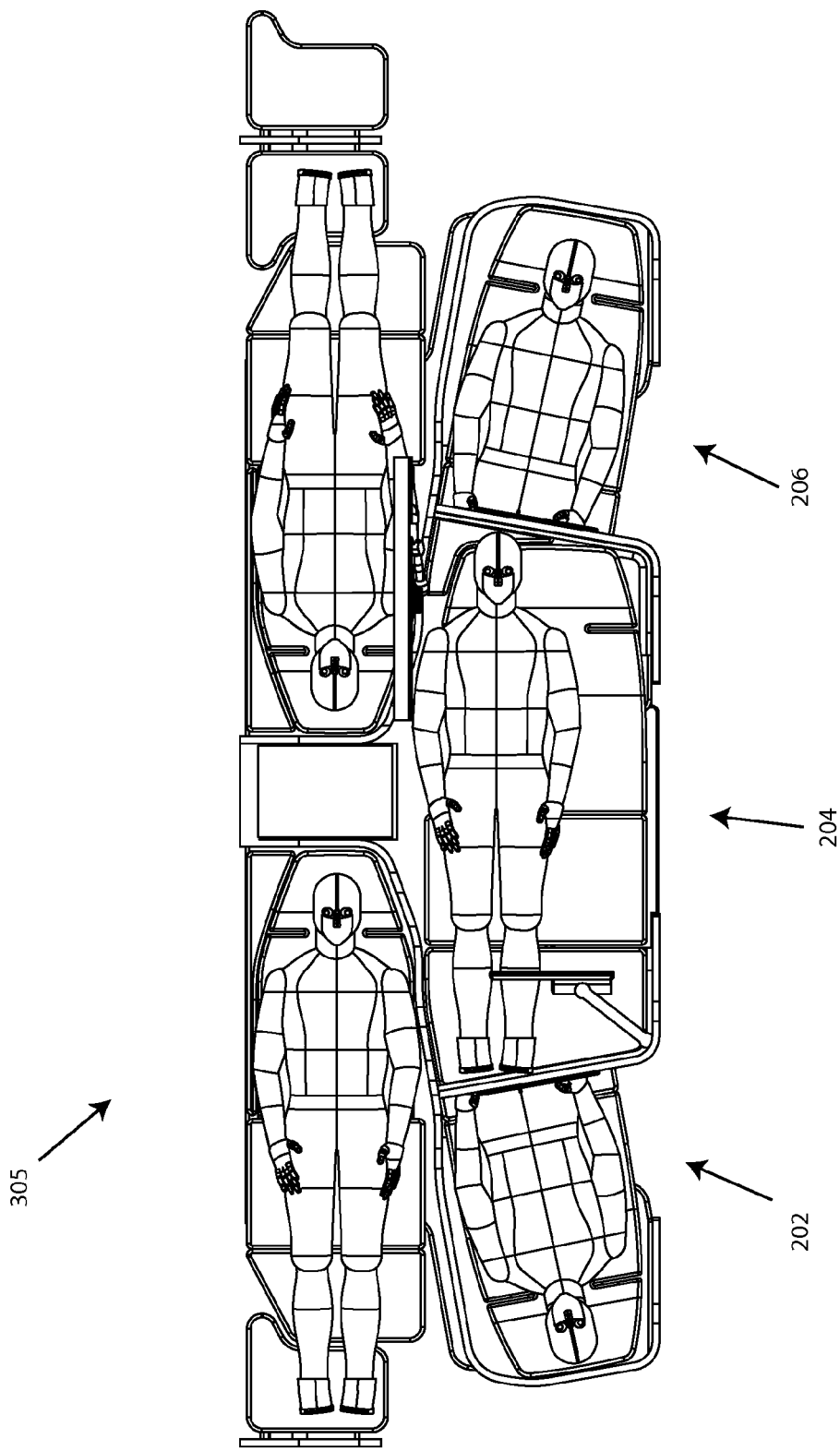
FIG. 3F depicts an example 5-seat grouping.

FIGS. 5H-5K depict an example embodiment in which a five-seat grouping incorporates a vertical member. In an example embodiment 540, the 3-seat grouping 520 is combined with the 2-seat grouping 302 (FIG. 3B). Movement of seats in the 3-seat grouping 520 and 2-seat grouping 302 from an upright to a lie-flat position is unencumbered by the vertical member 506. Even with the vertical member 506, the interaction between the group 520 L-U-L seating and group 302 adjacent lower seating provides an arrangement that diminishes undesirable passenger interaction such as visual exposure, bumping and passing over or through another passenger's space. In addition, access to ground level storage and seat ingress/egress are unencumbered by the vertical member 506.

Figure 6:
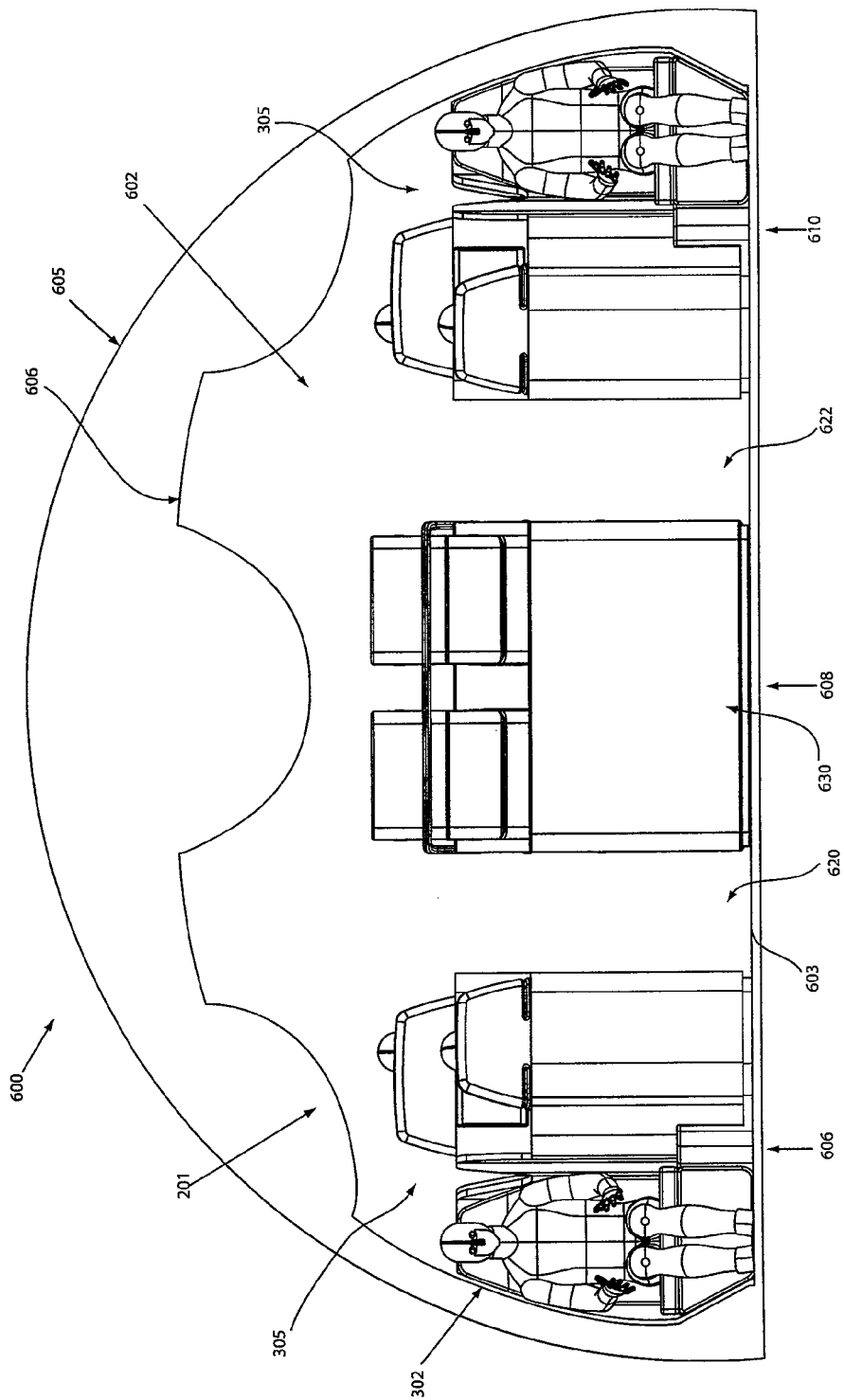
FIG. 6 shows an example seating arrangement in an aircraft fuselage.

FIG. 6 shows an example 600 in which an example seating arrangement 602 is employed in an aircraft fuselage 604. The aircraft fuselage 604 includes a floor 603 and a ceiling 605. FIG. 6 offers a perspective looking from the rear of the fuselage toward the front of the aircraft. The seating arrangement 602 includes a leftside seating column 606, a center seating column 608, and a rightside seating column 610. The leftside seating column includes the 5-seat grouping 305 that includes the upper seating assembly 204. Because the upper seating assembly 204 includes a seat elevated above the aircraft floor, which positions a passenger's head closer to the ceiling 605, the three-seat grouping 201 of the five-seat grouping 305 is positioned adjacent to the left aisle 620 where the ceiling 605 is higher than it is over the two-seat grouping 302. Similarly, the three-seat grouping 305 can be positioned so upper seating is adjacent the aisle 622. Angling of the lower seating assemblies of the three-seat grouping 201 gives room for a passenger seated in the two-seat grouping 302 to enter and exit without invading the personal space of passengers seated in the 3-seat grouping 201. In an example arrangement, seating 630 along the center column 608 can comprise raised seating as the aircraft ceiling 606 is high above that column. Positioning lower seats of the 5-seat group 305 in fuselage locations with a lower ceiling economically increases seating density in a manner that does not compromise passenger comfort.

Figure 7:
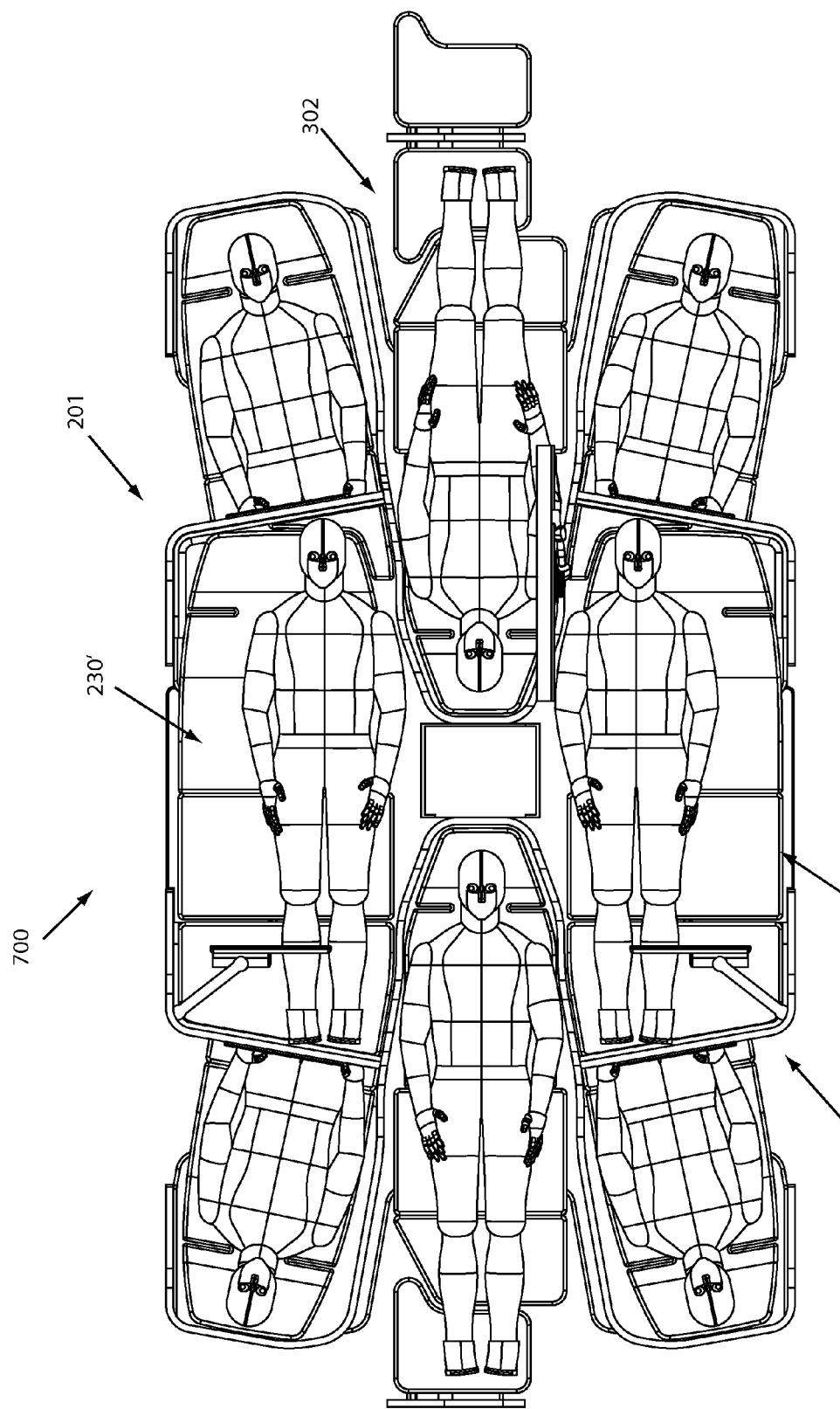
FIG. 7 shows an example vehicle seating arrangement.

FIG. 7 shows an example eight-seat grouping 700 that can be a useful configuration for seating between aisles. A combination of two L-U-L groupings, adjacent a lower 2-seat grouping can be advantageous for seat configurations located between aisles. Each seat of the 8-seat grouping 700 can be put in an upright or lie-flat position. In an exemplary embodiment, the eight-seat grouping 700 combines the 2-seat grouping 302 with the 3-seat grouping 201, and a 3-seat grouping 703 configured as a mirror image of the grouping 201. The two-seat grouping 302 and the two three-seat groupings 201, 703, can be configured to share common walls. For example a shell sidewall of the two-seat grouping 302 can function as a privacy wall and/or sidewall for the first or second three-seat grouping 201, 703. Likewise a sidewall of either the first or second three-seat groupings 201, 703 can function as a privacy wall for the two-seat grouping 302. In an example arrangement, a divider assembly can be disposed between the two-seat and three-seat groupings to provide a shared privacy wall. In an exemplary embodiment the two-seat 302 and the three seat groupings 201, 703, proximate one another in order to share a common privacy wall. However, it is contemplated that in a further embodiment the two- and three seat groupings can be interconnected. As shown in FIG. 7, the lower seating assemblies of the 3-seat groupings 201, 703 are typically angled so that the heads of lower passengers seated in the 3-seat groupings 201, 703 are angled away from the feet of passengers in the two-seat grouping 302 when the seats of the 2- and 3-seat groupings are in a lie flat position. This manner of angling provides additional ingress/egress space for the passengers in a two-seat grouping. In an example aircraft seating arrangement, the eight-seat grouping 700 can be positioned in a column between two aisles, and provide aisle access to all passengers.

Figure 8:
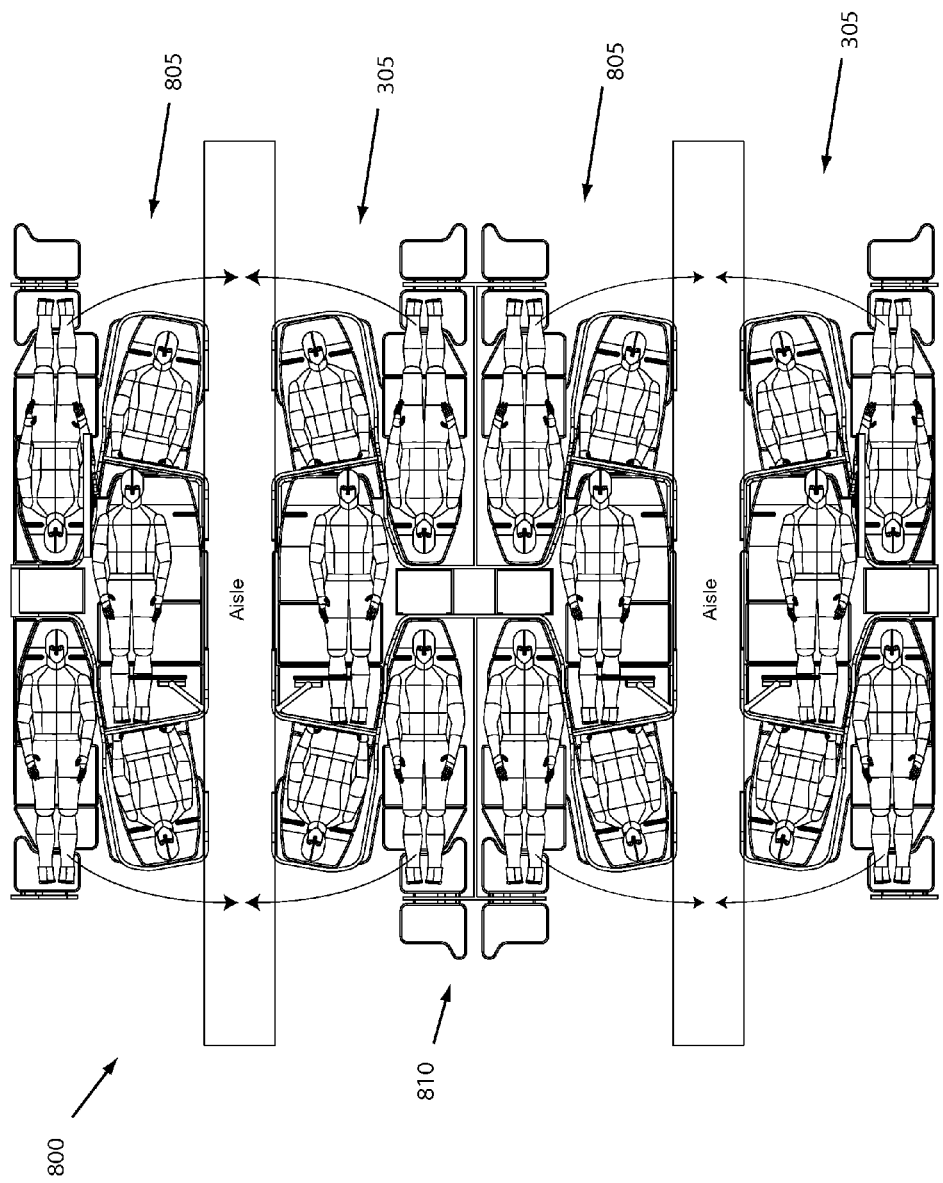
FIG. 8 shows an example vehicle seating arrangement.
Figure 9:
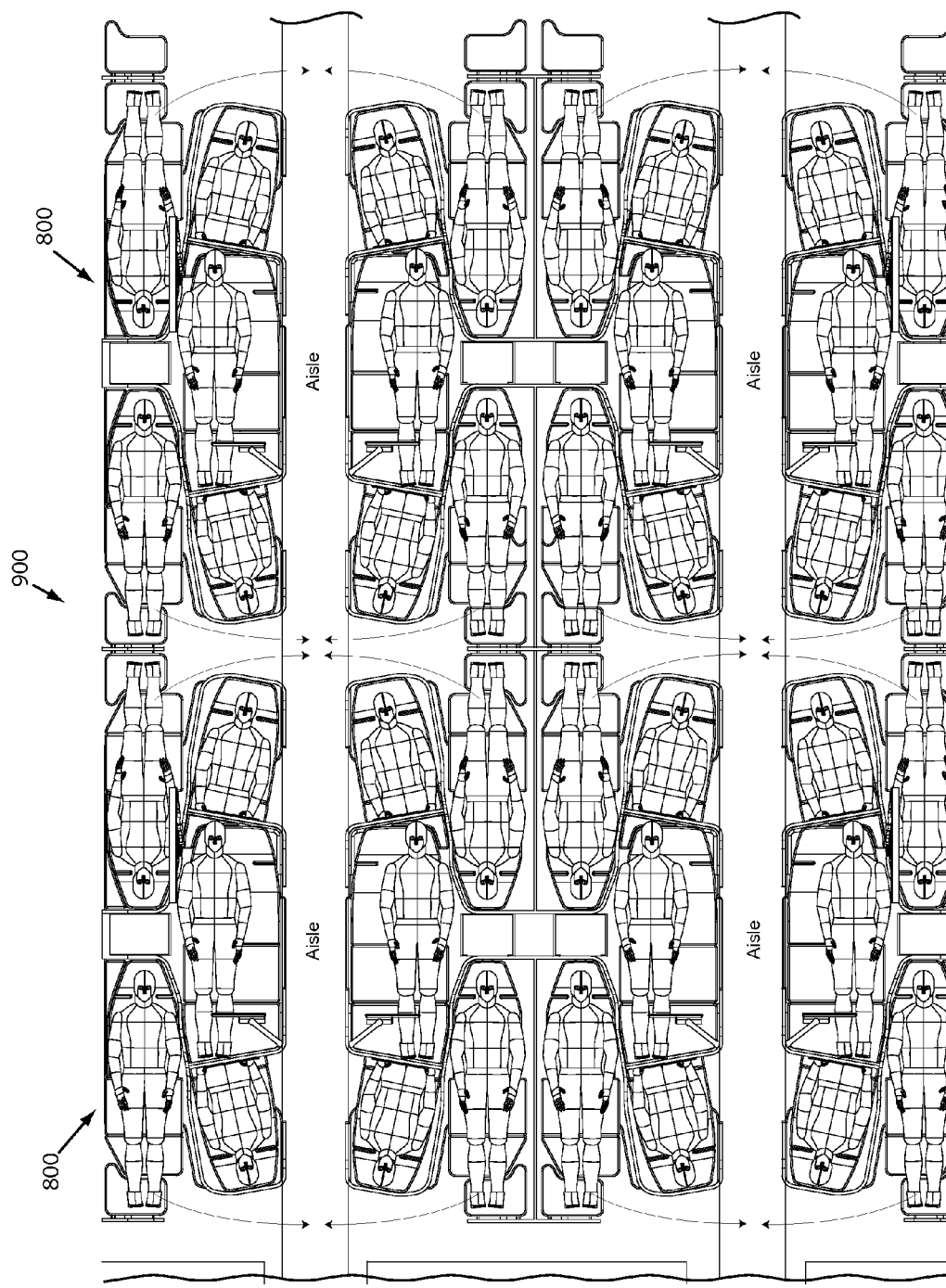
FIG. 9 shows an example vehicle seating arrangement.

As shown in the FIGS. 7-9, seat groupings can vary in configuration in order to optimize a vehicle seating arrangement. As discussed previously, the angling of the lower seat assemblies of a three-seat grouping and the footwell area of the upper seat assembly can be interrelated. As shown in FIG.

7, feet of lower reclining passengers of the 201 grouping are angled toward the longer side of the bed 230', which is on the upper passenger's left side. The feet of lower reclining passengers of the 703 grouping are angled toward the longer side of the bed 705', but the longer side is on the upper passenger's right side. Thus groupings can be configured to be left-hand or right-hand to maximize arrangement flexibility and efficiency for a particular environment.

For seat configurations that span aisles, a combination of two 3-seat L-U-L groups and two adjacent, generally parallel lower 2-seat groups comprising fore- and aft-facing seats can be advantageous. The example embodiment 800 includes a grouping 810 that can provide direct aisle access to ten passengers seated in seats convertible between an upright and a lie-flat position without requiring any of them to pass through or over another passenger's space. The example arrangement 800 can include the 5-seat grouping 305 and a 5-seat group 805 configured as a mirror image of the 5-seat group 305. In addition, between two aisles a 10-seat grouping 810 can be positioned. In an example embodiment, the grouping 810 can comprise a combination of the 305 and 805 groups. As shown in FIG. 8, all passengers in both upper and lower seating have aisle access. Due to the angling of the three-seat groupings, the two-seat groupings can be arranged at a window side of the vehicle or interior to other groupings, while still providing unobstructed ingress/egress to their occupants.

FIG. 9 shows an example seating arrangement 900 for a vehicle. In an example embodiment, the seating arrangement 900 can efficiently provide comfortable lie-flat seating in a wide-bodied aircraft. The seating arrangement 900 can comprise adjacent configurations 800 that span aisles along the linear dimension of a vehicle. Arrows in FIG. 9 show aisle access for occupants in non-aisle seating, indicating that passengers in non-aisle seating can access an aisle without having to move over, or under, or otherwise invade the space of an adjacent passenger.

Thus, 2-seat, 3-seat, 5-seat and 6-seat groupings can be variously combined to efficiently arrange seating in an aircraft fuselage and provide unobstructed ingress and egress for all passengers. The foregoing figures depicted various example arrangements in which a 3-seat grouping includes an upper seating assembly combined with two lower seating assemblies that are angled to some degree in relation to the linear dimension of the upper seat. As discussed previously herein, an example embodiment of the invention can include a 3-seat grouping in which lower seating assemblies are aligned with the linear dimension of an upper seating assembly, i.e. oriented at an angle of 0° with the linear dimension of the upper seating assembly, while still conserving space in the overall linear dimension of the grouping.

Figure 10:
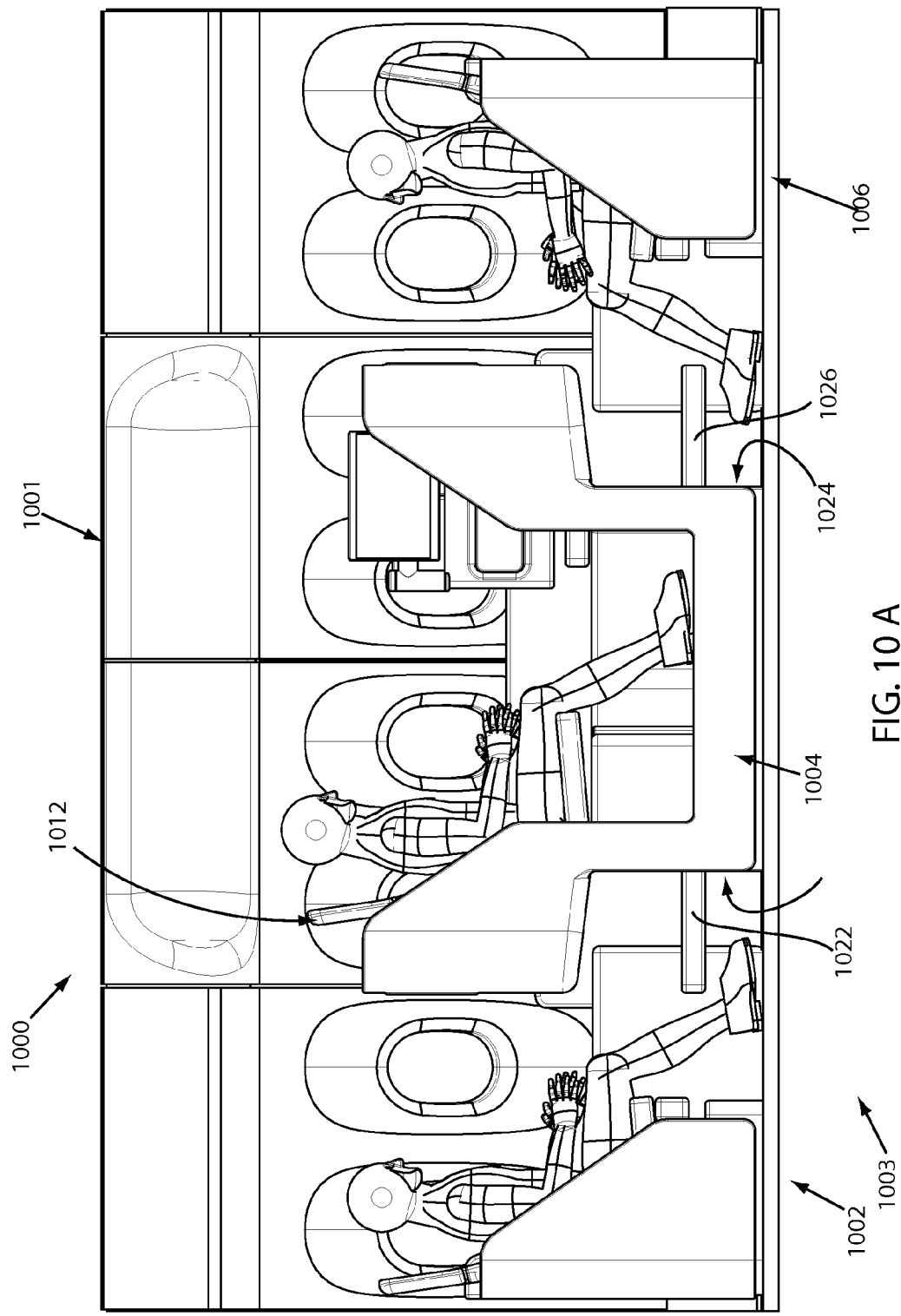
FIG. 10A shows an example 3-seat aligned grouping.
FIG. 10B shows an example 3-seat aligned grouping.
FIG. 10C shows an example 3-seat aligned grouping in a lie-flat position.
FIG. 10D shows a sectional view of a 3-seat aligned grouping in a lie-flat position.
Figure 10B:
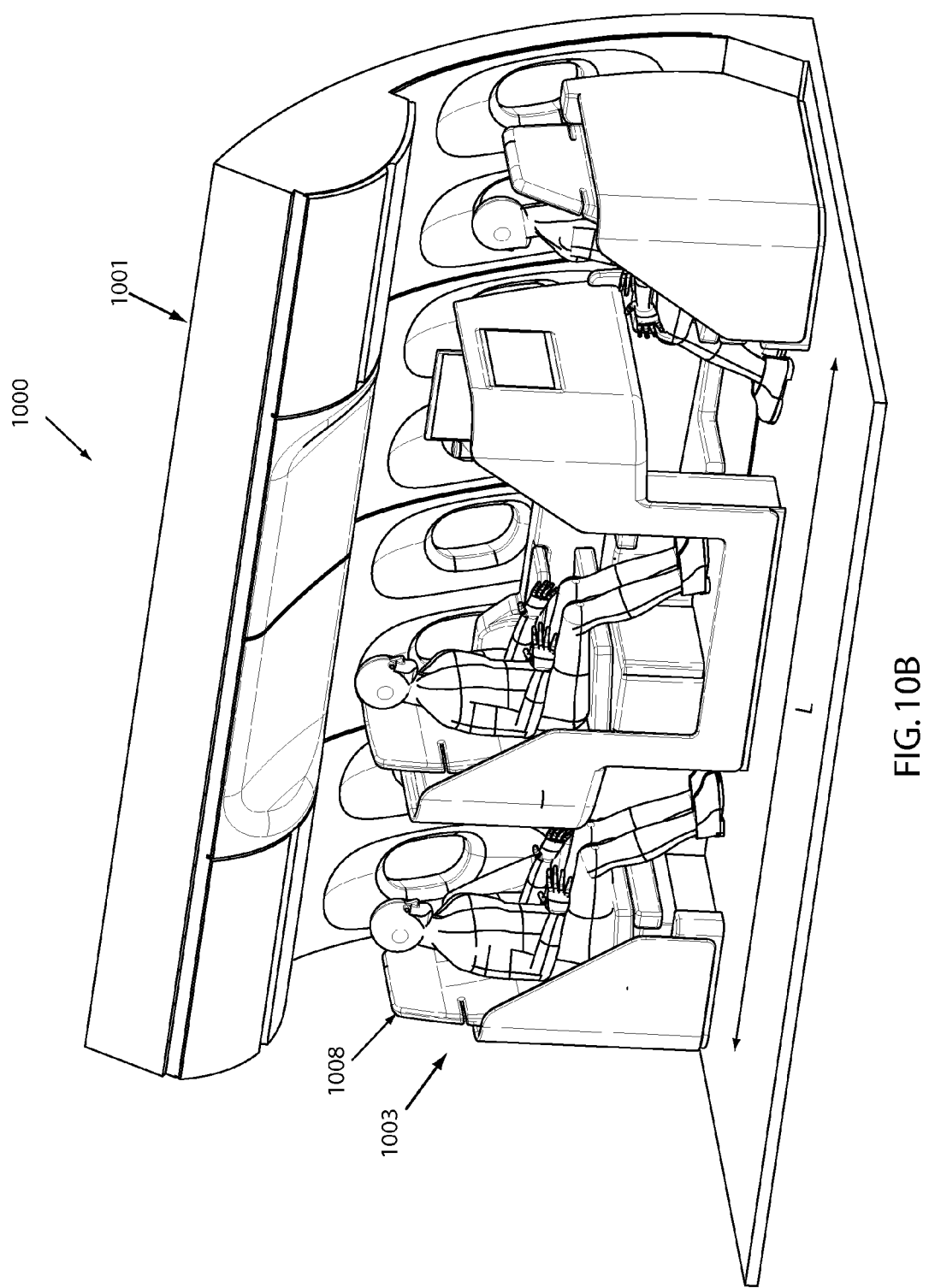

FIGS. 10A-10D show an example 3-seat grouping in which lower seats are aligned with an upper seat, forming an aligned L-U-L arrangement. FIG. 10A shows a side-view of an aircraft fuselage 1001 in which an example 3-seat grouping 1003 comprises a lower seating assembly 1002, an upper seating assembly 1004, and a lower seating assembly 1006. In an example arrangement, the lower seating assembly 1002 and the upper seating assembly 1004 can be fore-facing, while the lower seating assembly 1006 can be aft-facing. As shown in FIG. 10B, a line L indicates the longitudinal axis of the upper seating assembly 1004 and the 3-seat grouping 1000, and shows that the longitudinal axes of the three seating assemblies are aligned. The lower seating assembly 1002 includes a seat 1008 having a transverse hinge line 1010 perpendicular to the line L. Likewise, the upper seating assembly 1004 includes a seat 1012 having a transverse hinge line 1014, and the lower seating assembly 1006 includes a seat 1016 having a transverse hinge line 1018. The hinge lines 1010, 1014, and 1018 are all parallel to each other and perpendicular to line L, further indicating the alignment of the three seating assemblies.

Figure 10C:
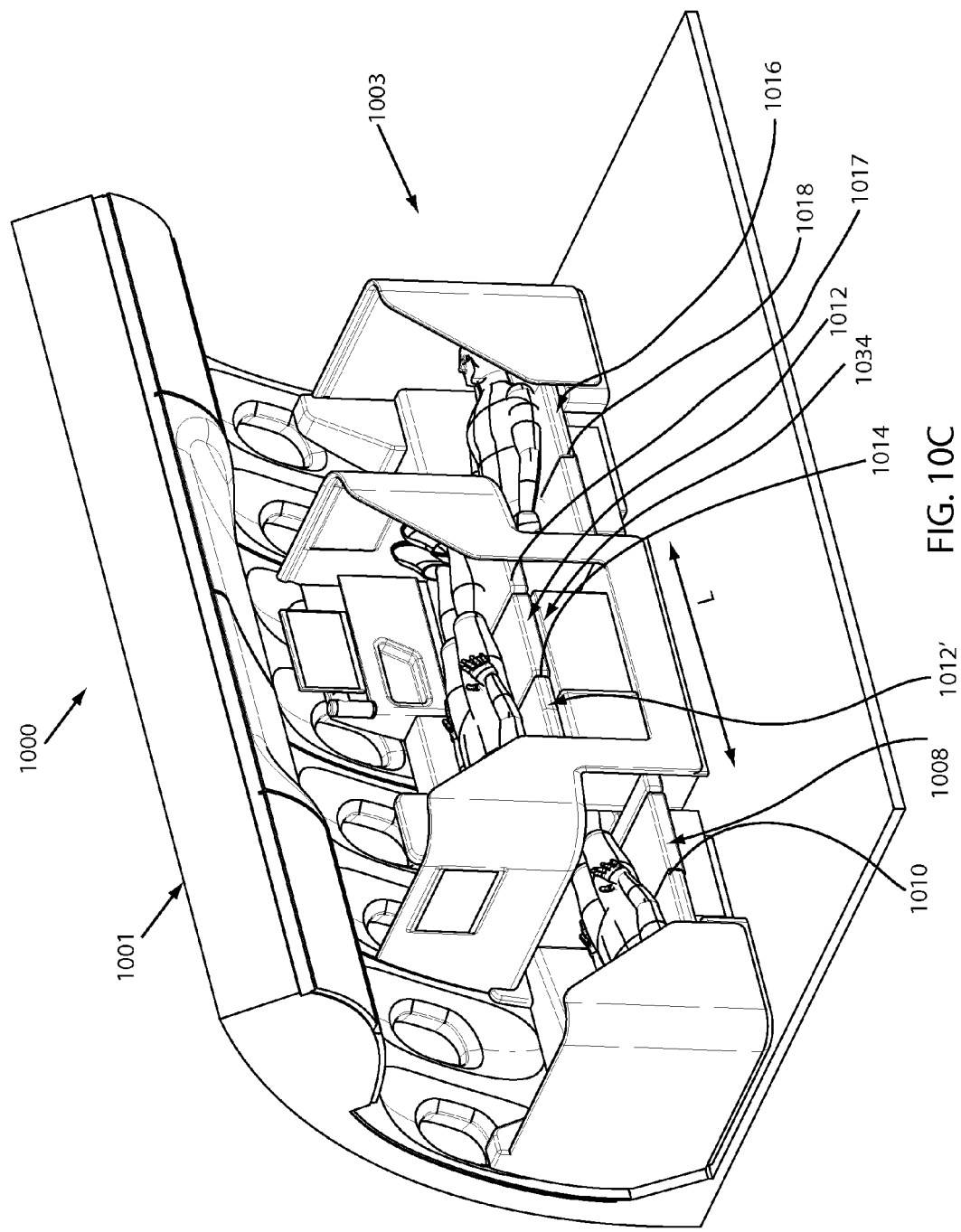

Although the lower seating assemblies 1002, 1006 are aligned with the upper assembly 1004 rather than angled, the 3-seat grouping 1003 can provide seating in a manner that conserves space in the linear dimension. The required overall length of the grouping 1000 can be shortened by angling the passenger when he is reclined in a lie-flat position. As shown in FIGS. 10C,D, while the seating assemblies 1002, 1006 are "straight" in alignment with the upper seating assembly 1004, an offset positioning of a footspace for the lie-flat position for passengers seated in the lower seating assemblies can lead occupants to angle their bodies across a reclined bed, shortening a required bed length.

An offset footrest 1022 is disposed at a footspace 1020 associated with the lower bed 1008'. In like manner, an offset footrest 1026 is disposed at the footspace 1024 associated with the lower bed 1016'. As perhaps best illustrated in FIG. 10D, a sectional view of the seating arrangement 1003 in which part of the upper seating assembly 1004 is not shown, the disposition of the footrests 1022 and 1026 cause a occupant angle himself across the beds 1016', 1008' and therefore be angled with respect to the upper seating assembly 1004. Angling of lower seat passengers in a lie-flat position can conserve space in the linear dimension. The straight bed 1008' can cooperate with the offset footrest 1022 to form a sleeping berth 1030 for a passenger of the lower seating assembly 1002. In like manner, the straight lower bed 1016' can cooperate with the footrest 1026 to form a sleeping berth 1032 for an occupant of the lower seating assembly 1006.

Figure 10D:
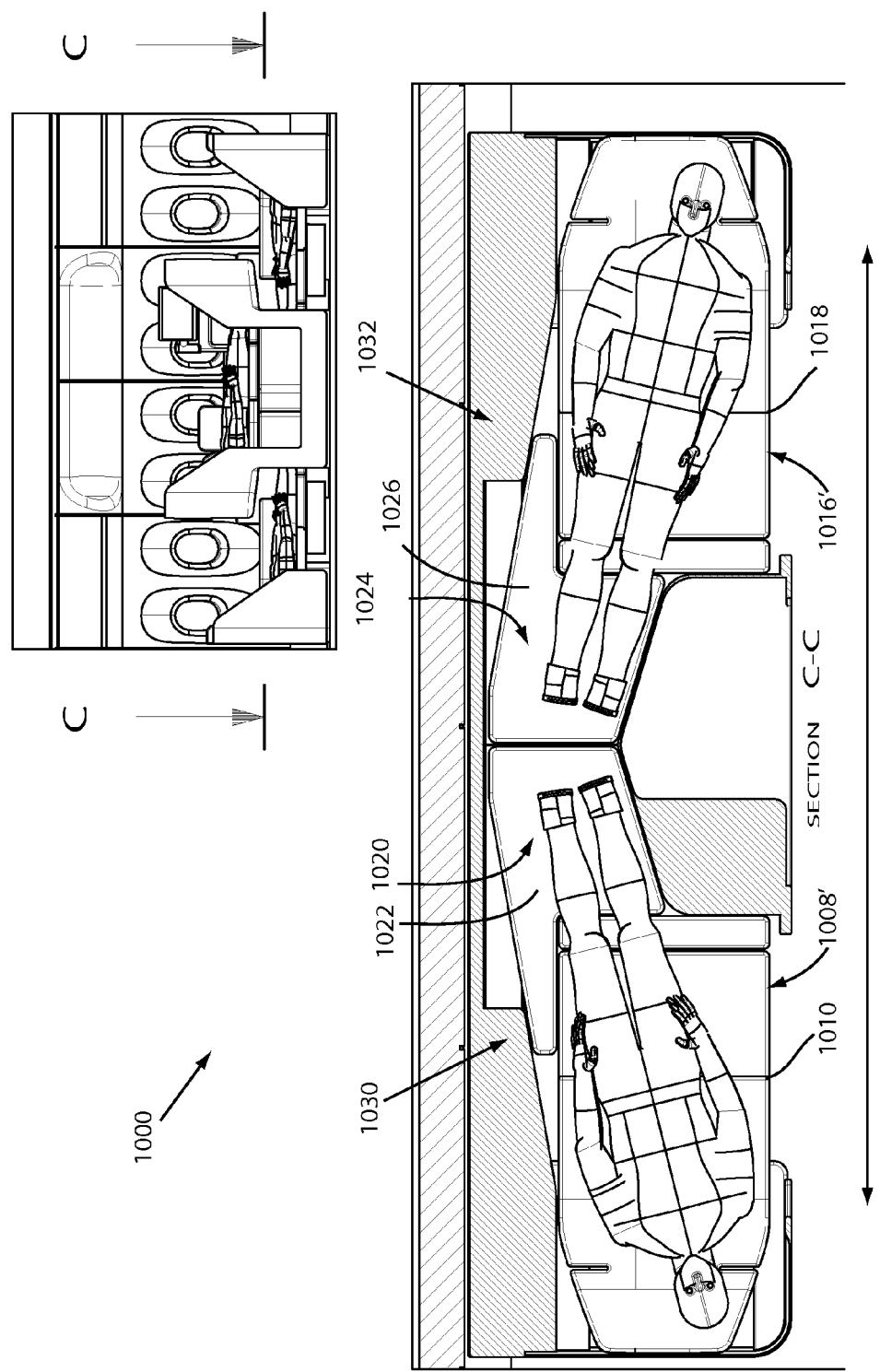

Referring to FIG. 10C, the upper straight bed 1012' can cooperate with an aligned footrest 1017 to provide an upper sleeping berth 1034. The footrest 1017 is generally the same width as the bed 1012', providing a wide berth that allows an upper passenger to lie straight in a berth of relatively uniform width. As shown in FIGS. 10C-10D, a portion of the beds 1008' and 1016' underlap the seating assembly 1004. In an example embodiment a portion of the beds 1008' and 1016' underlap the berth 1034.

Figure 11A:
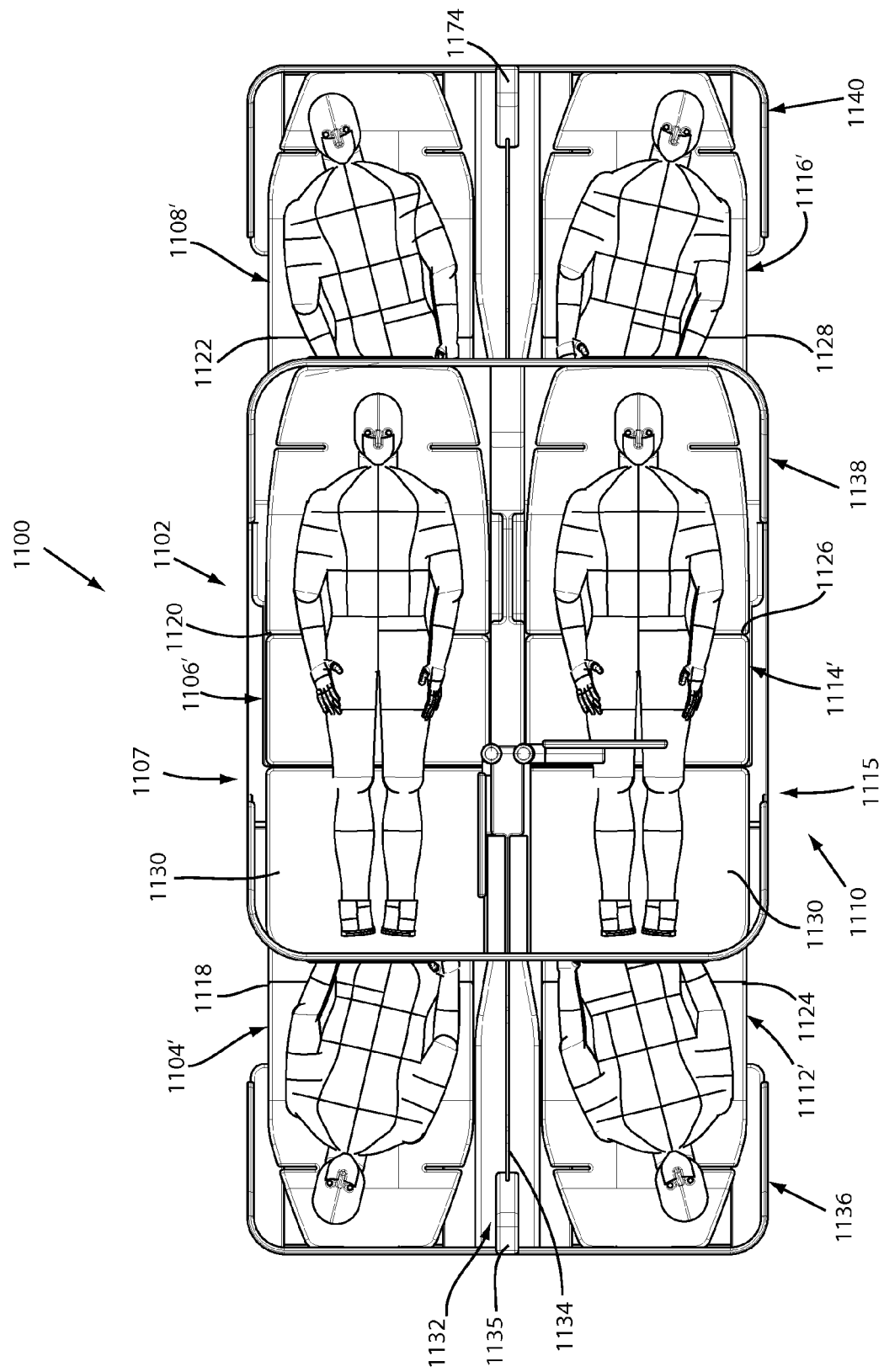
FIG. 11A shows an example 6-seat aligned vehicle seating arrangement.
Figure 11B:
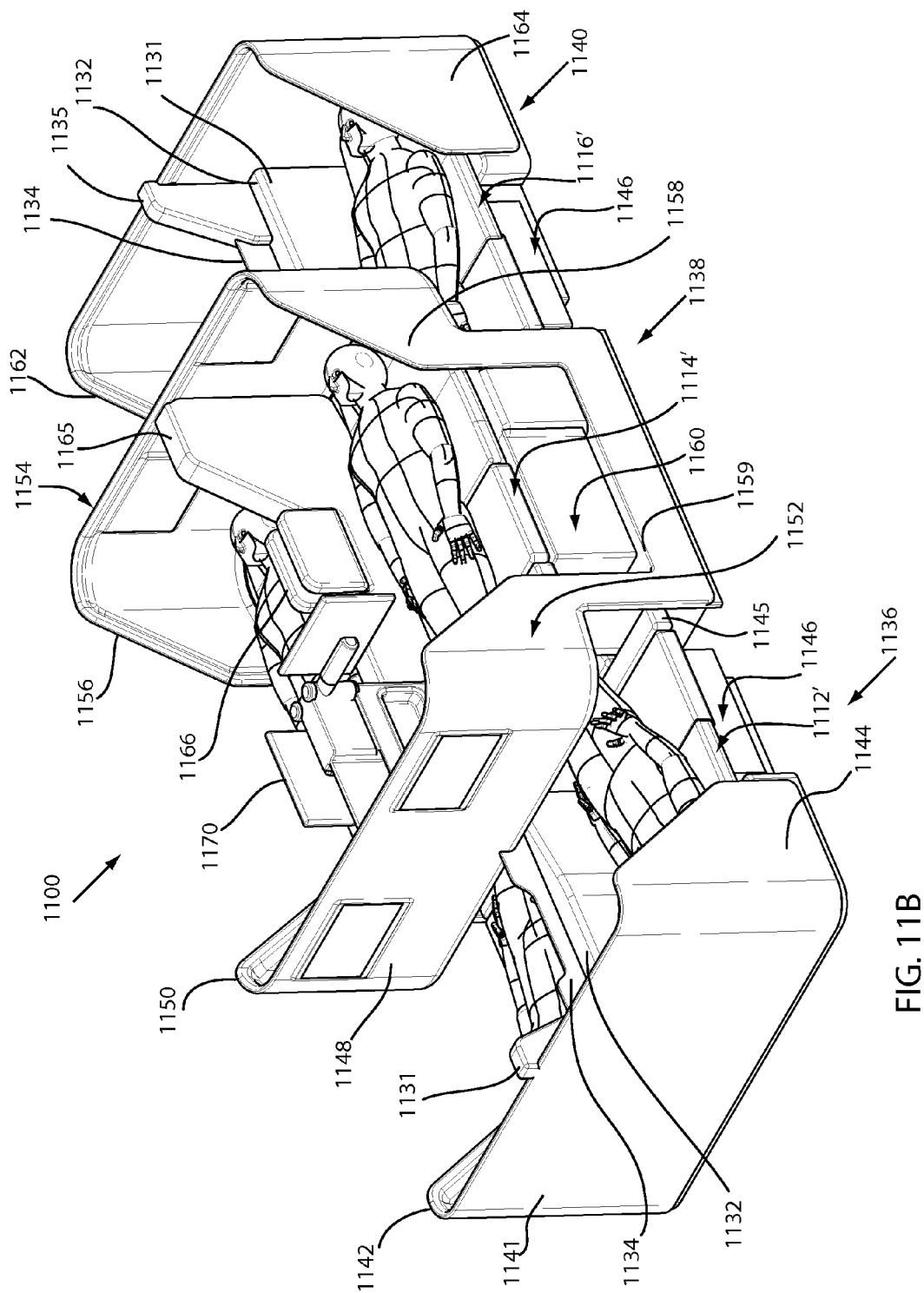
FIG. 11B shows an example 6-seat aligned vehicle seating arrangement.

FIGS. 11A-F show an example arrangement 1100 in which a first 3-seat aligned L-U-L grouping 1102 having a lower seat 1104, an upper seat 1106 and a lower seat 1108 is combined with a second 3-seat aligned L-U-L grouping 1110, comprising lower seat 1112, upper seat 1114, and lower seat 1116, to form a 6-seat grouping. As shown in FIG. 11A, a hinge line 1118 of the seat 1104, a hinge line 1120 of the seat 1106, and a hinge line 1122 of the seat 1108 are parallel with one another and perpendicular to the linear dimension of the upper seat 1106. Similarly, a hinge line 1124 of the seat 112, a hinge line 1126 of the seat 1114, and a hinge line 1128 of the seat 1116 are parallel to one another and perpendicular to the linear dimension of the seat 1114. In addition, lower seats 1104, 1112 are parallel with each other as are the upper seats 1106, 1114, and the lower seats 1108, 1116.

In an exemplary arrangement, the 3-seat grouping 1110 is arranged as a mirror image of the 3-seat grouping 1102 so that the feet of the passengers occupying beds formed by the lower seats, namely beds 1104', 1112', 1108' and 1116' are directed beneath and toward a particular side (the inside) of upper beds 1106' and 1114'. Because the passengers of the lower beds 1104', 110'8, 1112' and 1116' are angled across their respective beds, a shortened linear dimension for the lie-flat 6-seat grouping 1110 can be achieved in comparison to a seating arrangement in which both seats and passengers are aligned with the linear dimension of the seats when in a lie-flat position.

In an example embodiment, the lower seats 1104, 1112 can share a common lower support shell 1136, the upper seats 1106, 1114 can share a common FSA 1138, and the lower seats 1108, 1116 can share a common lower support shell 1140. The support shell 1136 can have an endwall 1141, a first sidewall 1142, and a second sidewall 1144. A seat base support 1146 can be disposed to provide support to the lower seat 1104, and one can be provided to support the lower seat 1112. The lower seats 1104, 1112 can each include a lower leg extension 1117 that can extend in an up position when the seat 1104, 1112 is in a lie-flat position to provide support to an occupant's legs. The lower leg extension 1117, when extended with the seat 1104 in a lie-flat position can form a bed 1104' for a reclining passenger. In addition, a foot rest 1173 offset at the FSA 1138 can cooperate with the bed 1104' to form a berth 1190 that angles a lower passenger with respect to an upper seating assembly. Similarly, a footrest 1174 can cooperate with the bed 1112' to form a sleeping berth 1192 for a lower reclining passenger.

The lower support shell 1140 can comprise an endwall 1161 with a first sidewall 1162 and a second sidewall 1164. A seat base support 1146 can be provided to support the lower seat 1108 and the lower seat 1116. The seats 1108, 1116 can also include the lower leg extension 1117 for supporting an occupant's legs and forming a bed when the seat 1108, 1116 is in a lie-flat position. A footrest 1175 at the FSA 1138 can cooperate with the bed 1108' to form a sleeping berth 1194 that angles a lower fore-facing occupant. A footrest 1176 can cooperate with the bed 1116' to form a lower sleeping berth 1196 for an occupant. Disposition of the footrests 1173, 1174, 1175, 1176 angles all lower passengers with respect to the FSA 1138. FIGS. 11 E,F show sectional views of the arrangement 1100 to better illustrate the manner in which the footrests 1173, 1174, 1175, 1176 angle passengers 1182, 1184, 1186, 1188 across the beds 1104', 1112', 1108' and 1116".

The lower support shells 1136, 1140 can include a partition 1131 having an upper surface 1132 that can be split by a divider 1134 to form two areas that can function as armrests for the adjacent lower passengers. In addition, a privacy shield 1135 can be disposed to provide additional privacy for lower passengers in both an upright and a lie-flat position.

The FSA 1138 can comprise a shell that can include a first endwall 1148, with a first sidewall 1150 and a second sidewall 1152, and a second endwall 1154 having a first sidewall 1156 and a second sidewall 1158. A seat base support 1160 can be disposed on an elevated floorboard 1159 to provide support for the upper seat 1114. The upper bed 1106' can cooperate with a foot rest 1130 to form a sleeping berth 1107 for an upper seat occupant. The foot rest 1130 can be integrated with the FSA 1138, for example the foot rest 1130 can be attached to the endwall 1148. In like manner, the upper bed 1114' can cooperate with the footrest 1131 to form a berth 1115. While the lower berths 1192, 1196 can underlap the upper berth 1115, and the lower berths 1190 and 1194 can underlap the upper berth 1107, it can be observed from the drawings that only the lower portion of a lower occupant extends beneath the upper berths, providing a comfortable, non-claustrophobic lie-flat experience for reclining lower occupants. The FSA 1138 can include a partition 1164 that can provide privacy to the occupants of the upper seats 1106 and 1114. A tray table 1166 can be provided at either side of the partition 1164 so that each upper seat occupant has a separate tray table that can be in an upright (FIG. 11B) or horizontal (FIG. 11C) position.

In an exemplary embodiment the partition can be removable to provide a premium cabin area that can be shared by more than one person.

Figure 11C:
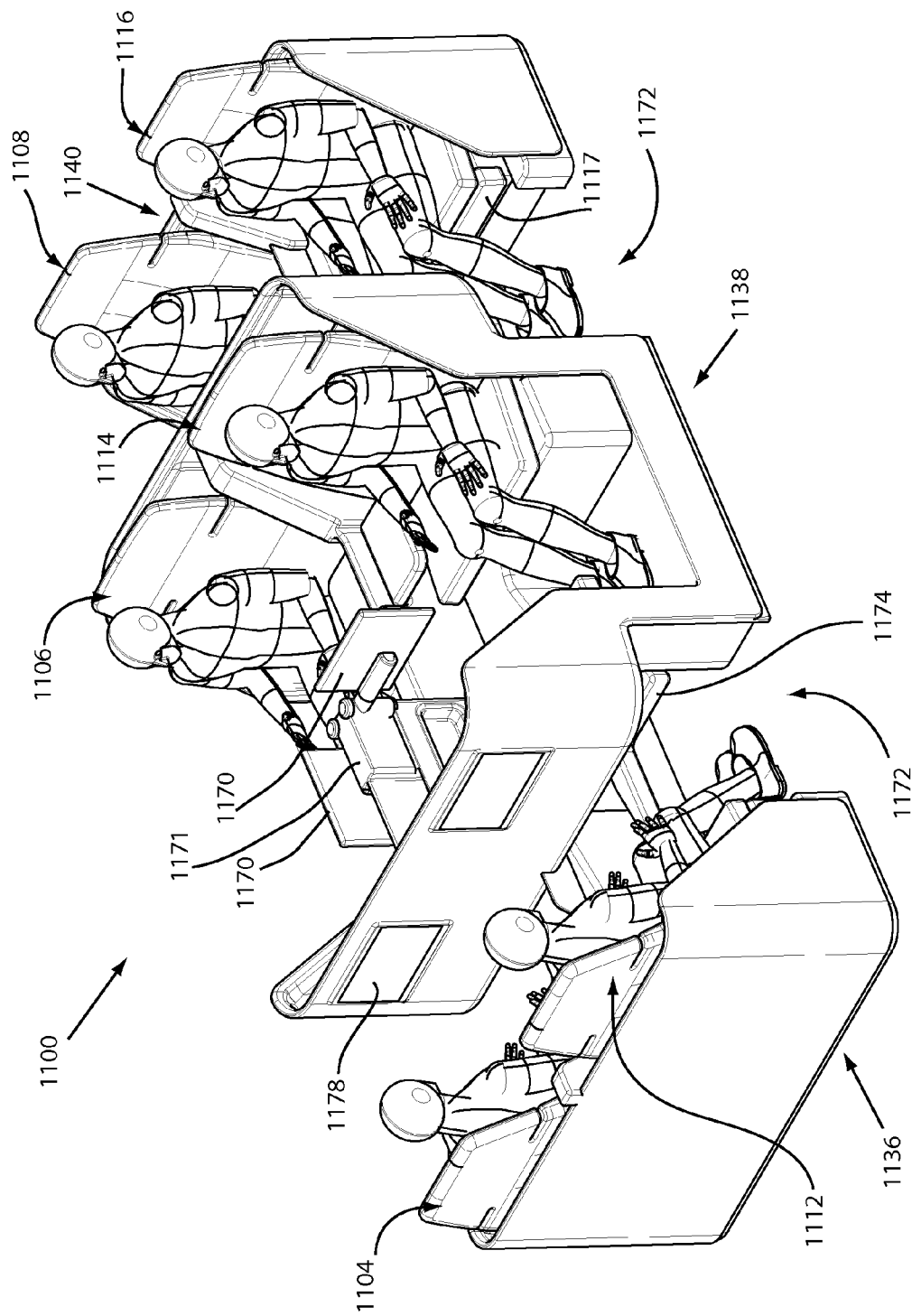
FIG. 11C shows an example 6-seat aligned vehicle seating arrangement.
Figure 11D:
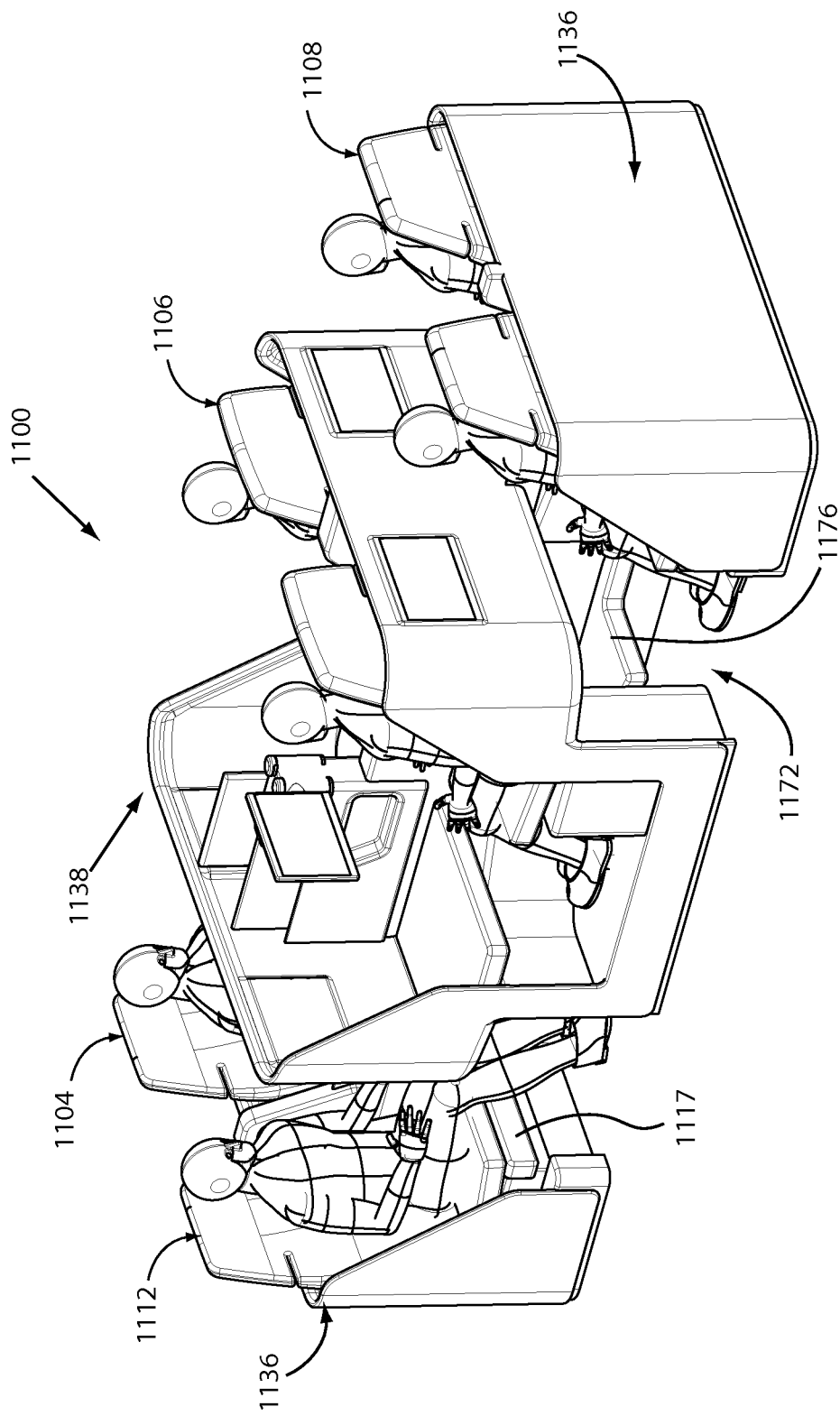
FIG. 11D shows an example vehicle seating arrangement.
Figure 11F:
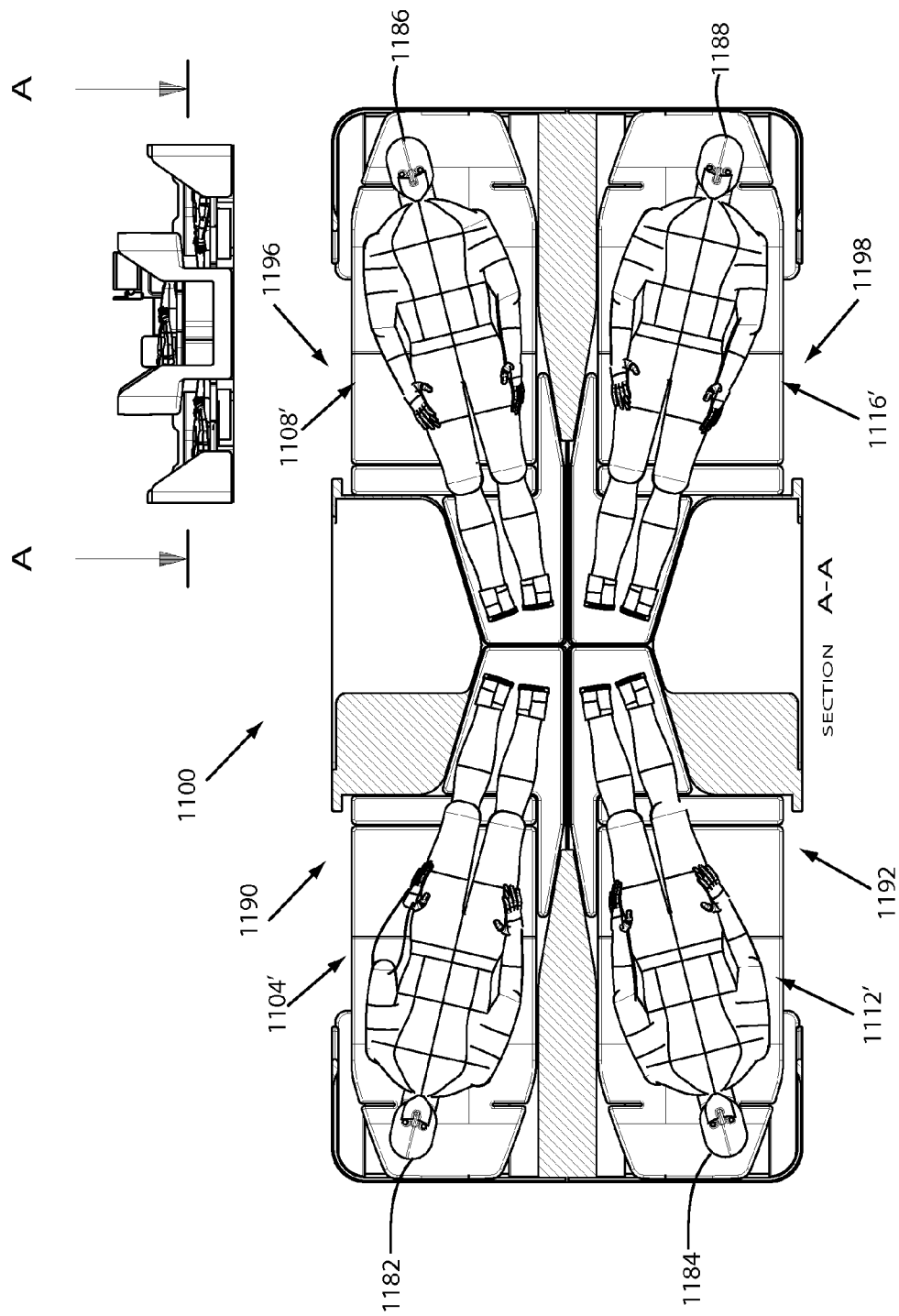
FIG. 11F shows an example vehicle seating arrangement.

FIGS. 11C,D show the 6-seat grouping 1100 with seats in an upright position. As shown in the figure, when the seats of the 6-seat grouping 1100 are in an upright position, the passengers of the lower seats 1104, 1108, 1112, 1116 have an egress area 1172 that can provide unobstructed access to the lower seats without infringement of upper seat space. After being seated, a lower seat occupant has a comfortable amount of leg room as well.

The example seating arrangement 1100 is configured to provide each passenger an entertainment center. For example, an entertainment center 1178 can be disposed at the endwall 1148, one for each of the occupants of the seats 1104 and 1112. For the occupants of the upper seats 1106 and 1114, an entertainment center 1170 can be provided on a mounting assembly 1171 configured to allow pivoting of the entertainment center 1180 from a retracted position (associated with seat 1106) to an extended position (associated with seat 1114). The 6-seat grouping 1100 can be grouped with other 6-seat groupings in an end-to-end fashion in an aircraft fuselage, as discussed earlier herein in regard to 2-, 3- and 5-seat groupings.

Both the angled and aligned 6-seat groupings conserve space in the linear dimension by angling lower passengers when the seats are in a lie-flat position, shortening the length required to provide a lie-flat bed. Two lower beds can underlap an upper bed in a manner in which only a lower portion of a passenger is beneath the bed of an upper passenger, and privacy is protected between adjacent passengers. Egress areas for lower and upper passengers allow a passenger to enter a seat without having to crawl through or otherwise invade the personal space of another passenger.

FIGS. 12A-F show an exemplary embodiment of a hybrid arrangement in which a 6-seat grouping is configured with an upper seating assembly and aligned lower underlapping seating assemblies. However, footspace for a lower seat facing the same direction as the upper seat, referred to as a "non-opposing" lower seat, is configured differently from that for a lower seat facing an opposite direction of an upper seat, referred to as an "opposing seat". In short, while all seats in a hybrid arrangement can be aligned with each other, having transverse hinge lines perpendicular to an arrangement linear dimension, passengers in opposing lower beds can be angled, while those in non-opposing beds are not angled. In an example embodiment, footspace can be divided between upper and lower seating. By way of example, but not limitation, footspace can be between an upper seat seated position and a lower opposing seat bed position.

Figure 12A:
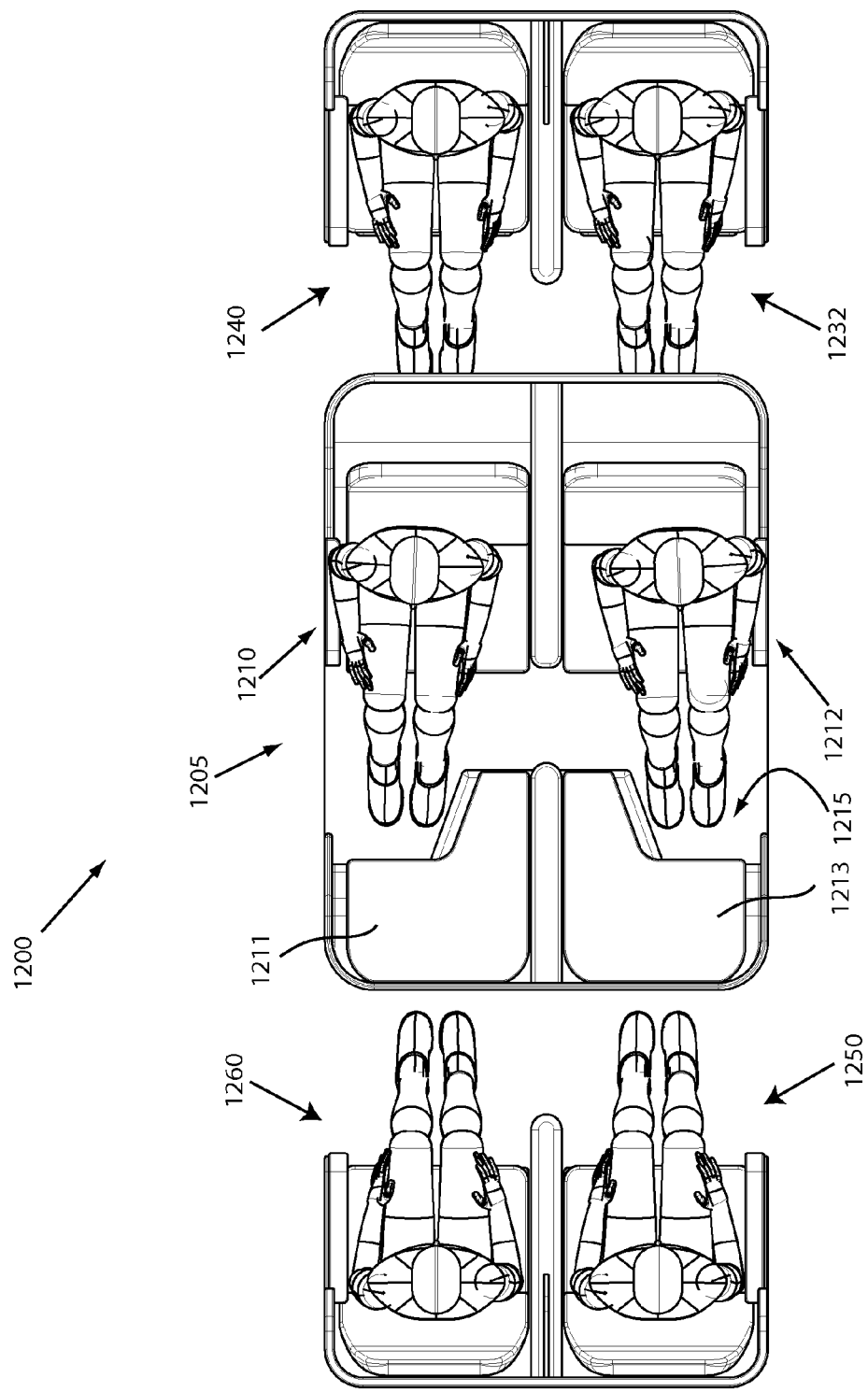
FIG. 12A shows an example hybrid seating arrangement.
Figure 12B:
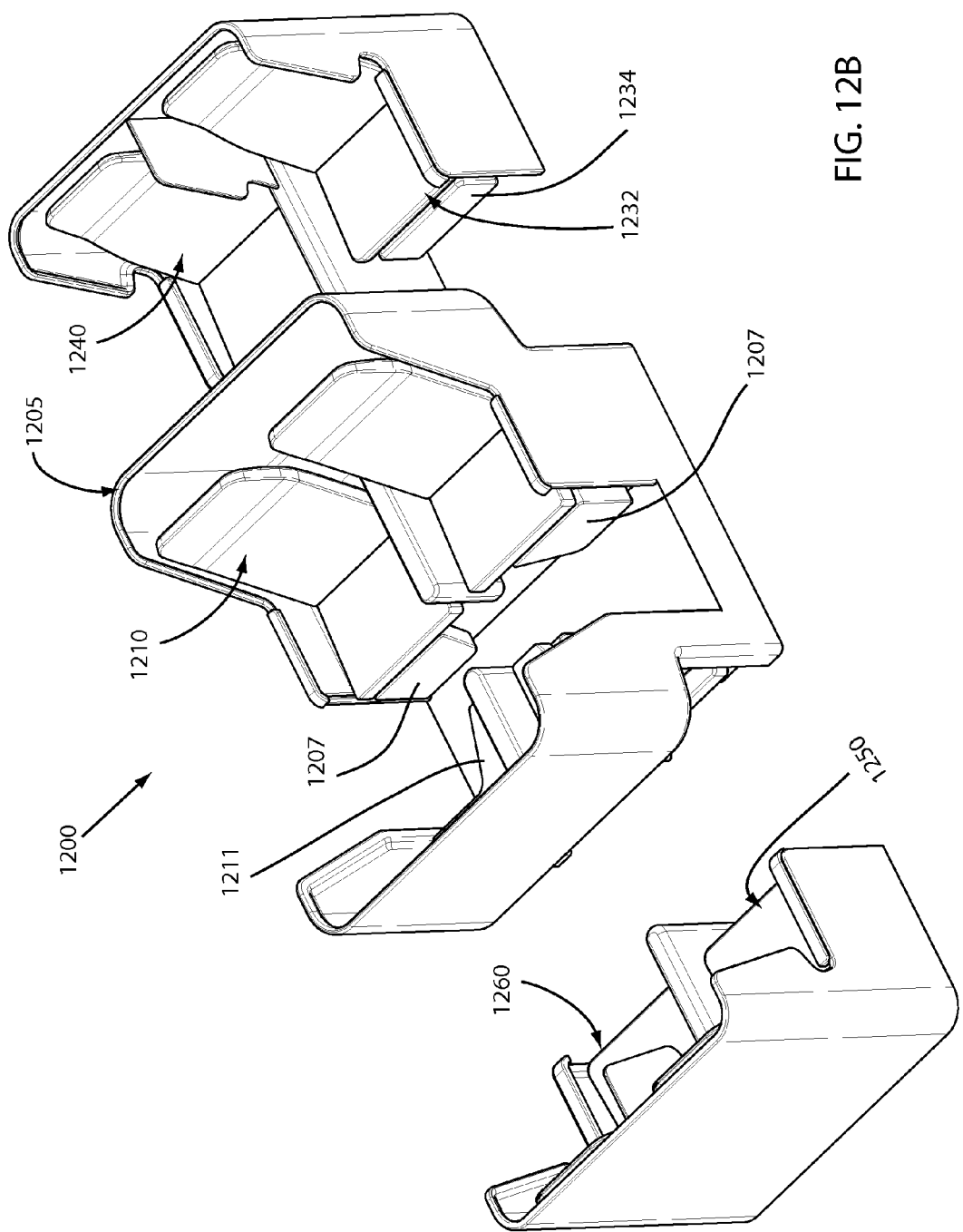
FIG. 12B shows an example hybrid seating arrangement.
Figure 12C:
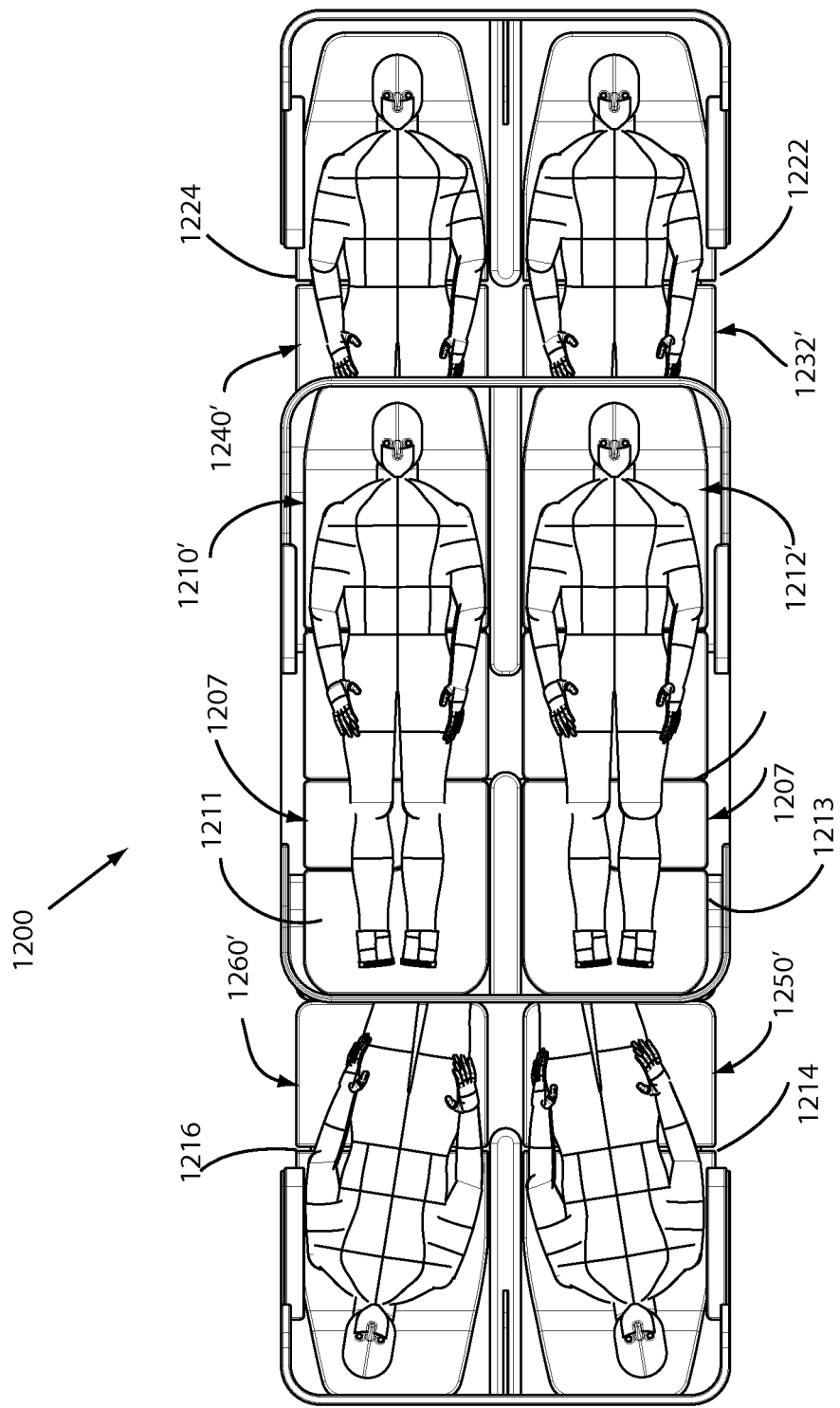
FIG. 12C shows an example hybrid seating arrangement.
Figure 12D:
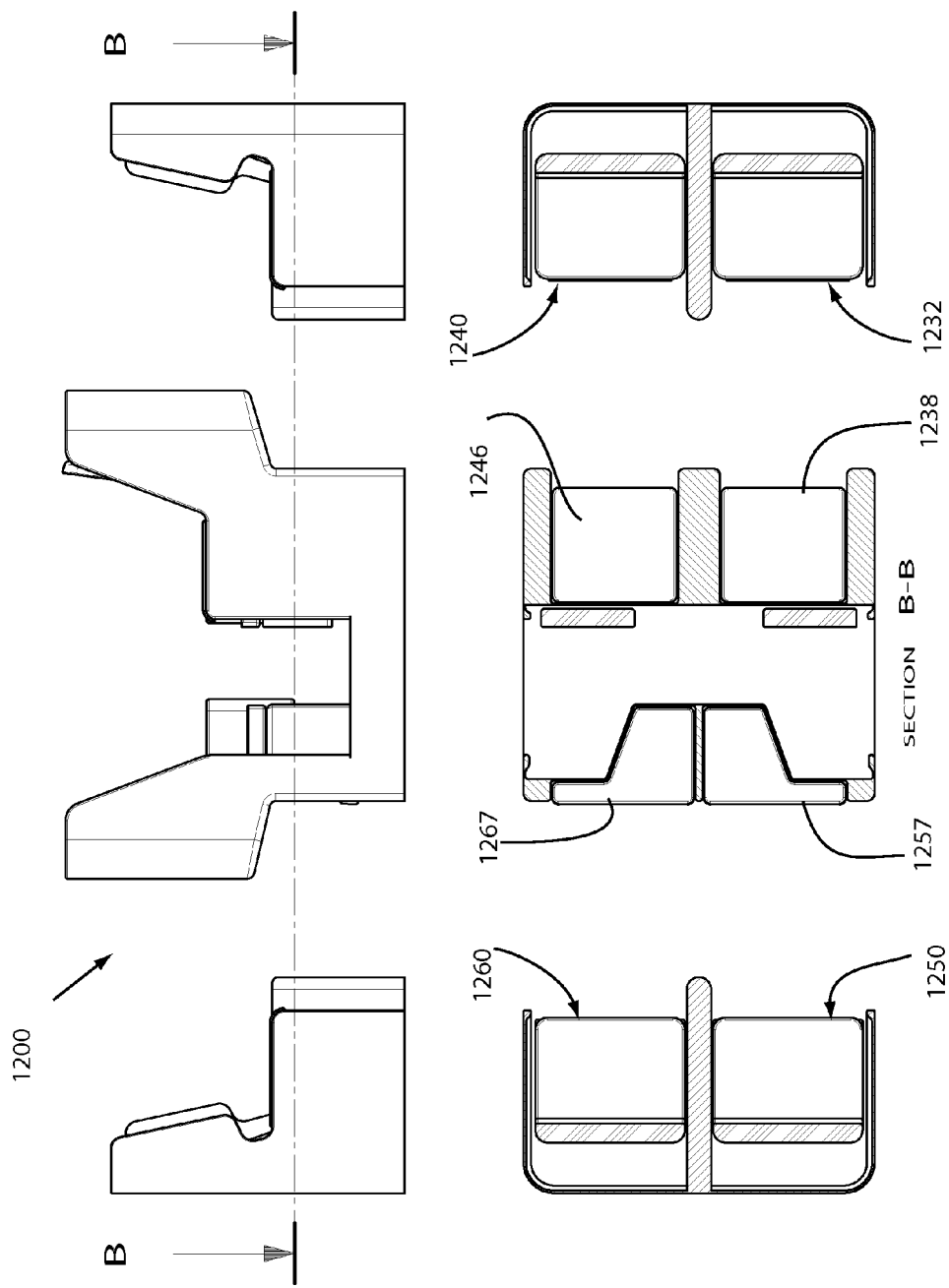
FIG. 12D shows an example hybrid seating arrangement.
Figure 12E:
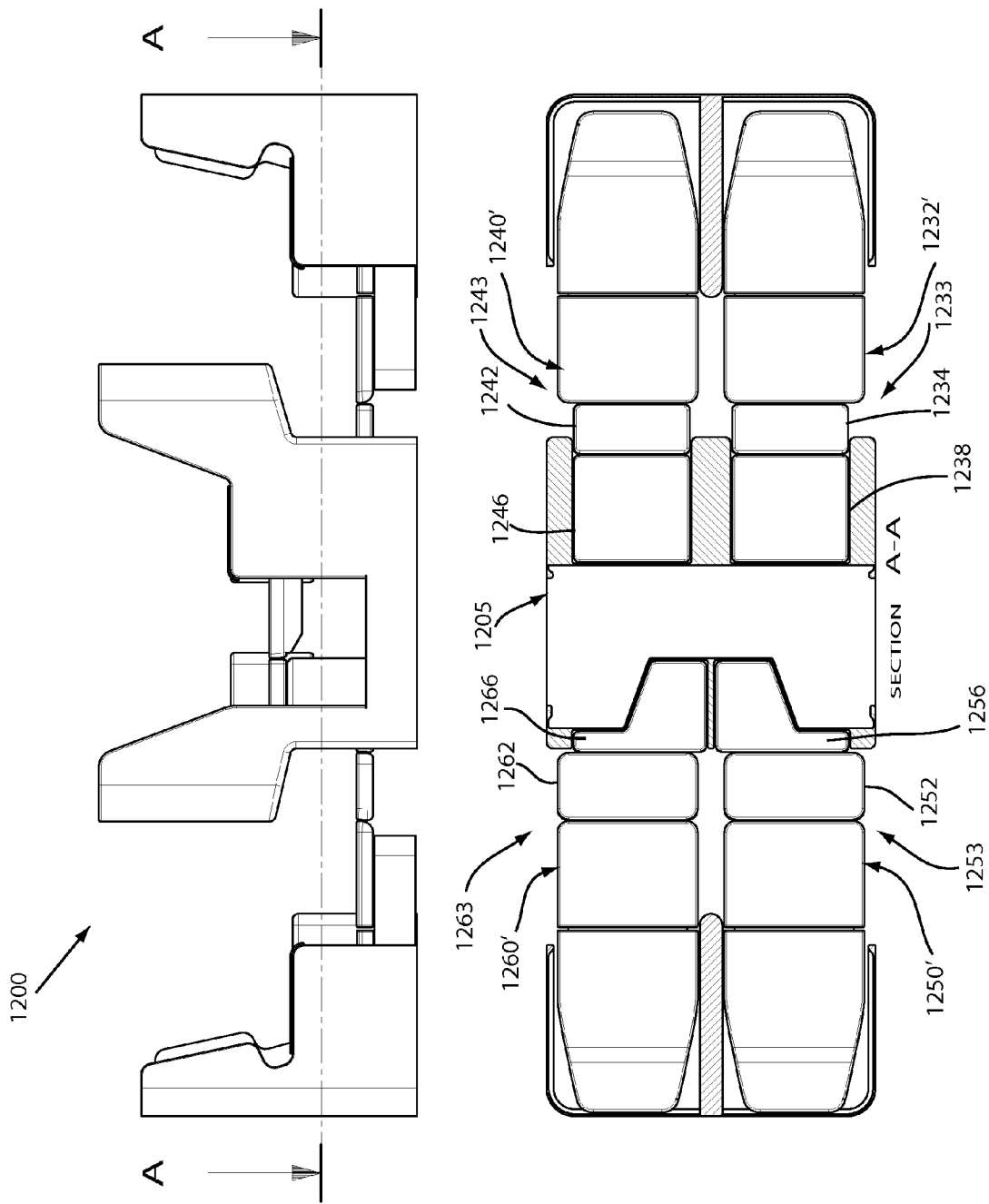
FIG. 12E shows an example hybrid seating arrangement.
Figure 12F:
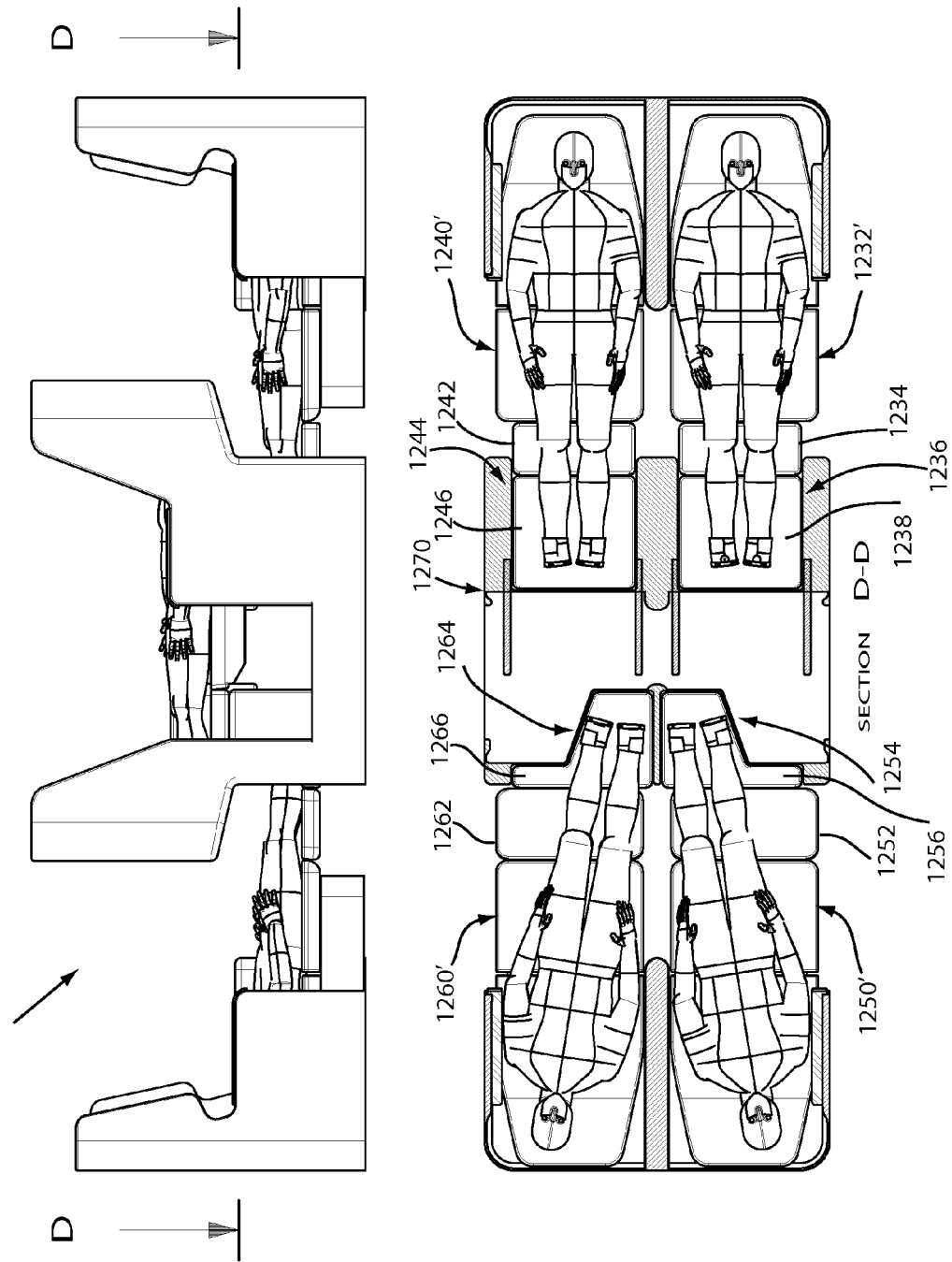
FIG. 12F shows an example hybrid seating arrangement.

An example embodiment 1200 can include a first non-opposing lower seat 1232, a second non-opposing lower seat 1240, a first upper seat 1210, a second upper seat 1212, a first opposing lower seat 1250, and a second opposing lower seat 1260. Lower seats 1232, 1240, 1250, 1260 can be aligned with the upper seats 12010, 12012. As shown in FIG. 12C, which shows the configuration 1200 in a lie-flat configuration, transverse seat hinge lines 1214, 1216, 1218, 1220, 1222 and 1224 are perpendicular to the linear dimension of the upper seats 1210, 1212, a further indication of seat alignment. Occupants in the first and second lower seats 1232 and 1240 are lying "straight" or in alignment with the first and second upper seats 1206, 1208. However, due to the disposition of footspace for the lower opposing seats 2, their occupants are angled when lying on the beds 1250' and 1260'.

The upper seat 1210 can be associated with a footspace 1209 for a seated passenger. A footrest 1211 can be provided at an FSA 1205 to support the feet of a passenger when reclining on the bed 1210'. The upper seat 1210 can comprise a seat extender 1207 that can be extended when the seat 1210 is in a lie-flat position. The seat extender 1207 can be shaped so that the bed 1210' can cooperate with the footrest 1211 to provide a berth for an upper passenger of relatively uniform width.

In like manner, the upper seat 1212 can be associated with a footspace 1215 for a seated passenger. The FSA 1205 can provide a footrest 1213 to support the feet of the passenger when using the bed 1212'. The seat 1212 can include the seat extender 1207, and be configured to cooperate with the footrest 1215 provide a berth for an upper passenger or relatively uniform width.

Turning first to the non-opposing lower seating, the lower seat 1232 can be configured with a leg extension 1234 for supporting a passenger's lower legs and cooperating with the seat 1232 in a lie-flat position to form a bed 1232'. A footwell 1236 can be provided in association with the seat 1232, in which a footrest 1238 can be disposed. The footrest 1238 is about the same width as the leg extension 1234, and the two can cooperate to allow an occupant to lie fairly straight when reclined in a lie-flat position. Together the bed 1232' and the footrest 1238 can provide a berth 1233.

Similarly, second lower non-opposing seat 1240 can be configured with a leg extension 1242, with which it can form a bed 1240'. A footwell 1244 can be provided in which a footrest 1246 of generally uniform width can be disposed. Together the bed 1240' and the footrest 1246 can provide a berth 1243 having sufficient width for an occupant to lie straight (not angled) in a lie-flat position.

However, footspace for lower opposing seats is configured differently. The first lower opposing seat 1250 can have a leg extension 1252 with which it can form a bed 1250' in a lie-flat position. A footwell 1254 can be provided adjacent a footspace 1272 for a seated occupant of an upper seat of the FSA 1270. A foot rest 1256 can be disposed to cooperate with the bed 1250 to provide a berth 1253 for a lower passenger. The portion of the footrest 1256 that extends into the footwell 1254 is noticeably narrower than the leg extension 1252, causing an occupant to lie in an angled position when fully reclined. Similarly, a second lower opposing seat 1260 can be configured with a leg extension 1262. A footwell 1264 for a seat 1260 occupant can be provided adjacent a footspace 1274 for a seated occupant of an upper seat of the FSA 1270. A footrest 1266 for supporting a reclining passenger's feet can be provided. The portion of the footrest 1266 that extends into the footwell 1264 can be noticeably more narrow than the seat 1260 and leg extension 1262, encouraging, if not forcing, an occupant to lie in an angled position when fully reclined.

Thus lower seats 1232, 1240 have a wide footspace and a correspondingly wide footrest that is substantially the same width as the associated seat, allowing passengers to lie straight, while lower opposing seats 1250, 1260 have a more narrow footspace and footrest, prompting passengers to be angled. As shown in the various figures all upper and lower seats have unobstructed ingress/egress and a comfortable amount of foot room when in an upright position. This arrangement allows bed lengths to be optimized relative to the overall length of the cabin while providing ample leg room for a passenger. An upper seat can be offered as a premium seat over lower seats due to the potentially larger bed that can be achieved if dimensions are biased in favor of upper seats.

As required, many example arrangements are provided herein, however the invention is not limited to exemplary embodiments disclosed.

What is claimed:

1. A vehicle seating arrangement, comprising:
a fore-facing lower seating assembly having a fore-facing seat convertible between an upright and a lie-flat position;
an aft-facing lower seating assembly having an aft-facing seat convertible between an upright and a lie-flat position;
a upper seating assembly positioned between the fore-facing lower assembly and the aft-facing lower assembly;
wherein said fore-facing lower seating assembly, said aft-facing lower seating assembly and said upper seating assembly are configured to form a three-seat unit in which a portion of a seat of said fore-facing lower seating assembly and a portion of a seat of said aft-facing lower seating assembly underlap said upper seating assembly when said fore-facing and said aft-facing seats are converted to a lie-flat position; and
wherein at least one of said fore-facing lower seating assembly and said aft-facing lower seating is oriented at an angle in relation to said upper seating assembly.

2. The vehicle seating arrangement of claim 1 wherein said fore-facing lower seating assembly and said aft-facing lower seating are oriented at an angle in relation to said upper seating assembly.

3. The vehicle seating arrangement of claim 1, wherein a portion of a bed comprising said aft-facing lower seat underlaps a berth comprising an upper seat of said upper seating assembly.

4. The vehicle seating arrangement of claim 1, further comprising an adjacent lower seating assembly adjacent said fore-facing lower seat assembly, wherein said adjacent lower seating assembly is generally parallel with the upper seating assembly, the space between the adjacent lower seating assembly and the fore-facing lower seat assembly defining an access way for the adjacent lower seating assembly.

5. The vehicle seating arrangement of claim 4, wherein said adjacent lower seating assembly is aft-facing.

6. The vehicle seating arrangement of claim 4, wherein said adjacent lower seating assembly extends beyond the fore-facing lower seat assembly to provide an access way for the adjacent lower seating assembly.

7. The vehicle seating arrangement of claim 1, further comprising an adjacent lower seating assembly adjacent said aft-facing lower seat assembly, wherein said adjacent lower seating assembly is generally parallel with the upper seating assembly, the space between the adjacent lower seating assembly and the aft-facing lower seat assembly defining an access way for the adjacent lower seating assembly.

8. The vehicle seating arrangement of claim 7, wherein said adjacent lower seating assembly is fore-facing.

9. The vehicle seating arrangement of claim 7, wherein said adjacent lower seating assembly extends beyond the aft-facing lower seat assembly to provide an access way for the adjacent lower seat assembly.

10. The vehicle seating arrangement of claim 1 wherein said fore-facing lower seating assembly and said aft-facing lower seating are oriented at an angle in relation to said upper seating assembly, and further comprising:
a first adjacent lower seating assembly adjacent said fore-facing lower seating assembly, wherein said first adjacent lower seating assembly is generally parallel with the upper seating assembly, the space between the first adjacent lower seating assembly and the fore-facing lower seating assembly defining an access way for the first adjacent lower seating assembly, and
a second adjacent lower seating assembly adjacent said aft-facing lower seating assembly, wherein said second adjacent lower seating assembly is generally parallel with the upper seating assembly, the space between the adjacent lower seating assembly and the aft-facing lower seating assembly defining an access way for the second adjacent lower seating assembly.

11. The vehicle seating arrangement of claim 10, wherein said first adjacent lower seating assembly is aft-facing and said second adjacent lower seating assembly is fore-facing.

12. The vehicle seating arrangement of claim 10, wherein said first adjacent lower seating assembly extends beyond the fore-facing lower seating assembly to provide an access way for the first adjacent lower seating assembly and said second adjacent lower seating assembly extends beyond the aft-facing lower seating assembly to provide an access way for the second adjacent lower seating assembly.

13. The seating arrangement of claim 1, wherein said fore-facing lower seating assembly is angled with respect to the length dimension of said upper seating assembly.

14. The seating arrangement of claim 1, wherein a portion of said lower fore-facing seating assembly is attached to a portion of said upper seating assembly.

15. The seating arrangement of claim 1, further comprising a vertical member attached to the upper seating assembly and a ceiling structure of said vehicle.

16. The seating arrangement of claim 1, wherein said aft-facing lower seating assembly is angled with respect to said upper seating assembly, further comprising a fore-facing seating structure positioned adjacent to said aft-facing lower seating assembly, said fore-facing seating structure positioned generally parallel with the upper seating assembly, wherein said angling of said aft-facing lower seating assembly provides an access area to said fore-facing seating structure.

17. The seating arrangement of claim 16, wherein the upper seating assembly includes an upper seat and a footwell, wherein said footwell is laterally off-set from the upper seat.

18. The seating arrangement of claim 1, wherein the upper seating assembly includes a wide seat and a narrow footwell.

19. A seating arrangement comprising:
a three-seat unit comprising a first lower aft-facing seating assembly, an upper seating assembly, and a first lower fore-facing seating assembly, at least one of said lower seating assemblies angled in relation to said upper seating assembly, said first lower aft-facing seating assembly and said first lower fore-facing assembly, and said upper seating assembly all arranged together on the same side of a vehicle cabin aisle; and
a third lower seating assembly positioned adjacent to said angled seat assembly on said same side of a vehicle cabin aisle, said third lower seat assembly generally parallel with the upper seat assembly, the space between the third lower seating assembly and the angled lower seating assembly defining an unobstructed access area for the third lower seating assembly.

20. The seating arrangement of claim 19, wherein the end of the third lower seating assembly extends beyond the end of the angled lower seating assembly to provide an unobstructed access area for the third lower seating assembly.

21. A seating module comprising:
a three-seat unit comprising a first lower aft-facing seating assembly convertible between an upright and a lie-flat position, an upper seating assembly, and a first lower fore-facing seating assembly convertible between an upright and a lie-flat position, at least one of said first aft-facing and said first fore-facing lower seating assemblies angled in relation to said upper seating assembly;

a second lower aft-facing seating assembly positioned adjacent to said three seat unit; and wherein said angling of said at least one of said first lower aft-facing and said first fore-facing seating assemblies provides an unobstructed access area to said second lower aft-facing seating assembly.

22. The seating module of claim 21, further comprising a second lower fore-facing seating assembly positioned adjacent to said three-seat unit.

23. The seating module of claim 21, wherein said upper seating assembly has a seatback and a footwell narrower than said seatback.

* * * * *